(12) United States Patent
Koseki et al.

(10) Patent No.: US 7,540,001 B2
(45) Date of Patent: May 26, 2009

(54) APPARATUS FOR AND METHOD OF MOUNTING DISKS HAVING DIFFERENT DIAMETERS

(75) Inventors: Shuji Koseki, Tokyo (JP); Akihisa Inatani, Kanagawa (JP); Renji Tamura, Kanagawa (JP); Tsutomu Morita, Kanagawa (JP)

(73) Assignee: Sony Corporation (JP)

( * ) Notice: Subject to any disclaimer, the term of this patent is extended or adjusted under 35 U.S.C. 154(b) by 811 days.

(21) Appl. No.: 10/946,510

(22) Filed: Sep. 21, 2004

(65) Prior Publication Data

US 2005/0105428 A1  May 19, 2005

(30) Foreign Application Priority Data

Oct. 3, 2003   (JP)   ............................ P2003-346408
Oct. 3, 2003   (JP)   ............................ P2003-346409
Oct. 3, 2003   (JP)   ............................ P2003-346414

(51) Int. Cl.
   *G11B 17/04*   (2006.01)
(52) U.S. Cl. ..................... 720/626; 720/619; 369/53.22
(58) Field of Classification Search ................. 720/626, 720/617–624, 645
   See application file for complete search history.

(56) References Cited

U.S. PATENT DOCUMENTS

| | | | | |
|---|---|---|---|---|
| 4,724,492 A | * | 2/1988 | Kosaka et al. ................ | 386/105 |
| 4,995,027 A | * | 2/1991 | Aoyagi et al. ................ | 720/626 |
| 5,038,337 A | * | 8/1991 | Muramatsu et al. .......... | 720/645 |
| 5,042,025 A | * | 8/1991 | Aoyagi et al. ................ | 369/190 |
| 5,056,075 A | * | 10/1991 | Maruta et al. ............... | 369/53.2 |
| 5,136,570 A | * | 8/1992 | Takai et al. .................. | 720/624 |
| 5,150,349 A | * | 9/1992 | Takai et al. .................. | 720/626 |
| 5,172,354 A | * | 12/1992 | Otsubo ...................... | 369/44.27 |
| 5,644,561 A | * | 7/1997 | Son et al. .................... | 369/53.2 |
| 5,737,285 A | * | 4/1998 | Uchiyama ................. | 369/30.32 |
| 6,480,442 B1 | * | 11/2002 | Nakatani et al. ............ | 720/626 |
| 6,892,384 B2 | * | 5/2005 | Kim et al. ................... | 720/623 |
| 6,990,673 B2 | * | 1/2006 | Lee ............................. | 720/623 |

FOREIGN PATENT DOCUMENTS

| | | |
|---|---|---|
| JP | 59-149261 | 8/1984 |
| JP | 60-163550 | 8/1985 |

(Continued)

*Primary Examiner*—Tan X Dinh
(74) *Attorney, Agent, or Firm*—Lerner, David, Littenberg, Krumholz & Mentlik, LLP

(57) ABSTRACT

A disc transport apparatus for detecting a disc-shaped recording medium with specified diameter, transporting the disc-shaped recording medium to a chucking position, but not transporting a disc-shaped recording medium with different diameter, when detected, to the chucking position includes a recording medium mount section capable of mounting a first disc having a first diameter and a second disc having a second diameter that is smaller than the first diameter, an optical detection unit that uses a light receiving section for receiving reflected light from a detection target in response to light emitted from a light emitting section and that is provided at a position opposite a disc having the first diameter when the disc is mounted on the recording medium mount section and at a position not opposite a disc having the second diameter when the disc is mounted on the recording medium mount section, and a control section for determining whether a disc is mounted based on a detection result of the optical detection means.

10 Claims, 49 Drawing Sheets

FOREIGN PATENT DOCUMENTS

| | | |
|---|---|---|
| JP | 02-068763 | 3/1990 |
| JP | 02-161654 | 6/1990 |
| JP | 02-306513 | 12/1990 |
| JP | 10-239449 | 9/1998 |
| JP | 2005-004804 | 1/2005 |

* cited by examiner

| ADDRESS | SIGNAL | DESCRIPTION |
|---|---|---|
| CLOSE OVER | 1000 | POSITION PAST THE CLOSE POSITION |
| CLOSE | 1100 | CLOSE POSITION |
| CLOSE PWM | 0100 | POSITION TO START DECELERATION BEFORE STOPPING AT CLOSE POSITION |
| DC | 0110 | POSITION MOVABLE AT NORMAL SPEED |
| OPEN PWM | 0010 | POSITION TO START DECELERATION BEFORE STOPPING AT OPEN POSITION |
| OPEN | 0011 | OPEN POSITION |
| OPEN OVER | 0001 | POSITION PAST THE OPEN POSITION |
| OPEN NG | 1011 | POSITION TO TURN ON THE FIRST SENSOR AT THE OPEN POSITION |
| OPEN PWM NG | 1010 | POSITION TO TURN ON THE FIRST SENSOR AT THE "OPEN PWM" POSITION |
| DC NG | 1110 | POSITION TO TURN ON THE FIRST SENSOR AT THE "DC" POSITION |
| EMPTY | 0000 | STATE INDICATING THAT THE COVER IS DETACHED OR IS ATTACHED LEFT-RIGHT REVERSELY |

FIG. 47

APPARATUS FOR AND METHOD OF MOUNTING DISKS HAVING DIFFERENT DIAMETERS

BACKGROUND OF THE INVENTION

1. Field of the Invention

The present invention is applied to a disc drive apparatus which uses a disc-shaped recording medium for recording and reproduction. The present invention relates to a disc transport apparatus and a disc transport method for transporting a disc-shaped recording medium to a chucking position as well as a disc drive apparatus and a disc drive method.

2. Description of the Related Art

In a widely used disc drive apparatus, a light emitting section emits light to a detection target. A light receiving section detects reflected light and uses its detection output for recording or reproduction of a disc-shaped recording medium.

For example, Patent Document 1: Jpn. Pat. Appln. Laid-Open Publication No. 2001-126286 discloses an optical sensor to detect recording side inclination of a disc-shaped recording medium against an actuator base and another optical sensor to detect the amount of bobbin inclination against the actuator base.

Conventionally, some recording and/or reproduction apparatuses for optical discs and the like are equipped with a transport mechanism and a disc detection apparatus. The transport mechanism transports an optical disc between a recording/reproduction position for recording or reproducing information signals onto an optical disc and a mount/dismount position for mounting or dismounting an optical disc. The disc detection apparatus detects whether or not the optical disc is transported to the recording/reproduction position.

As shown in FIG. 1, this type of disc detection apparatus represents a light detection apparatus 200 using a photointerrupter having a light emitting element and a light receiving element. The light emitting element radiates light to an optical disc's signal recording side. The light receiving element receives reflected light from the signal recording side of the optical disc where the light is radiated. The light detection apparatus 200 is disposed near the recording/reproduction position of an optical disc 201. The light detection apparatus 200 comprises: a photointerrupter 202 facing toward the signal recording side of the optical disc 201 transported to the recording/reproduction position; a direct current power supply Is to drive a light emitting element 203 of the photointerrupter 202; a bias power supply E to supply bias voltage to a light receiving element 204 of the photointerrupter 202; a load resistor R; and an output terminal 205.

In the photointerrupter 202, the light emitting element 203 and the light receiving element 204 are disposed so as to face toward a signal recording side 201a of the optical disc 201 transported to the recording/reproduction position. A light emitting section 203a of the light emitting element 203 and a light receiving section 204a of the light receiving element 204 face toward the signal recording side 201a of the optical disc 201. The light emitting element 203 needs to allow light emitting current Ii to flow in the forward direction. For this purpose, an anode side of the light emitting element 203 is connected to a positive side of the direct current power supply Is. A cathode side thereof is connected to a negative side of the direct current power supply Is. The light receiving element 204 needs to allow output current Io to flow in the forward direction. For this purpose, a collector side of the light receiving element 204 is connected to a positive side of the bias power supply E. An emitter side thereof is connected to a negative side of the bias power supply E via the load resistor R. Both ends of the load resistor R are connected to the output terminal 205 where output voltage Vo is output.

The following describes operations of the light detection apparatus 200 having the above-mentioned configuration. When the light emitting current Ii forward flows through the light emitting element 203 of the light detection apparatus 200, an electron is injected into a p-region and a positive hole is injected into an n-region. These are re-coupled to generate light. The light emitting element 203 generates light from the light emitting section 203a to the signal recording side 201a of the optical disc 201. The light is radiated to the optical disc 201 which then reflects the light at a specified reflection coefficient. The light reflected on the signal recording side 201a of the optical disc 201 is received at the light receiving section 204a of the light receiving element 204. The light receiving element 204 generates an electromotive force due to a semiconducting material to generate a current in the reverse direction. In this manner, photoelectric conversion occurs. In the light detection apparatus 200, output current Io flows in the forward direction of the light receiving element 204. The voltage drops in the load resistor R. This voltage drop is output as output voltage Vo from the output terminal 205. Consequently, detecting output voltage Vo permits a light receiving level to be detected.

There is a difference between light receiving levels depending on whether or not the optical disc 201 is transported to the recording/reproduction position. The light detection apparatus 200 detects this difference to detect whether or not the optical disc 201 is transported to the recording/reproduction position.

The photointerrupter 202 used for the light detection apparatus 200 focuses on the signal recording side 201a of the optical disc 201 transported to the recording/reproduction position. This aims at providing a high light receiving level by more efficiently detecting the reflected light from the signal recording side 201a of the optical disc 201 transported to the recording/reproduction position. The light is focused on the signal recording side of the optical disc 201 when it is transported to the recording/reproduction position. Accordingly, the light receiving element 204 of the light detection apparatus 200 receives the most intense reflected light On the other hand, the light scatters when the optical disc 201 is not transported to the recording/reproduction position. The light receiving element 204 just receives weakly reflected light. Consequently, the light detection apparatus 200 causes a large difference between light receiving levels depending on whether or not the optical disc 201 is transported to the recording/reproduction position. This makes it possible to reliably detect transportation of the optical disc 201.

[Patent Document 2] Jpn. Pat. Appln. Laid-Open Publication No. 991857

The disc drive apparatus described in the above-mentioned patent document 1 and the other ordinary disc drive apparatuses do not use a complicated configuration to transport a disc-shaped recording medium to a chucking section. The disc drive apparatuses are configured to use a disc holder previously sized to a disc diameter and almost horizontally move the disc holder to the chucking section or directly mount the disc-shaped recording medium on the chucking section.

In recent years, there is devised a disc drive apparatus having the following configuration. A disc-shaped recording medium is mounted on a disc holder provided as high as a base unit and is lifted to a chucking position. A chucking section is provided on a drive section and is moved to that position for chucking.

Such disc drive apparatus lifts a disc-shaped recording medium using a mechanism different from the conventional mechanism of directly lifting the disc holder previously sided to the disc diameter. That is to say, the disc drive apparatus lifts a disc-shaped recording medium using three cylinders each having a single point to support a disc-shaped recording medium with diameter 12 cm only, for example. This mechanism may be applicable to a disc drive apparatus that reproduces Super Audio CD with diameter 12 cm only for example. In such disc drive apparatus, however, there is a possibility of tilting or falling a disc-shaped recording medium (circular disc-shaped recording medium) with diameter 8 cm instead of 12 cm, for example, or a triangular, rectangular, or otherwise shaped recording medium (differently shaped recording medium) until it is lifted to the chucking position. If the recording medium remains tilted, the drive section moves to possibly cause a damage to the recording medium or the drive section itself. The recording medium may fall to be damaged.

FIG. 2 shows a recording and/or reproduction apparatus having a light detection apparatus that detects optical disc positions by receiving reflected light from the optical disc's signal recording side. The recording and/or reproduction apparatus is proposed to comprise a disc mount section 211, a disc transport member 212, and a disc rotation drive mechanism 213. The disc mount section 211 is formed to be a circularly recessed plane for mounting an optical disc. The disc transport member 212 is stored at the bottom of the disc mount section 211 and is capable of vertically moving on the disc mount section 211. The disc rotation drive mechanism 213 chucks and rotatively drives the optical disc 201 transported above the disc mount section 211.

The disc mount section 211 of the recording and/or reproduction apparatus 210 has a mounting plane 211a comprising a circularly recessed plane larger than the optical disc 201. The optical disc 201 is mounted at an arbitrary position of the mounting plane 211a. The disc transport member 212 transports the optical disc 201 mounted on the disc mount section 211 and is provided with a plurality of approximately columnar supporting cylinders 212a that support a side of the optical disc 201. The supporting cylinder 212a is stored at the bottom of the mounting plane 211a of the disc mount section 211 and is capable of being elevated on the mounting plane 211a by means of an elevating mechanism (not shown). When the supporting cylinder 212a is lowered to the bottom of the mounting plane 211a, the top surface of the supporting cylinder 212a becomes almost level with the mounting plane 211a to constitute part of the mounting plane 211a. The top surface of the supporting cylinder 212a is formed as a concave sphere to transport the optical disc 201 by supporting its side. The disc rotation drive mechanism 213 is formed with a chucking section 213a to rotatively chuck the optical disc 201 raised to the recording/reproduction position by the disc transport member 212. The chucking section 213a is formed so as to correspond to the height of the recording/reproduction position of the optical disc 201. The chucking section 213a moves along the surface direction of the optical disc 201 to rotatively support the center hole of the optical disc 201.

A user places the optical disc 201 on the disc mount section 211 of the recording and/or reproduction apparatus 210. The disc transport member 212 constitutes part of the mounting plane 211a of the disc mount section 211. When the optical disc 201 is mounted on the disc mount section 211, the supporting cylinder 212a of the disc transport member 212 is raised above the disc mount section 211 by supporting the optical disc 201 that is then lifted to the recording/reproduction position. When transported to the recording/reproduction position, the optical disc 201 is chucked by the chucking section 213a of the disc rotation drive mechanism 213 and is rotatively driven to record or reproduce information signals.

When the recording or reproduction operation terminates and an instruction is issued to eject the optical disc 201, the chucking section 213a of the disc rotation drive mechanism 213 retracts from the principal surface of the optical disc 201. Then, the supporting cylinder 212a of the disc transport member 212 is lowered to the bottom of the mounting plane 211a of the disc mount section 211. As a result, the optical disc 201 is transported to the takeout position. The takeout position is specified slightly above the mounting plane 211a of the disc mount section 211. Since the optical disc 201 is held at the takeout position, the user can easily pick up and eject the optical disc 201. When the optical disc 201 is ejected from the disc mount section 211, the supporting cylinder 212a of the disc transport member 212 is further lowered and is stored at the bottom of the mounting plane 211a of the disc mount section 211.

The recording and/or reproduction apparatus 210 as mentioned above is provided with the light detection apparatus 200 to the bottom of the mounting plane 211a of the disc mount section 211 and on the disc mount section 211. The light detection apparatus 200 detects presence or absence of the optical disc 201 to be moved up and down. The light detection apparatus 200 uses the light emitting element 203 to radiate light to the signal recording side 201a of the optical disc 201. The light detection apparatus 200 also detects presence or absence of the optical disc 201 by using the light receiving element 204 to receive the reflected light from the signal recording side 201a.

When the optical disc 201 is mounted on the mounting plane 211a of the disc mount section 211, the light detection apparatus 200 receives the reflected light from the signal recording side 201a of the optical disc 201. In this manner, the recording and/or reproduction apparatus 210 detects that the optical disc 201 is mounted on the disc mount section 211. The supporting cylinder 212a of the disc transport member 212 raises the optical disc 201 to the recording/reproduction position.

After completion of the recording or reproduction operation, the optical disc 201 is lowered from the recording/reproduction position to the mounting/dismounting position. When the user ejects the optical disc 201 from the supporting cylinder 212a, the light detection apparatus 200 stops detecting reflected light from the optical disc 201. In this manner, the recording and/or reproduction apparatus 210 can detect ejection of the optical disc 201 and lowers the supporting cylinder 212a to the bottom of the disc mount section 211.

If light with various wavelengths enters from ambiences, however, the light detection apparatus 200 cannot receive the reflected light from the optical disc 201. Even though the optical disc 201 is maintained at the eject position and is not ejected by the user, the recording and/or reproduction apparatus 210 may assume the optical disc 201 to be ejected and may lower the supporting cylinder 212a.

SUMMARY OF THE INVENTION

The present invention has been made in consideration of the foregoing. It is therefore an object of the present invention to provide a disc transport apparatus and a disc transport method for detecting the above-mentioned disc-shaped recording medium with diameter 12 cm, transporting the disc-shaped recording medium to a chucking position, and not transporting a disc-shaped recording medium with different diameter, when detected, to the chucking position. It is another object of the present invention to provide a disc drive apparatus and a disc drive method for detecting and driving a specifically shaped disc-shaped recording medium and not chucking and driving a differently shaped disc-shaped recording medium when detected.

It is still another object of the present invention to provide a disc detection apparatus and a disc detection method capable of detecting the disc-shaped recording medium with diameter 12 cm and determining the disc-shaped recording medium with different diameter.

It is yet another object of the present invention to provide a light detection apparatus and a transport apparatus having the light detection apparatus which can suppress influence of ambient light and reliably detect reflected light from a detection object.

A disc transport apparatus according to the present invention is used for a disc drive apparatus which records or reproduces disc-shaped recording media with specified diameter. The disc transport apparatus comprises: a determination means which allows a light receiving section to receive reflected light from a detection target in response to light emitted from a light emitting section, accepts detection results of a plurality of optical detection means for detecting the presence or absence of a response from a detection target, and determines whether or not the disc-shaped recording medium with specified diameter is mounted on a mounting guide section or determines whether or not a disc-shaped recording medium with different diameter is mounted thereon; and a transport means which, when the determination means determines that the disc-shaped recording medium with specified diameter is mounted on the mounting guide section, transports the disc-shaped recording medium to a chuckable position. When the determination means determines that a disc-shaped recording medium with different diameter is mounted on the mounting guide section, the transport means does not transport the disc-shaped recording medium with different diameter to solve the above-mentioned problems.

When the determination means determines that a disc-shaped recording medium with different diameter is mounted on the mounting guide section, the transport means does not transport the disc-shaped recording medium with different diameter to the chucking position.

A disc transport method according to the present invention is applied to a disc drive apparatus which records or reproduces disc-shaped recording media with specified diameter. The disc transport method comprises the steps of: allowing a light receiving section to receive reflected light from a detection target in response to light emitted from a light emitting section, accepting detection results of a plurality of optical detection devices for detecting the presence or absence of a response from a detection target, and determining whether or not the disc-shaped recording medium with specified diameter is mounted on a mounting guide section or determining whether or not a disc-shaped recording medium with different diameter is mounted thereon; and when the determination step determines that the disc-shaped recording medium with specified diameter is mounted on the mounting guide section, transporting the disc-shaped recording medium to a chuckable position. When the determination step determines that a disc-shaped recording medium with different diameter is mounted on the mounting guide section, the transport step does not transport the disc-shaped recording medium with different diameter to solve the above-mentioned problems.

When the determination step determines that a disc-shaped recording medium with different diameter is mounted on the mounting guide section, the transport step does not transport the disc-shaped recording medium with different diameter to the chucking position.

A disc drive apparatus according to the present invention records or reproduces disc-shaped recording media with specified shape. The disc drive apparatus comprises: a determination means which allows a light receiving section to receive reflected light from a detection target in response to light emitted from a light emitting section, accepts detection results of a plurality of optical detection means for detecting the presence or absence of a response from a detection target, and determines whether or not the disc-shaped recording medium with specified shape is mounted at a chucking position or determines whether or not a differently shaped disc-shaped recording medium is mounted there; a chucking means which, when the determination means determines that the disc-shaped recording medium with specified shape is mounted at the chucking position, chucks the disc-shaped recording medium; and a drive means which drives the disc-shaped recording medium chucked by the chucking means. When the determination means determines that the differently shaped disc-shaped recording medium is mounted at the chucking position, the chucking means does not chuck the disc-shaped recording medium to solve the problems.

A disc drive method according to the present invention records or reproduces disc-shaped recording media with specified shape. The disc drive method comprises the steps of: allowing a light receiving section to receive reflected light from a detection target in response to light emitted from a light emitting section, accepting detection results of a plurality of optical detection devices for detecting the presence or absence of a response from a detection target, and determining whether or not the disc-shaped recording medium with specified shape is mounted at a chucking position or determining whether or not a differently shaped disc-shaped recording medium is mounted there; when the determination step determines that the disc-shaped recording medium with specified shape is mounted at the chucking position, chucking the disc-shaped recording medium; and driving the disc-shaped recording medium chucked by the chucking step. When the determination step determines that a differently shaped disc-shaped recording medium is mounted at the chucking position, the chucking step does not chuck the disc-shaped recording medium to solve the problems.

A disc drive apparatus according to the present invention records or reproduces disc-shaped recording media with specified diameter and shape. The disc drive apparatus comprises: first determination means which allows a light receiving section to receive reflected light from a detection target in response to light emitted from a light emitting section, accepts detection results of a plurality of optical detection means for detecting the presence or absence of a response from a detection target, and determines whether or not the disc-shaped recording medium with specified diameter is mounted on a mounting guide section or determines whether or not a disc-shaped recording medium with different diameter is mounted thereon; a transport means which, when the determination means determines that the disc-shaped recording medium with specified diameter is mounted on a mounting guide section, transports the disc-shaped recording medium to a chuckable position and, when the determination means determines that a disc-shaped recording medium with different diameter is mounted on the mounting guide section, does not transport the disc-shaped recording medium with different diameter; a second determination means which allows a light receiving section to receive reflected light from a detection target in response to light emitted from a light emitting section, accepts detection results of a plurality of optical detection means for detecting the presence or absence of a response from a detection target, and determines whether or not the disc-shaped recording medium with specified shape is mounted at a chucking position or determines whether or not a differently shaped disc-shaped recording medium is mounted there; a chucking means which, when the second determination means determines that the disc-shaped recording medium with specified shape is mounted at the chucking position, chucks the disc-shaped recording medium; and a drive means which drives the disc-shaped recording medium chucked by the chucking means. When the second determination means determines that the differently shaped disc-shaped recording medium is mounted at the chucking position, the chucking means does not chuck the disc-shaped recording medium to solve the problems.

A disc drive method according to the present invention records or reproduces disc-shaped recording media with specified diameter and shape. The disc drive method comprises the steps of: firstly allowing a light receiving section to receive reflected light from a detection target in response to light emitted from a light emitting section, accepting detection results of a plurality of optical detection devices for detecting the presence or absence of a response from a detection target, and determining whether or not the disc-shaped recording medium with specified diameter is mounted on a mounting guide section or determining whether or not a disc-shaped recording medium with different diameter is mounted thereon; when the first determination step determines that the disc-shaped recording medium with specified diameter is mounted on a mounting guide section, transporting the disc-shaped recording medium to a chuckable position and, when the first determination step determines that a disc-shaped recording medium with different diameter is mounted on the mounting guide section, not transporting the disc-shaped recording medium with different diameter; secondly allowing a light receiving section to receive reflected light from a detection target in response to light emitted from a light emitting section, accepting detection results of a plurality of optical detection devices for detecting the presence or absence of a response from a detection target, and determining whether or not the disc-shaped recording medium with specified shape is mounted at a chucking position or determining whether or not a differently shaped disc-shaped recording medium is mounted there; when the second determination step determines that the disc-shaped recording medium with specified shape is mounted at the chucking position, chucking the disc-shaped recording-medium; and driving the disc-shaped recording medium chucked by the chucking step. When the second determination step determines that the differently shaped disc-shaped recording medium is mounted at the chucking position, the chucking step does not chuck the disc-shaped recording medium to solve the problems.

A disc detection apparatus according to the present invention detects whether or not a disc-shaped recording medium with specified diameter is mounted on a disc mounting guide section of a disc drive apparatus which records or reproduces disc-shaped recording media with specified diameter. The disc detection apparatus comprises: a plurality of optical detection means which allows a light receiving section to receive reflected light from a detection target in response to light emitted from a light emitting section and detects the presence or absence of a response from a detection target; and a control means which accepts detection results of the plurality of optical detection means and determines whether or not the disc-shaped recording medium with specified diameter is mounted on a mounting guide section or determines whether or not a disc-shaped recording medium with different diameter is mounted thereon. The plurality of optical detection means are disposed so as to be covered at least as many as m when the disc-shaped recording medium with specified diameter is mounted on the mounting guide section and so as to be covered at most as many as n (m>n) when the disc-shaped recording medium with different diameter is mounted thereon. In this manner, the above-mentioned problems are solved.

When covered at least as many as m, the plurality of optical detection means return a result to the control means to indicate that at least m responses are found. When covered at most as many as n, the plurality of optical detection means return a result to the control means to indicate that at most n responses are found. The control means uses the above-mentioned results. When at least m responses are found, the control means determines that the mounted disc-shaped recording medium has the specified diameter. When at most n responses are found, the control means determines that the mounted disc-shaped recording medium has a different diameter.

An optical disc detection method according to the present invention detects whether or not a disc-shaped recording medium with specified diameter is mounted on a disc mounting guide section of a disc drive apparatus which records or reproduces disc-shaped recording media with specified diameter. The optical disc detection method comprises the steps of: accepting detection results from respective light receiving sections corresponding to reflected light from a detection target in response to light emitted from respective light emitting sections of a plurality of optical detection means; detecting whether the detection results are obtained from at least m or at most n (m>n) optical detection means; determining that the disc-shaped recording medium with specified diameter is mounted on the mounting guide section when the detection results are obtained from at least m optical detection means; and determining that the disc-shaped recording medium with different diameter is mounted on the mounting guide section when the detection results are obtained from at most n optical detection means. In this manner, the above-mentioned problems are solved.

To solve the above-mentioned problems, the light detection apparatus according to the present invention comprises: a photointerrupter which has a light emitting element to emit light to a detection object and a light receiving element to receive reflected light from the detection object where the light emitted from the light emitting element is radiated, and disposes a light emitting section of the light emitting element to emit the light adjacently to a light receiving section of the light receiving element to receive reflected light of the light opposite to the detection object; and an optical element which is provided on the light emitting section and the light receiving section of the photointerrupter and is provided with a plurality of tilt angles on an optical surface to transmit the light so as to collect a plurality of focuses. The light detection apparatus detects the detection objects by detecting reflected light from the detection object at a position where the light passing through the optical element focuses.

A transport apparatus according to the present invention comprises: a mounting plane section to mount a detection object; a transport means which is provided upward from the principal surface of the mounting plane section so as to be capable of being elevated and transports the detection object mounted on the mounting plane section by supporting the downward plane section of the detection object; a photointerrupter which has a light emitting element to emit light to a detection object and a light receiving element to receive reflected light from the detection object where the light emitted from the light emitting element is radiated, and disposes a light emitting section of the light emitting element to emit the light adjacently to a light receiving section of the light receiving element to receive reflected light of the light opposite to the detection object; an optical element which is provided on the light emitting section and the light receiving section of the photointerrupter, faces the principal surface of the mounting plane section, and is provided with a plurality of tilt angles on an optical surface to transmit the light so as to collect a plurality of focuses; and a light detection apparatus having a housing to store the photointerrupter and the optical element. There is provided the light detection apparatus to detect the detection object by detecting the reflected light from the detection object transported by the transport means to a position where the light passing through the optical element focuses.

When the determination means determines that the disc-shaped recording medium with specified diameter is mounted on the mounting guide section, the disc transport apparatus according to the present invention transports the disc-shaped recording medium to a chuckable position. When the determination means determines that a disc-shaped recording medium with different diameter is mounted on the mounting guide section, the disc transport apparatus does not transport the disc-shaped recording medium with different diameter to the chucking position using the transport means. It is possible to avoid possibilities of falling to damage the disc-shaped recording medium with different diameter and damaging the disc drive apparatus.

When the determination step determines that the disc-shaped recording medium with specified diameter is mounted on the mounting guide section, the disc transport method according to the present invention transports the disc-shaped recording medium to a chuckable position. When the determination step determines that a disc-shaped recording medium with different diameter is mounted on the mounting guide section, the disc transport method does not transport the disc-shaped recording medium with different diameter to the chucking position using the transport step. It is possible to avoid possibilities of falling to damage the disc-shaped recording medium with different diameter and damaging the disc drive apparatus.

When the determination means determines that a disc-shaped recording medium with specified shape is mounted at the chucking position, the disc drive apparatus according to the present invention chucks the disc-shaped recording medium using the chucking means. When the determination means determines that a disc-shaped recording medium with different shape is mounted at the chucking position, the disc drive apparatus according to the present invention does not chuck the disc-shaped recording medium using the chucking means. It is possible to avoid possibilities of falling to damage the disc-shaped recording medium with different shape and damaging the disc drive apparatus.

When the determination step determines that a disc-shaped recording medium with specified shape is mounted at the chucking position, the disc drive method according to the present invention chucks the disc-shaped recording medium using the chucking step. When the determination step determines that a disc-shaped recording medium with different shape is mounted at the chucking position, the disc drive method according to the present invention does not chuck the disc-shaped recording medium using the chucking step. It is possible to avoid possibilities of falling to damage the disc-shaped recording medium with different shape and damaging the disc drive apparatus.

When the first determination means determines that a disc-shaped recording medium with specified diameter is mounted on the mounting guide section, the disc drive apparatus according to the present invention transports the disc-shaped recording medium to a chuckable position. When the first determination means determines that a disc-shaped recording medium with different diameter is mounted on the mounting guide section, the disc drive apparatus does not transport the disc-shaped recording medium with different diameter. When the second determination means determines that a disc-shaped recording medium with specified shape is mounted at the chucking position, the chucking means chucks the disc-shaped recording medium and the drive means drives it. When the second determination means determines that a disc-shaped recording medium with different shape is mounted at the chucking position, the chucking means does not chuck the disc-shaped recording medium. It is possible to avoid possibilities of falling to damage disc-shaped recording media with different diameter and shape and damaging the disc drive apparatus.

When the first determination step determines that a disc-shaped recording medium with specified diameter is mounted on the mounting guide section, the disc drive method according to the present invention transports the disc-shaped recording medium to a chuckable position. When the first determination step determines that a disc-shaped recording medium with different diameter is mounted on the mounting guide section, the disc drive method does not transport the disc-shaped recording medium with different diameter. When the second determination step determines that a disc-shaped recording medium with specified shape is mounted at the chucking position, the chucking step chucks the disc-shaped recording medium and the drive step drives it. When the second determination step determines that a disc-shaped recording medium with different shape is mounted at the chucking position, the chucking step does not chuck the disc-shaped recording medium. It is possible to avoid possibilities of falling to damage disc-shaped recording media with different diameter and shape and damaging the disc drive apparatus.

The disc detection apparatus according to the present invention is configured as follows. When covered at least as many as m, the plurality of optical detection means return a result to the control means to indicate that at least m responses are found. When covered at most as many as n, the plurality of optical detection means return a result to the control means to indicate that at most n responses are found. The control means uses the above-mentioned results. When at least m responses are found, the control means determines that the mounted disc-shaped recording medium has the specified diameter. When at most n responses are found, the control means determines that the mounted disc-shaped recording medium has a different diameter. Accordingly, the disc transport apparatus does not transport disc-shaped recording media with different diameter to the chucking position. It is possible to protect disc-shaped recording media and the drive apparatus against damage.

The disc detection method according to the present invention determines that the disc-shaped recording medium with specified diameter is mounted on the mounting guide section when responses return from at least as many as m optical detection means. The disc detection method determines that a disc-shaped recording medium with different diameter is mounted on the mounting guide section when responses return from at most as many as n optical detection means. Accordingly, the disc transport apparatus does not transport disc-shaped recording media with different diameter to the chucking position. It is possible to protect disc-shaped recording media and the drive apparatus against damage.

With respect to the light detection apparatus and the transport apparatus having the light detection apparatus, the optical element's optical surface is provided with a plurality of inclined planes having specified tilt angles. Accordingly, light emitted from the light emitting element is converged on a plurality of locations corresponding to transport positions of the detection object. Therefore, when the detection object is situated at a specified position, it is possible to most intensely detect the reflected light from the detection object. The reflected light intensity can be used to determine the presence or absence of the detection object at the specified position.

A plurality of focuses are provided in accordance with transport positions of the detection object. Consequently, even if the detection object is transported to a plurality of positions stepwise, it is possible to detect the presence or absence of the detection object at respective transport positions.

BRIEF DESCRIPTION OF THE DRAWINGS

FIG. 47 shows cover operations and addresses to detect cover positions;

DETAILED DESCRIPTION OF THE PREFERRED EMBODIMENTS

Figure 1:
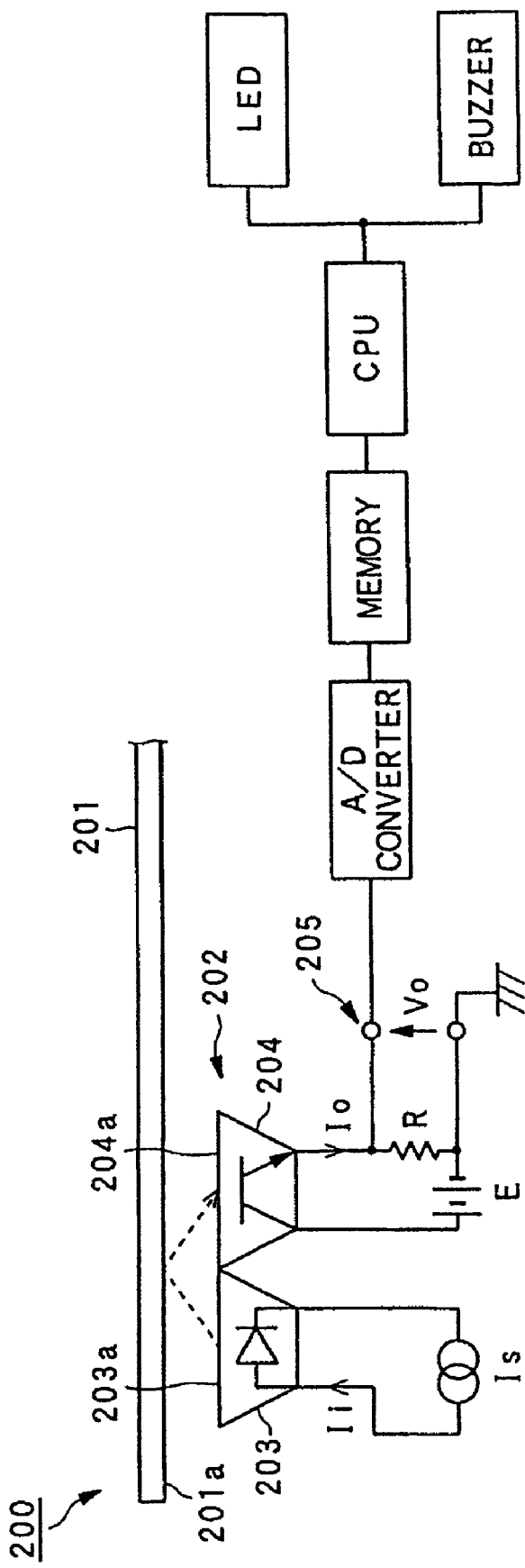
FIG. 1 is a block diagram showing the configuration of a conventional optical detection apparatus.
Figure 2:
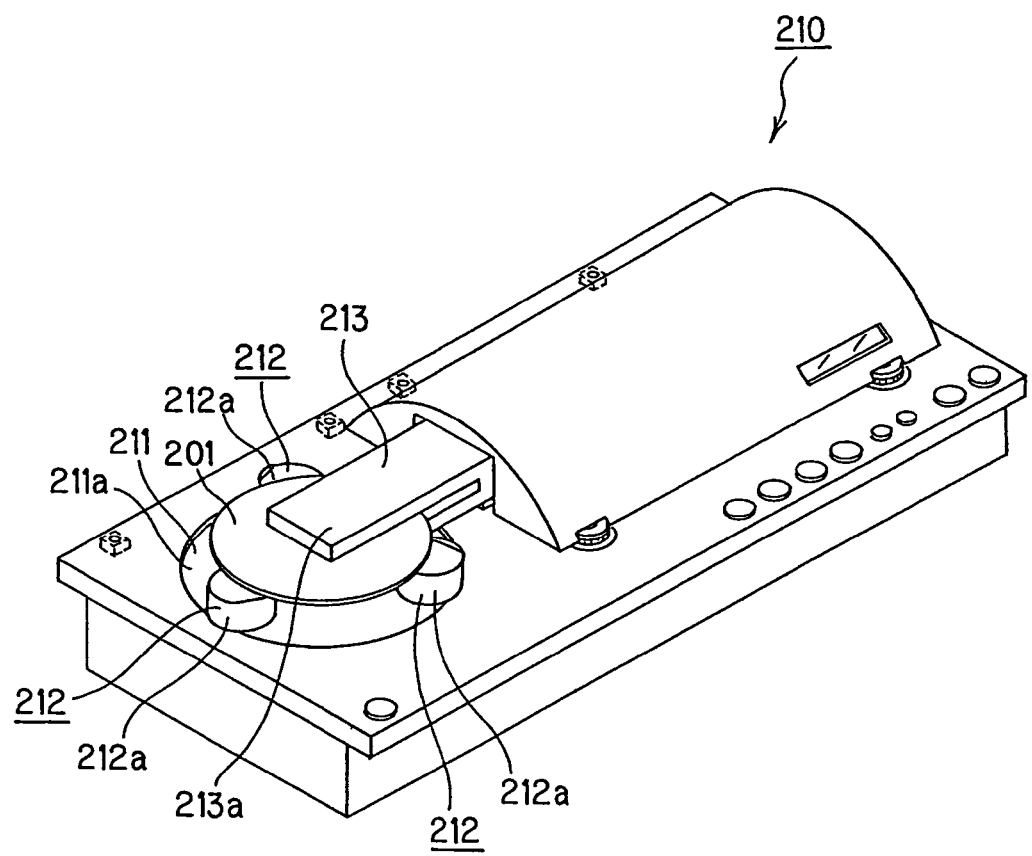
FIG. 2 is a perspective view showing a recording and/or reproduction apparatus premised for the present invention.
Figure 3:
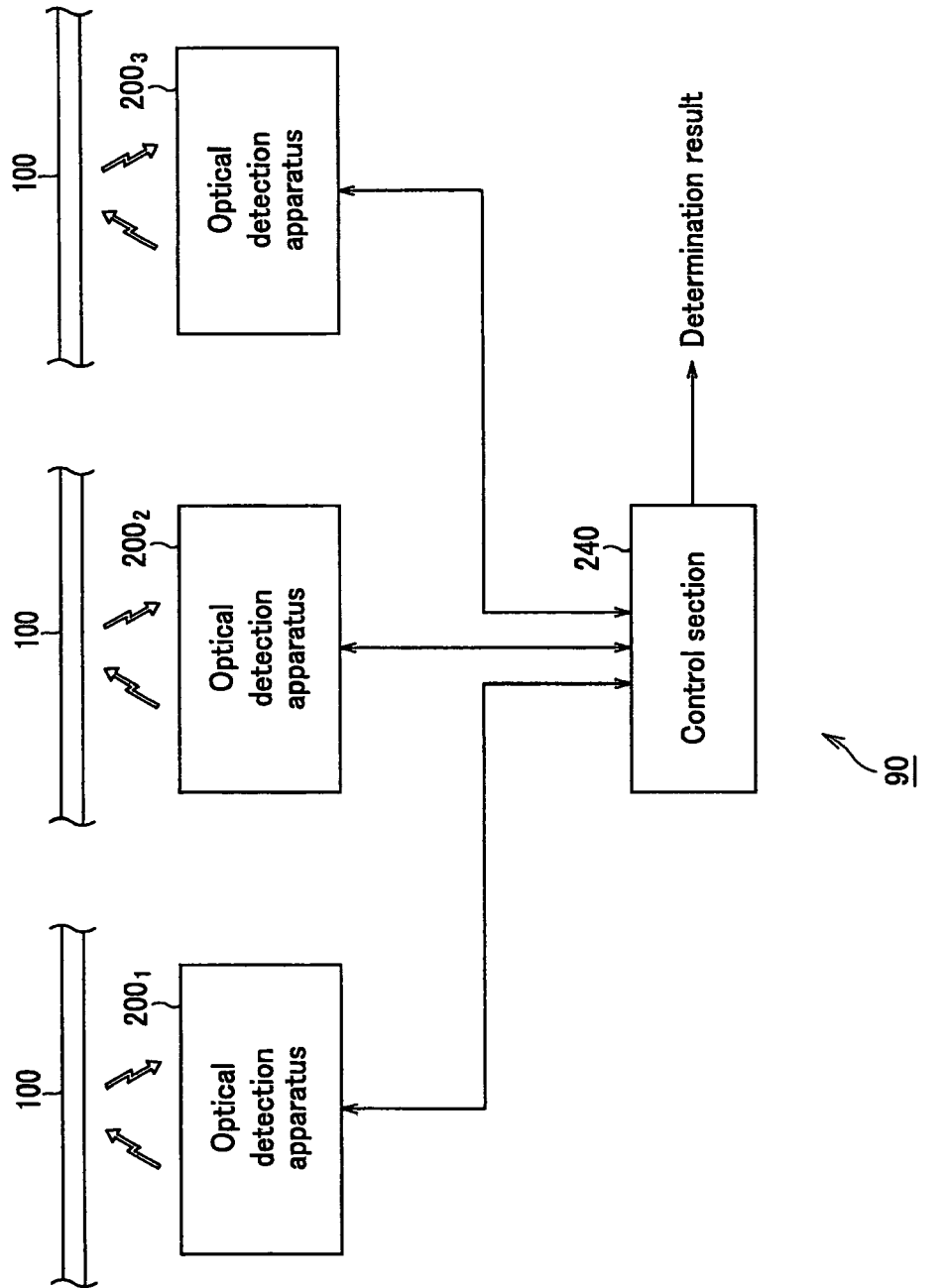
FIG. 3 is a block diagram of a disc detection apparatus.

The best mode for carrying out the invention will be described with reference to the accompanying drawings. FIG. 3 is a configuration diagram showing a disc detection apparatus 90 used for the disc transport apparatus as the best mode of the present invention. The disc detection apparatus 90 is a disc drive apparatus that records or reproduces information signals on a disc-shaped recording medium, for example. The disc detection apparatus 90 detects whether or not the disc-shaped recording medium is mounted, i.e., detects the presence or absence of the disc-shaped recording medium. For example, the disc detection apparatus 90 uses three light detection apparatuses 200 each having a detection sensor 18. The disc detection apparatus 90 can detect the presence or absence of a disc-shaped recording medium by allowing a main control section such as a system controller to monitor detection signals from each phototransistor. The disc detection apparatus 90 detects that the disc drive apparatus 1 is a disc-shaped recording medium targeted for recording or reproduction. In addition, the disc detection apparatus 90 can distinguish different diameter discs or differently shaped discs from the disc-shaped recording medium targeted for recording or reproduction. In this manner, the disc detection apparatus 90 can determine, for example, whether the disc-shaped recording medium is a disc with diameter 12 cm or 8 cm or a differently shaped disc.

The disc transport apparatus as the best mode of the present invention receives a determination result from the disc detection apparatus 90. The disc transport apparatus determines whether the disc-shaped recording medium mounted on a mounting guide section (to be described) is a disc with specified diameter (12 cm) or a different diameter disc. When it is determined that the disc with diameter 12 cm is mounted, the disc transport apparatus uses transport means to transport the disc with diameter 12 cm to a chuckable position. When the disc detection means 90 determines that a disc-shaped recording medium with a different diameter (8 cm) is mounted on the mounting guide section, the transport means does not transport the disc-shaped recording medium with different diameter. This transport means will be described later.

Three light detection apparatuses 2001, 2002, and 2003 constituting the disc detection apparatus 90 radiate light to a disc-shaped recording medium 100 mounted on a disc holder to be described and detect the presence or absence of reflected light therefrom. A detection result indicates the presence or absence of reflected light (or the presence or absence of response) and is transmitted to a control section 240 such as a system controller. Based on the detection result, the control section 240 determines whether or not the disc holder is mounted with the disc-shaped recording medium targeted for recording or reproduction. The control section 240 also determines whether or not a different diameter disc is mounted.

Figure 4:
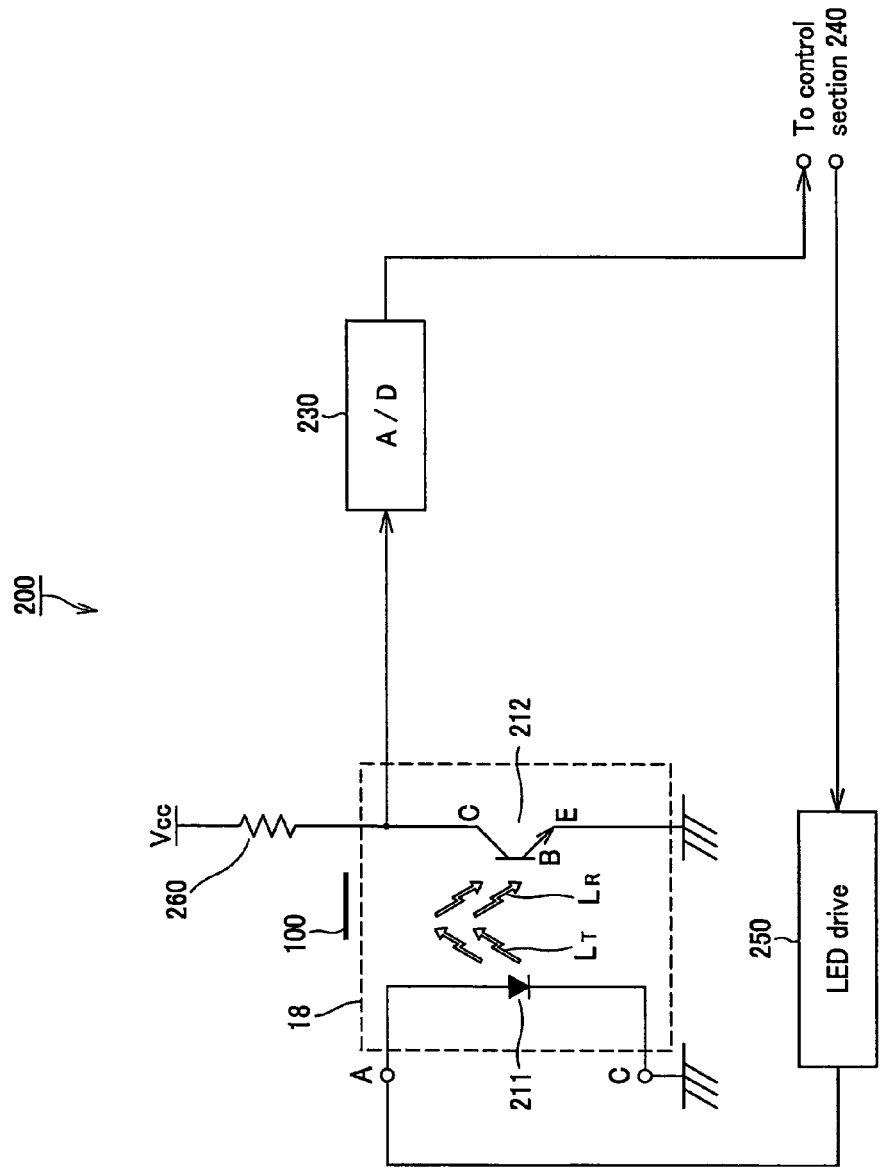
FIG. 4 is a configuration diagram of an optical detection apparatus.

As shown in FIG. 4, the light detection apparatus 200 comprises the detection sensor 18 such as a reflective photointerrupter and an LED drive section 250. The detection sensor 18 radiates light to the disc-shaped recording medium 100 and detects the presence or absence of reflected light therefrom. The LED drive section 250 generates and supplies drive current for a light emitting section in the detection sensor 18 under control of the control section 240.

The detection sensor 18, a reflective photointerrupter, uses an LED (light-emitting diode) 211 as a light emitting section. The LED 211 radiates light LT to a detection target 160 that then returns reflected light LR. A phototransistor 212 as a light receiving section receives the reflected light LR. When the disc-shaped recording medium 100 is positioned as specified, light LT reflects thereon and becomes the reflected light LR. The reflected light LR reaches the phototransistor 212 and is received by it. When the detection target 160 is not positioned as specified, light LT does not reflect and therefore is not received by the phototransistor 212. The LED 211 emits light in accordance with a drive current supplied to an anode (A) from the LED drive section 250. The phototransistor 212 is structured as PNP junction, for example. A collector C connects with Vcc via a load resistor (R) 260. Further, the collector C connects with an A/D converter 230 (to be described) and supplies output signals to the A/D converter 230.

When light is applied to the PN junction of the phototransistor 212, a current flows from the base B to the collector C. As mentioned above, when the reflected light LR returns from the disc-shaped recording medium 100 and is applied to the base B, the collector C generates an output signal.

The A/D converter 230 converts the output signal from the collector C into digital data and supplies it to the control section 240. Based on each output data from the three light detection apparatuses 200, the control section 240 determines whether or not the disc-shaped recording medium 100 is mounted on the disc holder, for example.

Figure 5:
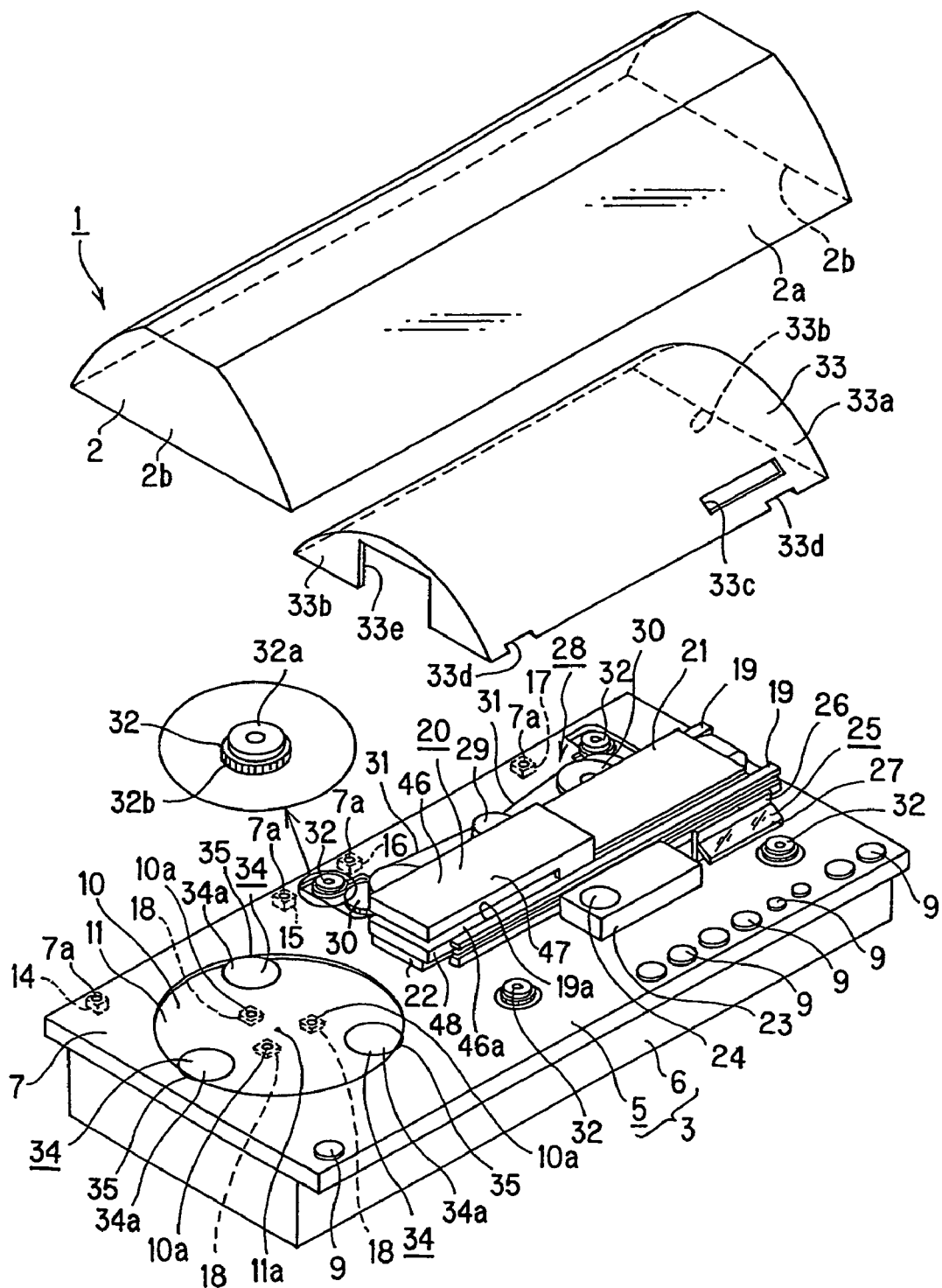
FIG. 5 is a perspective view of a disc drive apparatus with a cover and an inner cover separated.
Figure 6:
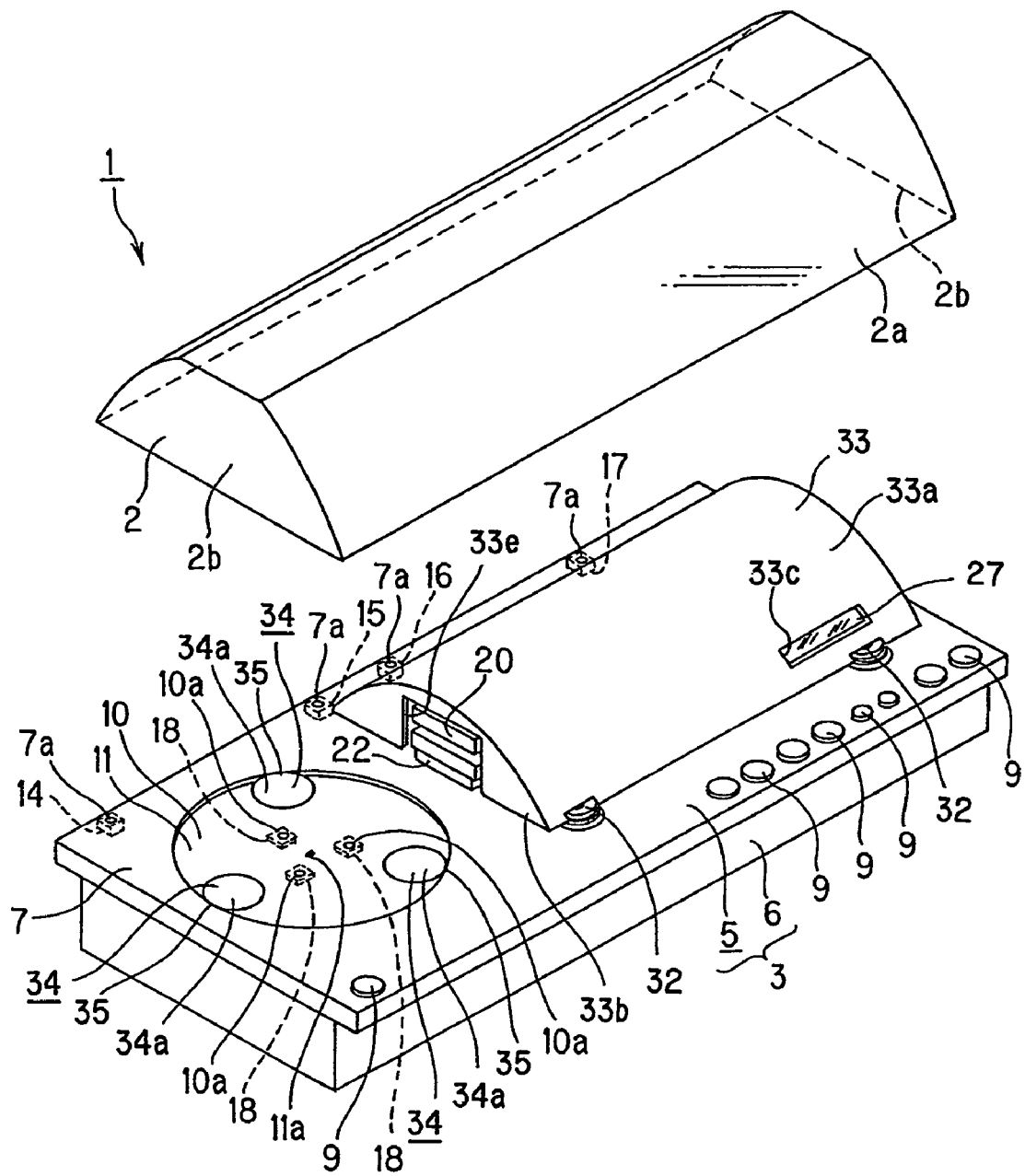
FIG. 6 is a perspective view of the disc drive apparatus with only the cover separated.

The disc drive apparatus 1 has the disc detection apparatus configured as mentioned above. As shown in FIGS. 5 and 6, the disc drive apparatus 1 comprises a cover 2, a base unit 3, and members and mechanisms disposed on the base unit 3. The cover 2 is made of a transparent material such as glass and resin. The cover 2 has an approximately semicylindrical form that extends along one direction and has an opening toward the bottom. The cover 2 comprises a top section 2a formed integrally with side sections 2b. The top section 2a shows a transverse sectional view that is approximately arced. The side sections 2b are provided at both ends of the top section 2a along its longer direction. The following description assumes the front and the rear of the cover 2 along the longer direction. Vertical and horizontal directions are assumed to be orthogonal to the longer direction.

Figure 7:
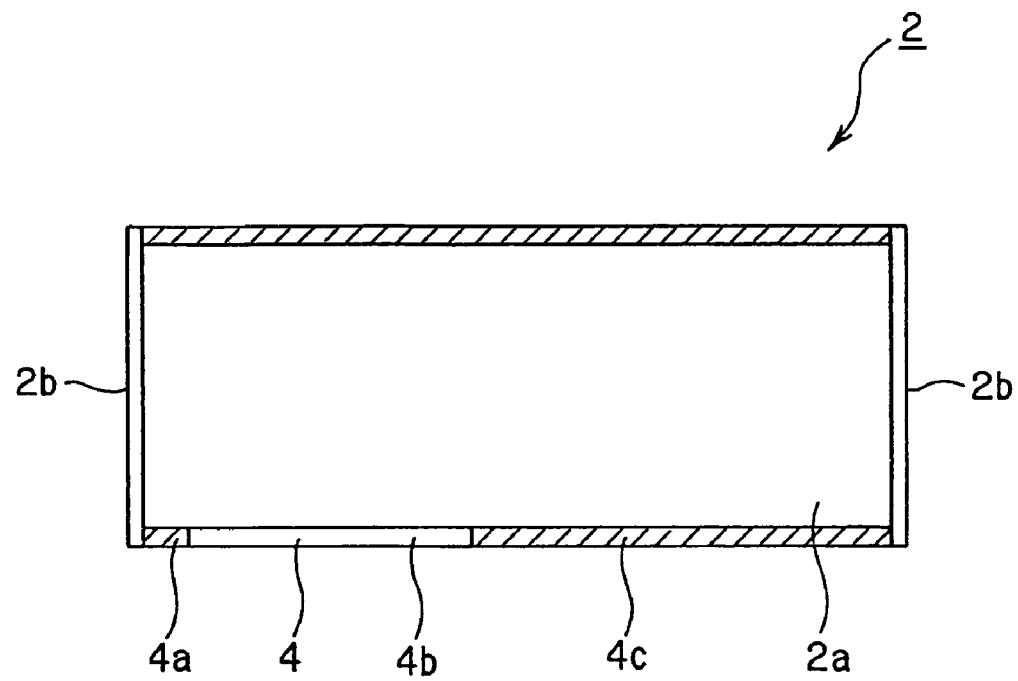
FIG. 7 schematically shows the bottom of the cover.

A detection target 4 is formed on one bottom surface of the cover 2 along the longer direction (see FIG. 7). The detection target 4 comprises a first non-reflective section 4a, a reflective section 4b, and a second non-reflective section 4c from the front. The first non-reflective section 4a is formed at the front end of the detection target 4. The reflective section 4b is formed in continuation with the first non-reflective section 4a approximately up to the center of the detection target 4 along the longer direction. The second non-reflective section 4c is formed up to the rear end of the cover 2 opposite the first non-reflective section 4a. As a result, the reflective section 4b is sandwiched between the first non-reflective section 4a and the second non-reflective section 4c. The reflective section 4b is formed by applying aluminum vapor deposition and the like to the bottom surface of the cover 2. The non-reflective sections 4a and 4c are formed by applying a light absorbing film to the bottom surface of the cover 2. The non-reflective sections 4a and 4c may be formed by applying a light transmitting film to the bottom surface of the cover 2.

As shown in FIGS. 5 and 6, the base unit 3 is formed by coupling a base panel 5 with a bottom panel 6 under the base panel 5. The bottom panel 6 has a top opening and is formed like a long box back and forth.

Figure 8:
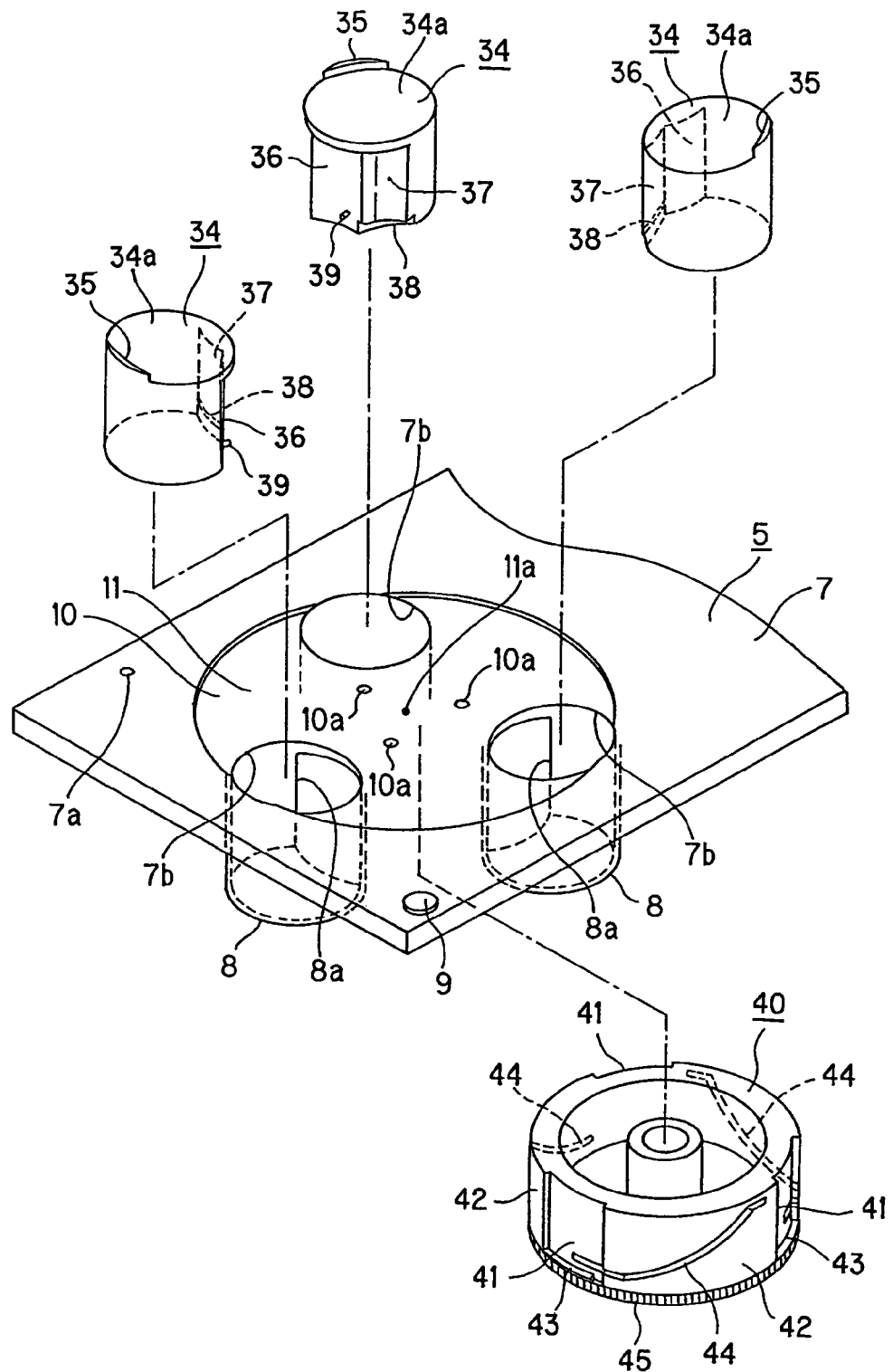
FIG. 8 is an exploded perspective view showing a recording medium mount section, a rotary unit, and a cam member.

As shown in FIG. 8, the base panel 5 comprises a base section 7 formed integrally with supporting cylinder sections 8. The base section 7 is approximately formed like a flat panel. The supporting cylinder sections 8 protrude from the base section 7 toward the bottom.

There are formed four through-oles 7a separately from each other on a left edge of the base section 7 (see FIGS. 5 and 6).

There are formed a plurality of operation buttons 9 separately from each other along the longer direction on a right edge of the base section 7. The operation buttons 9 include, for example, a power button to turn on or off the power, open and close buttons to open and close the cover 2, a play button to reproduce information signals recorded on the disc-shaped recording medium 100, a pause button to temporarily stop the reproduction, a stop button to completely stop the reproduction, and a volume control button to change the volume.

A recording medium mount section 10 is provided at the front end of the base section 7 along the longer direction (see FIGS. 5, 6, and 8).

The recording medium mount section 10 is formed like a shallow recess having a circular shape when viewed from the top. The bottom surface is formed as a disc mounting plane 11. The disc mounting plane 11 is gently concaved, e.g., spherically shaped. Its center point is formed as a reference point 11a that provides the lowest position. The recording medium mount section 10 is formed with vertically bored sensor holes 10a.

The base panel 5 is provided with supporting cylinder sections 8 that protrude from outside peripheral portions of the disc mounting plane 11 to the bottom and have open tops (see FIG. 8). Accordingly, three apertures 7b are formed in the base section 7. The apertures 7b are formed across the disc mounting plane 11 and immediately outside portions. The supporting cylinder sections 8 are provided separately from each other at regular intervals in the circumferential direction. The same distance is maintained between each center axis of the supporting cylinders 8 and the reference point 11a.

The supporting cylinder section 8 comprises a vertically long cylindrical plane section 12 and a closing section 13 to close the bottom aperture of the cylindrical plane section 12. The cylindrical plane section 12 and the closing section 13 are partially cut out toward the reference point 11a to provide a positioning cutout 8a.

Inside the base unit 3, there are provided a first sensor 14, a second sensor 15, a third sensor 16, and a fourth sensor 17 under the through-holes 7a, respectively. The first sensor 14, the second sensor 15, the third sensor 16, and the fourth sensor 17 are reflective optical sensors, for example. These sensors function as detection means for detecting the detection target 4 of the cover 2 and become active when the light receiving section receives detection light emitted from the light emitting section.

Inside the base unit 3, there are provided detection sensors 18 immediately under the sensor holes 10a formed in the recording medium mount section 10. Each detection sensor 18 is included in each light detection apparatus 200. The detection sensor 18 has a function to detect the presence or absence of the disc-shaped recording medium 100. When the disc-shaped recording medium 100 is positioned upward above the disc mounting plane 11, the detection sensors 18 radiate detection light which passes through the sensor holes 10a and is reflected on the disc-shaped recording medium 100. In this manner, the presence of the disc-shaped recording medium 100 is detected.

Specifically, the detection sensor 18 comprises a photointerrupter 20, an optical element 23, and a housing 24 to store the photointerrupter 20 and the optical element 23. The optical element 23 condenses light received and emitted by the photointerrupter 20 corresponding to a specified position of a disc-shaped recording medium D positioned upward above the disc mounting plane 11.

The photointerrupter 20 has a light emitting element 21 comprising an LED (light emitting diode) for example and a light receiving element 22 comprising a phototransistor. The light emitting element 21 emits light from a light emitting plane 21a. A light receiving plane 22a of the light receiving element 22 receives light reflected on a signal recording side Db of the disc-shaped recording medium D. The light emitting plane 21a and the light receiving plane 22a are both stored in the housing 24 toward the sensor holes 10a made in the disc mounting plane 11.

The optical element 23 condenses light emitted from the light emitting element 21 on the signal recording side Db of the disc-shaped recording medium D positioned upward above the disc mounting plane 11. This allows the light receiving element 22 to reliably detect strong reflected light from the disc-shaped recording medium D. The optical element 23 is formed by molding acrylic resin, for example. The optical element 23 can efficiently transmit the light emitted from the light emitting element 21 and the light reflected on the signal recording side Db of the disc-shaped recording medium D. The optical element 23 is stored in the housing 24 above the light emitting plane 21a of the light emitting element 21 and the light receiving plane 22a of the light receiving element 22.

Figure 9:
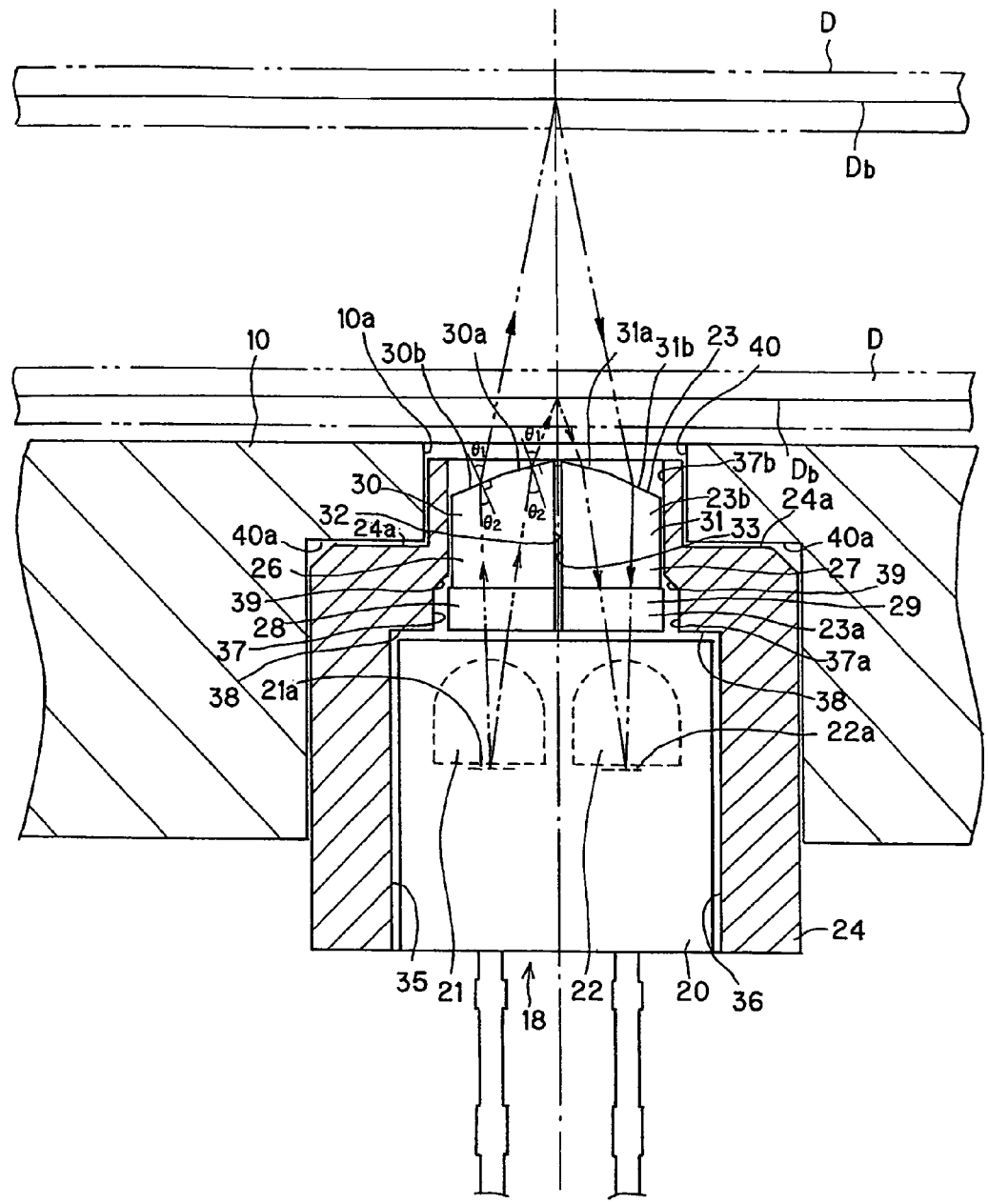
FIG. 9 is a sectional view showing the configuration of the optical detection apparatus.
Figure 10:
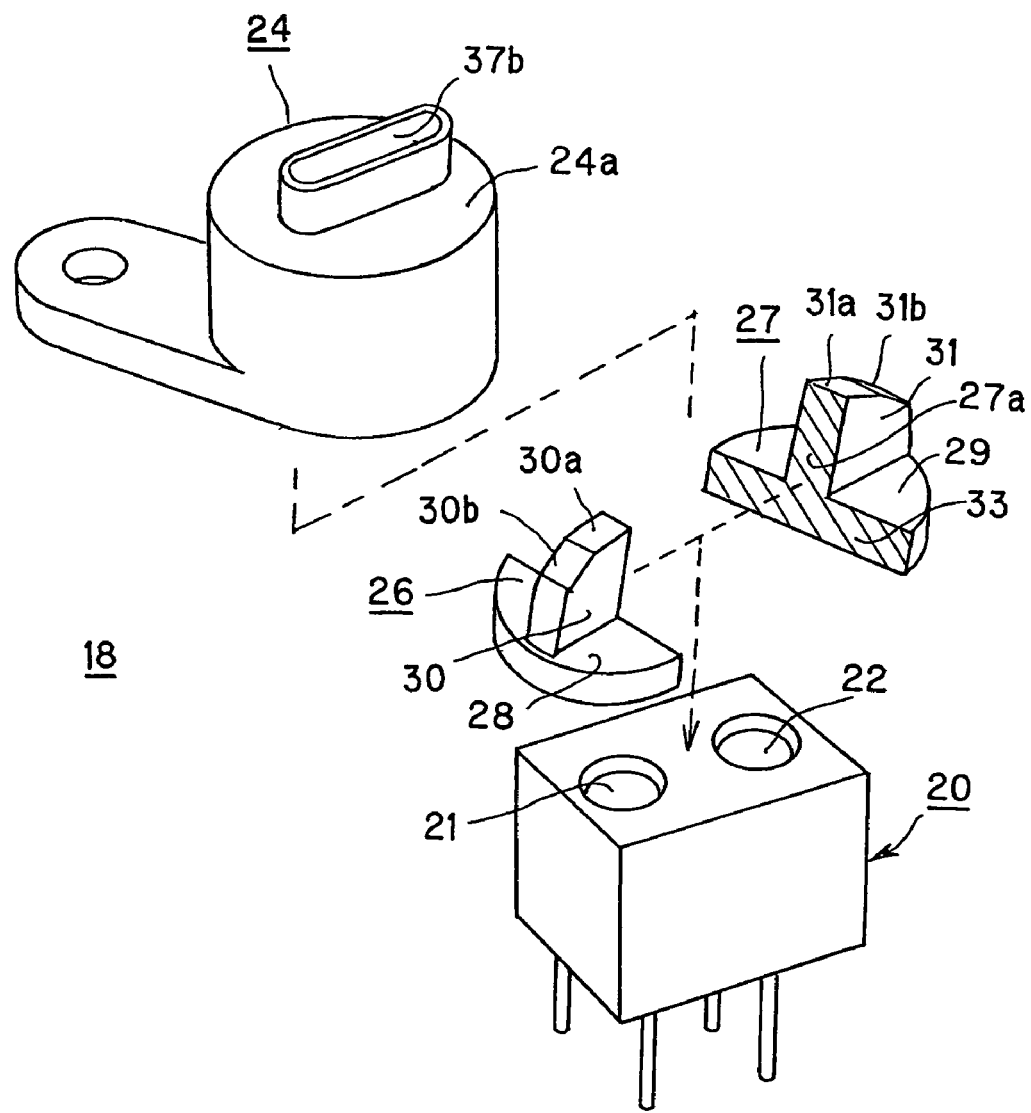
FIG. 10 is an exploded perspective view showing the configuration of the optical detection apparatus.

As shown in FIGS. 9 and 10, the optical element 23 comprises a pair of transmission blocks 26 and 27 that have convex cross sections and butt to each other. In this manner, there are formed an approximately disc-shaped bottom section 23a and a diffracting section 23b that is formed across the radial direction of the bottom section 23a and diffracts the light.

A pair of transmission blocks 26 and 27 consisting the optical element 23 comprise semicircular base sections 28 and 29 and diffracting walls 30 and 31 that are raised from the base sections 28 and 29 and diffract the light. The optical element 23 is disposed on the photointerrupter 20. Accordingly, the diffracting wall 30 is disposed on the light emitting plane 21a of the light emitting element 21. The diffracting wall 31 is disposed on the light emitting plane 22a of the light emitting element 22. There are formed first and second inclined planes 30a and 30b with different tilt angles on the top of the diffracting wall 30. Likewise, there are formed first and second inclined planes 31a and 31b with different tilt angles on the top of the diffracting wall 31.

The first inclined plane 30a of the diffracting wall 30 is so angled that the light emitted from the light emitting element 21 is focused on the signal recording side Db of the disc-shaped recording medium D mounted on the disc mounting plane 11. Therefore, the optical element 23 converges the light emitted from the light emitting element 21 onto the signal recording side Db of the disc-shaped recording medium D mounted on the disc mounting plane 11. Since the strong reflected light is detected, it is possible to reliably detect that the disc-shaped recording medium D is mounted on the disc mounting plane.

The second inclined plane 30b of the diffracting wall 30 is so angled that the light emitted from the light emitting element 21 is focused on the signal recording side Db of the disc-shaped recording medium D transported to the takeout position. Consequently, the optical element 23 converges the light emitted from the light emitting element 21 on the signal recording side Db of the disc-shaped recording medium D transported to the eject position. Since the strong reflected light is detected, it is possible to reliably detect that the disc-shaped recording medium D is held at the eject position.

The first inclined plane 31a of the diffracting wall 31 is so angled that the light reflected on the signal recording side Db of the disc-shaped recording medium D mounted on the disc mounting plane 11 is focused on the light receiving element 22. Therefore, the optical element 23 converges the reflected light from the disc-shaped recording medium D mounted on the disc mounting plane 11 onto the light receiving element 22. It is possible to reliably detect that the disc-shaped recording medium D is mounted on the disc mounting plane 11.

The second inclined plane 31b of the diffracting wall 31 is so angled that the light reflected on the signal recording side Db of the disc-shaped recording medium D transported to the takeout position is focused on the light receiving element 22. Therefore, the optical element 23 converges the reflected light from the disc-shaped recording medium D transported to the eject position onto the light receiving element 22. In this case, the reflected light is emitted from the light emitting element 21. It is possible to reliably detect that the disc-shaped recording medium D is held at the eject position.

Shield sections 32 and 33 are formed on butting planes 26a and 27a of a pair of transmission blocks 26 and 27. The shield sections 32 and 33 prevent irregular reflection of the light received or emitted to the photointerrupter 20. The shield sections 32 and 33 are formed by sticking a nontransparent material such as silver foil to the butting planes 26a and 27a of the transmission blocks 26 and 27 or by applying or depositing the nontransparent material on the butting planes 26a and 27a. When the transmission block 26 transmits light emitted from the light emitting element 21, the shield sections 32 and 33 prevent the transmitted light from entering the transmission block 27. When the transmission block 27 transmits reflected light that converges on the light receiving element 22 and returns from the signal recording side Db of the disc-shaped recording medium D, the shield sections 32 and 33 prevent the reflected light from entering the transmission block 26. When the transmission blocks 26 and 27 transmit the light, the optical element 23 can prevent diffused reflection of the light in the transmission blocks 26 and 27. It is possible to radiate only the light emitted from the light emitting element 21 to the disc-shaped recording medium. It is also possible to allow only the light reflected from the disc-shaped recording medium D to enter the light receiving element 22. In this manner, it is possible to prevent the light intensity from attenuating.

The optical element 23 is disposed on the photointerrupter 20 outside the sensor hole 10a of the recording medium mount section 10. This prevents dust and the like from directly adhering to the light emitting element 21 and the light receiving element 22 of the photointerrupter 20.

The housing 24 is provided with a storage section 35 to store photointerrupter 20 and the optical element 23. Since the storage section 35 is opened toward the bottom, the photointerrupter 20 and the optical element 23 are inserted from the bottom opening. A lower storage section 36 to store the photointerrupter 20 is formed to be rectangular, for example, corresponding to the external case shape of the photointerrupter 20. An upper storage section 37 to store the optical element 23 has a circular storage section 37a and a long-ole storage section 37b. The circular storage section 37a stores base sections 28 and 29 corresponding to the shape of the optical element 23. The long-hole storage section 37b stores the diffracting walls 30 and 31. The top of the storage section 37b is opened so that the diffracting walls 30 and 31 face toward the disc mounting plane 11 from the sensor hole 10. The circular storage section 37a has a smaller diameter than that of the lower storage section 36 that stores the photointerrupter 20. A step section 38 is formed between the circular storage section 37a and the lower storage section 36. The long-ole storage section 37b protrudes from the top 24a of the housing 24. A step section 39 is formed between the long-hole storage section 37b and the circular storage section 37a. Accordingly, the housing 24 stores the photointerrupter 20 and the optical element 23. The external case of the photointerrupter 20 stops at the step section 38. The bottom section 23a of the optical element 23 stops at the step section 39. In this manner, the photointerrupter 20 and the optical element 23 are positioned and stored without too much clearance.

The housing 24 having the above-mentioned configuration is disposed in a recessed section 40 formed below the sensor hole 10a of the recording medium mount section 10. The recessed section 40 is provided with a step section 40a corresponding to the shape of the long-hole storage section 37b protruding from the top 24a of the housing 24. The housing 24 allows the top 24a to stop at the step section 40a and is accordingly disposed in the recessed section 40. The long-hole storage section 37b faces toward the disc mounting plane 11 via the sensor hole 10a.

In the detection sensor 18, the first and second inclined planes 30a, 30b, 31a, and 31b having specified tilt angles are provided for the diffracting walls 30 and 31 formed in the transmission blocks 26 an 27 of the optical element 23. The light emitted from the light emitting element 21 converges corresponding to positions of the disc-shaped recording medium D. Therefore, the detection sensor 18 can most intensely detect the reflected light from the signal recording side Db of the disc-shaped recording medium D when the disc-shaped recording medium D is mounted on the disc mounting plane 11 or is transported to the takeout position by means of rotary units 64 to be described later. The detection sensor 18 can use the reflected light intensity to determine the presence or absence of the disc-shaped recording medium D on the disc mounting plane 11 or at the takeout position.

When acrylic is used as a material for the optical element 23, refractive index n of acrylic to the air is found as n=sin θ1/sin θ2=1.49, where θ1 in FIG. 9 is the light's output angle against the normal line of each of the inclined planes 30a and 30b and θ2 is the light's incidence angle against the normal line of each of the inclined planes 30a and 30b.

The light detection apparatuses 200 are provided with the detection sensors 18 and function as a disc detection apparatus to detect disc-shaped recording media. This aims at determining whether or not the mounting plane 11 of the recording medium mount section 10 is mounted with a disc-shaped recording medium capable of recording or reproduction by the disc drive apparatus 1. The disc drive apparatus 1 is designed for recording or reproduction of disc-shaped recording media with diameter 12 cm, not of different diameter disc-shaped recording media such as those with diameter 8 cm. As will be described later, the disc drive apparatus 1 is not designed for recording or reproduction of noncircular, differently shaped disc-shaped recording media either. The disc detection apparatus can also detect differently shaped disc-shaped recording media. This will be described later.

Figure 11:
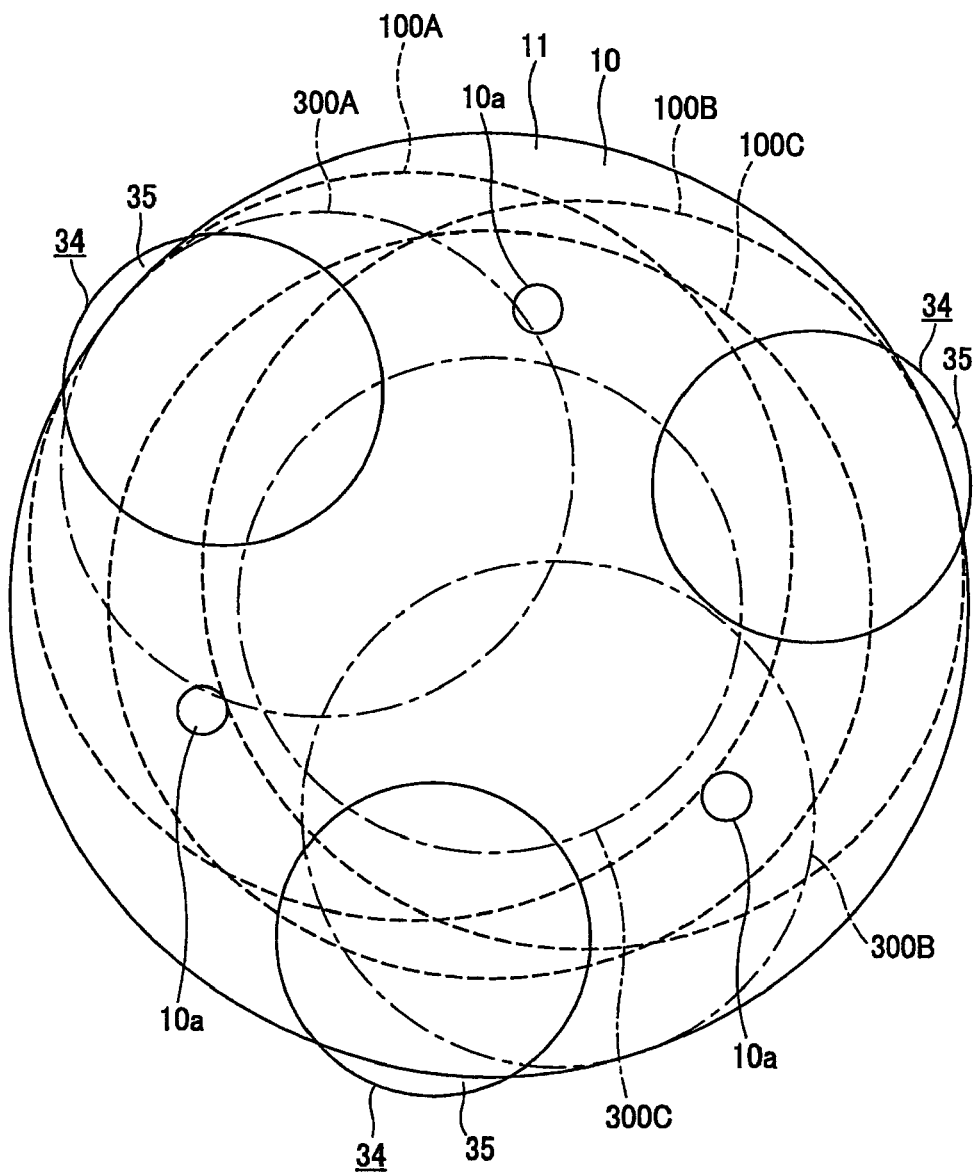
FIG. 11 shows relationship between a mounting plane and sensor holes.

As shown in FIG. 11, the mounting plane 11 of the recording medium mount section 10 is provided with the sensor holes 10a immediately below which the detection sensors 18 are positioned. The sensor holes 10a are positioned so that at least two of them are covered in relation to the concavely shaped recording medium mount section 10 when the disc-shaped recording medium 100 with diameter 12 cm is mounted on the mounting plane 11 of the recording medium mount section 10. The sensor holes 10a are positioned so that at most one of them is covered when the disc-shaped recording medium 300 with diameter 8 cm is mounted on the mounting plane 11.

For example, the disc-shaped recording medium 100 mounted at position 100A covers two sensor holes 10a. The disc-shaped recording medium 100 mounted at position 100B also covers two sensor holes 10a. The disc-shaped recording medium 100 mounted at position 100C covers three sensor holes 10a. The disc-shaped recording medium 300 mounted at position 300A covers no sensor holes 10a. The disc-shaped recording medium mounted at position 300B covers one sensor hole 10a. The disc-shaped recording medium mounted at position 300C covers no sensor holes 10a.

Consequently, when mounted on the mounting plane 11 of the concavely shaped recording medium mount section 10, the disc-shaped recording medium 100 with diameter 12 cm covers at least two sensor holes 1a. At least two of three detection sensors 18 of the disc detection apparatus return responses. When mounted on the mounting plane 11, the disc-shaped recording medium 300 with diameter 8 cm covers at most one sensor hole 10a. Only at most one of three detection sensors 18 of the disc detection apparatus returns a response.

The disc detection apparatus returns at least two responses to detect that the disc-shaped recording medium 100 with diameter 12 cm is mounted on the mounting plane 11. In this case, the disc drive apparatus 1 centers the disc-shaped recording medium 100 and then raises (transports) it.

Rotary units 34 function as transport means to perform centering and transport operations. The rotary units 34 have gently curved top surfaces corresponding to the mounting plane 11 of the recording medium mount section 10. One end of the top of each rotary unit 34 is raised upward to provide a disc centering section 35.

Figure 12:
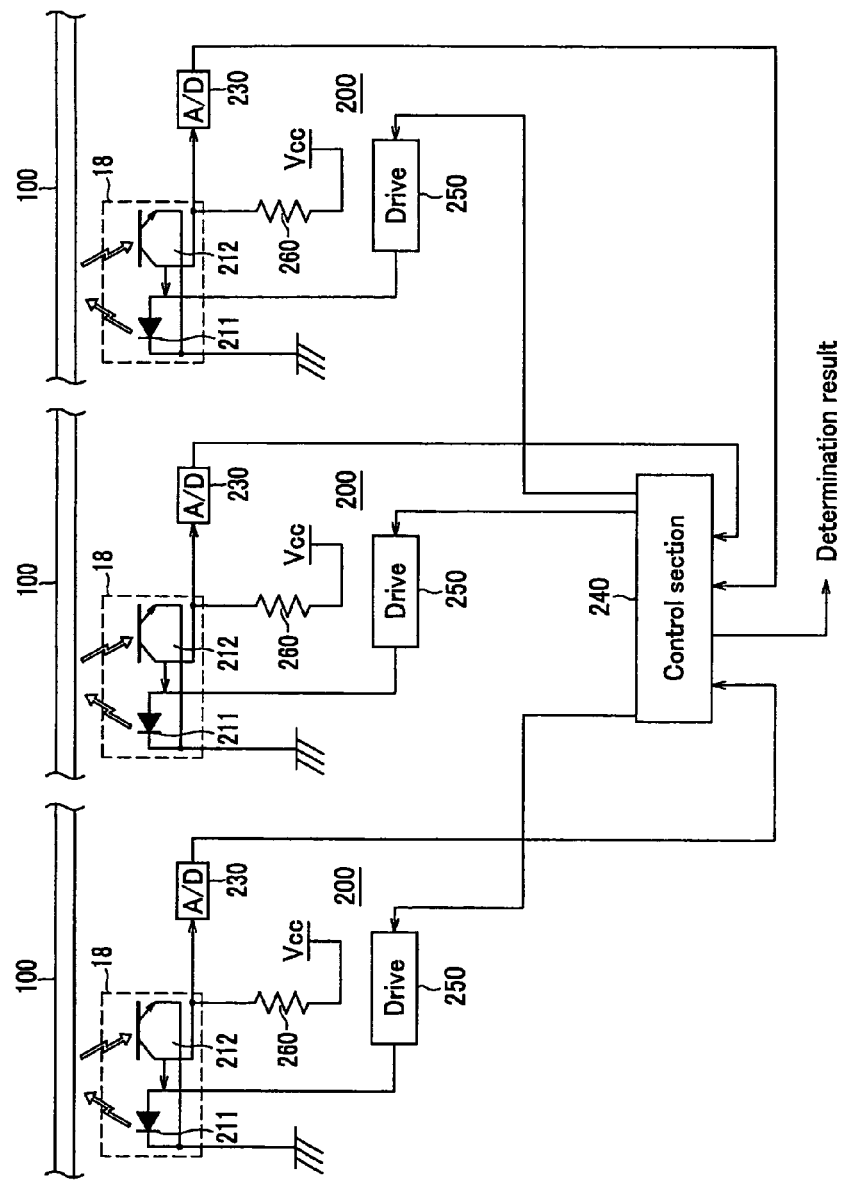
FIG. 12 is a configuration diagram showing the disc detection apparatus comprising three optical detection apparatuses.

As mentioned above, the detection sensor 18 is a reflective photointerrupter, for example. The LED 211 and the phototransistor 212 are disposed immediately under the sensor holes 10a. As shown in FIG. 12, the disc drive apparatus 1 constructs the disc detection apparatus having three light detection apparatuses 200 each comprising the detection sensor 18, an A/D conversion section 230, a control section 240, and an LED drive section 250.

The control section 240 is used in common with the three light detection apparatuses 200. The control section 240 controls each LED 211 via each LED drive section 250. The control section 240 is supplied with detection data from each A/D conversion section 230 to determine the presence or absence of a disc-shaped recording medium.

Two parallel guide members 19 are provided on the top of the base section 7 of the base unit 3 (see FIG. 5). The guide members 19 are provided at the rear end of the base section 7 and are lengthwise formed in the longer direction of the base unit 7. The guide members 19 have planes facing to each other. Each plane has a guide groove (not shown) that extends along the longer direction.

There is a space between the guide members 19. An approximately half of the space toward the recording medium mount section 10 is formed as a unit seating section 19a. The unit seating section 19a is configured to be capable of seating the base unit 20. A control board 21 is disposed between the guide members 19 adjacently to the unit seating section 19a and opposite the recording medium mount section 10. The control board 21 controls operations of the base unit 20.

The base unit 20 and the control board 21 are placed on an alignment base 22 thereunder. The alignment base 22 is lengthwise formed back and forth and is provided with sidewise protruding guided pins (not shown) on the left and right sides. Since the guided pins slidably fit into the guide grooves of the guide members 19, the alignment base 22 is guided by the guide members 19 so as to be movable back and forth. A rack section (not shown) is formed on the right side of the alignment base 22.

The base panel 5 is provided with a unit drive section 23 to the right of the right guide member 19. The unit drive section 23 has a drive motor 24 and a deceleration gear group (not shown) that is rotated by drive force transmitted from the drive motor 24. The last gear of the deceleration gear group engages with the rack section of the alignment base 22. Therefore, when the drive motor 24 rotates, the drive force is transmitted to the rack section of the alignment base 22 via the deceleration gear group. The alignment base 22, the base unit 20, and the control board 21 together move back and forth in accordance with the rotation direction of the drive motor 24.

On the base panel 5, a display drive section 25 is disposed at the rear of the unit drive section 23. The display drive section 25 has a control circuit board 26 and a display section 27 to display operation states and the like of each part.

The base panel 5 is provided with a cover drive section 28 to the left of the left guide member 19. The cover drive section 28 has a transport motor 29 and a deceleration gear groups 30 that are rotated by drive force transmitted from the transport motor 29. The deceleration gear groups 30 are provided along the longer direction by sandwiching the transport motor 29.

The transport motor 29 and the deceleration gear groups 30 are provided with pulleys (not shown). Belts 31 are used to link the pulley of the transport motor 29 with the pulleys of the deceleration gear groups 30. When the transport motor 29 rotates, its drive force is transmitted to the deceleration gear groups 30 via the belts 31. The deceleration gear groups 30 rotate in the direction synchronous with the rotation direction of the transport motor 29.

Gear units 32 are rotatively supported on the base panel 5. Two gear units 32 are provided on each of the left and right ends of the base panel 5. Each gear unit 32 comprises a roller 32a above and a gear 32b below. The rollers 32a are made of materials with high friction coefficients such as rubber.

The gears 32b of the gear units 32 on the left engage with the last gears of the deceleration gear groups 30.

When the cover 2 is attached to the base panel 5, the gear units 32 allow the rollers 32a to be pressed against the bottom inside the top section 2a of the cover 2 on both sides. Accordingly, a drive force of the transport motor 29 is transmitted to the gear units 32 on the left via the deceleration gear groups 30. Then, the cover 2 moves in the direction in accordance with the rotation direction of the transport motor 29.

An inner cover 33 is disposed inside the cover 2. The inner cover 33 is made of an opaque material such as resin. The inner cover 33 has an opening toward the bottom and is formed to be an approximately semicylindrical shape that extends back and forth. The inner cover 33 comprises a closing section 33a formed integrally with side walls 33b. The closing section 33a shows a transverse sectional view that is approximately arced. The side walls 33b are provided at both ends of the closing section 33a along its longer direction. A through-ole 33c is formed at the rear of the closing section 33a. The bottom of the closing section 33a has left and right (two) positioning cutouts 33d at the front and the rear separately. The front side wall 33b has a cutout toward the bottom. The cutout is formed as an entry/exit 33e.

The inner cover 33 is attached to the base panel 5 so as to enclose the guide members 19, the base unit 20, the control board 21, the alignment base 22, the unit drive section 23, the display drive section 25, and the cover drive section 28. When the inner cover 33 is attached to the base panel 5, the display section 27 of the display drive section 25 is positioned corresponding to the through-hole 33c so that the content of the display section 27 is visible from the outside. When the inner cover 33 is attached to the base panel 5, the positioning cutouts 33d are positioned corresponding to the gear units 32. The gear units 32 partially protrude from the inner cover 33 toward the outside. The base unit 20 can move toward the front through the entry/exit 33e of the inner cover 33.

The rotary units 34 are rotatively supported in the supporting cylinder sections 8 of the base panel 5 (see FIG. 8). The rotary units 34 provide functions of centering and raising the disc-shaped recording medium 100.

The rotary unit 34 is formed to be approximately columnar. A top plane 34a is gently curved so as to correspond to the disc mounting plane 11 of the base panel 5. An upward protruding disc centering section 35 is provided at an edge of the top plane 34a of the rotary unit 34. The disc centering section 35 is formed corresponding to a portion of the aperture 7b in the base section 7 so as to be continuous with an outmost portion of the disc mounting plane 11.

The periphery of the rotary unit 34 is cut out except the top. By means of the cutout, the rotary unit 34 is formed with a first Geneva plane 36 and a pressed plane 37 so as to be continuous with the peripheral direction. The first Geneva plane 36 is formed to be concavely circular. The pressed plane 37 is formed to be a curved surface having a specified shape. The bottom of the pressed plane 37 is further cut out inward to form a second Geneva plane 38.

The rotary unit 34 is provided with a slide pin 39 protruding from the bottom of the first Geneva plane 36.

The rotary units 34 are inserted into the supporting cylinders 8 from the tops and are rotatively supported (see FIGS. 5 and 6).

Figure 13:
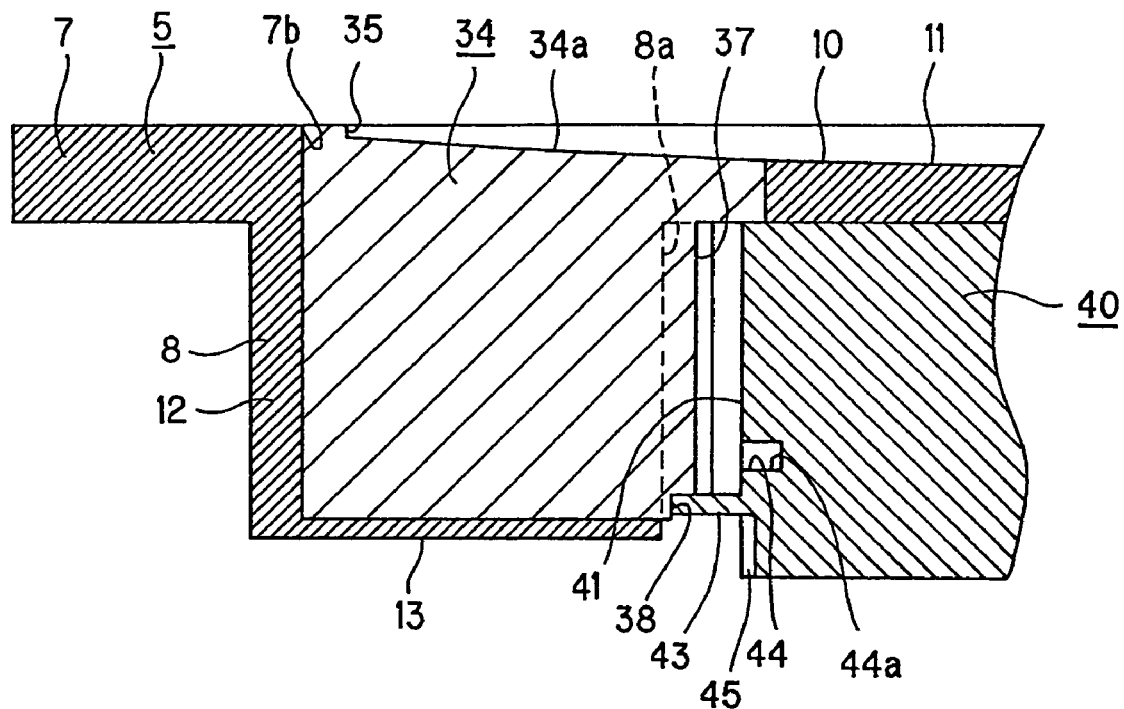
FIG. 13 is an exploded perspective view showing relationship between the rotary unit and the cam member.

Let us assume that the rotary units 34 are supported by the supporting cylinders 8 and that the disc centering sections 35 are positioned to portions of the base panel 5 corresponding to outmost portions of the disc mounting plane 11. In this case, as shown in FIG. 13, the disc mounting plane 11 of the base panel 5 adjoins the top planes 34a of the rotary units 34 to form a curve surface.

A cam member 40 is rotatively supported under the base section 7 of the base panel 5 (see FIG. 8). The cam member 40 is formed to be approximately columnar.

Figure 14:
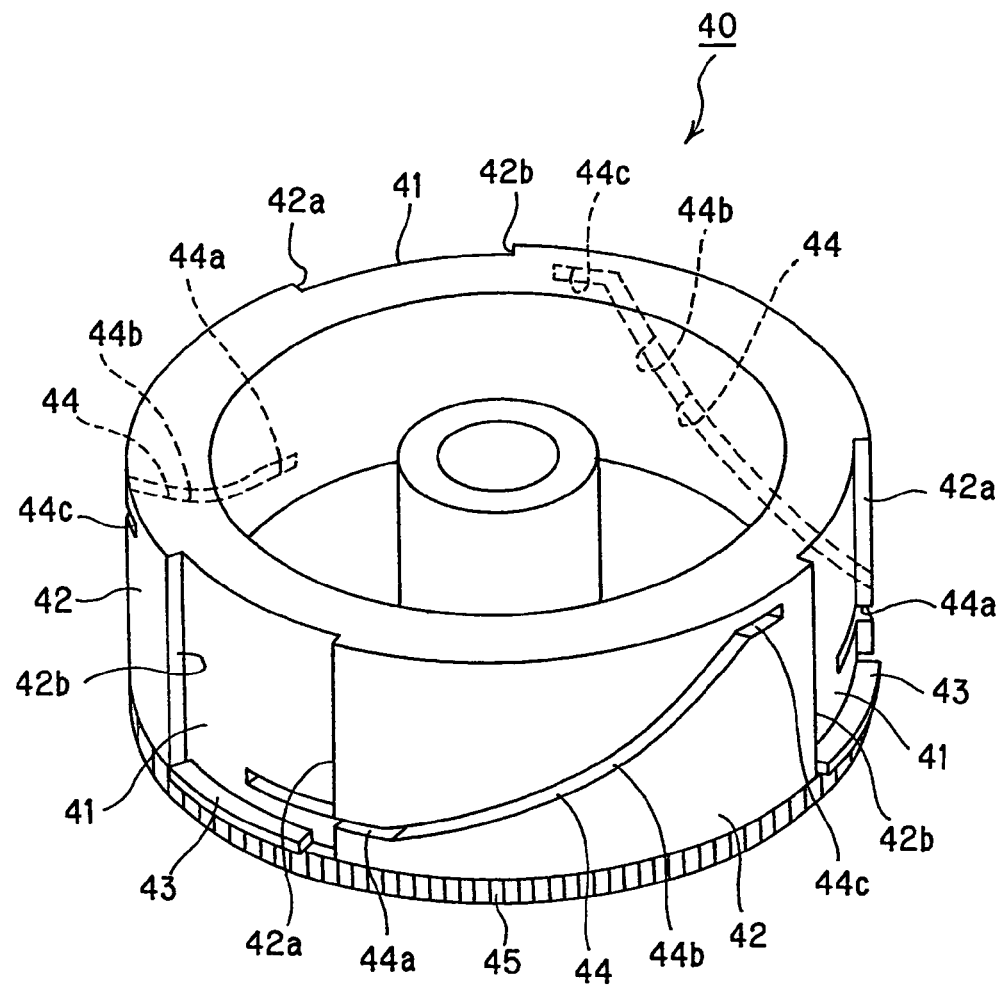
FIG. 14 is an enlarged perspective view of the cam member.

Three recessed sections 41 are formed on the periphery of the cam member 40 (see FIG. 14). Outside surfaces of the recessed sections 41 are formed to be externally protruding arcs. Except the recessed sections 41, peripheral surfaces of the cam member 40 are formed as outside peripheral surface sections 42.

Since the recessed sections 41 are formed around the cam member 40, there are formed two step sections apart from each other along the peripheral direction between each of the recessed sections 41 and each of the outside peripheral surface sections 42. Of the two step sections, one is provided as a group of first pressing sections 42a and the other is provided as a group of second pressing sections 42b.

There are provided protruding pieces 43 each formed into an externally protruding arc at the bottoms of the recessed sections 41 around the cam member 40. Outside surfaces of the protruding pieces 43 are formed into externally protruding arcs. Outside surfaces of the protruding pieces 43 are positioned slightly more outward than the outside peripheral surface sections 42.

Around the cam member 40, cam grooves 44 are formed apart from each other with equal intervals along the peripheral direction. The cam groove 44 comprises a lower horizontal section 44a, a slope section 44b that slopes upward from the lower horizontal section 44a, and an upper horizontal section 44c continuous with the slope section 44b. The lower horizontal section 44a is formed across the recessed section 41 and the outside peripheral surface section 42. The slope section 44b and the upper horizontal section 44c are formed on the outside peripheral surface section 42. The bottom end of the cam member 40 is provided with a gear 45 that extends in the peripheral direction. The cam member 40 is rotatively supported on the base panel 5 via a support shaft (not shown).

When the cam member 40 is supported on the base panel 5, the outside periphery of the cam member 40 is positioned corresponding to the positioning cutouts 8a. When a drive force from an operating motor (not shown) is transmitted to the gear 45, the cam member 40 rotates in the direction corresponding to the rotation direction of the operating motor.

The base unit 20 comprises a case 46 in which required parts are disposed or supported. The case 46 comprises an upper case 47 and a bottom case 48 that are coupled to each other vertically (see FIGS. 5 and 15).

The upper case 47 is formed like an approximate rectangular box that has an opening downward and extends back and forth. The upper case 47 comprises a top plate section 47a, a peripheral section 47b, and a protruding section 47c that are formed integrally. The peripheral section 47b protrudes downward from the periphery of the top plate section 47a. The protruding section 47c further protrudes from the peripheral section 47b and is provided at the rear end. Accordingly, the upper case 47 has a cutout 47d as high as the protruding section 47c. The cutout 47d corresponds to a part of the upper case 47 where the protruding section 47c is not provided.

A first detection switch 49 is disposed on a downward plane of the top plate section 47a of the upper case 47. A positioning shaft 47e protrudes downward from the downward plane of the top plate section 47a.

The bottom case 48 is formed like an approximate rectangular, shallow box that extends back and forth. The bottom case 48 comprises a bottom wall section 48a and a peripheral side wall section 48b protruding upward from the periphery of the bottom wall section 48a to provide an upward opening. A spindle motor 50 is disposed in the bottom case at the front.

In the bottom case 48, an optical pickup 51 is rotatively supported along the longer direction of the bottom case 48. Guided sections 51b and 51c are respectively provided at right and left ends of a moving base 51a of the optical pickup 51.

In the bottom case 48, there are disposed a stepping motor 52 and a lead screw 53 that is rotated by the stepping motor 52. The lead screw 53 is screwed into the guided section 51c of the optical pickup 51. When the stepping motor 52 rotates, the moving base 51a moves in the direction corresponding to the rotation direction. The optical pickup 51 accordingly moves back and forth.

A positioning cylinder 54 protrudes upward and is provided toward the rear end of the bottom wall section 48a of the bottom case.

The upper case 47 is coupled to the bottom case 48, for example, through screws to constitute the case 46 so that the downward plane of the protruding section 47c contacts with the top plane of the peripheral side wall section 48b. When the case 46 is constituted, an insertion space 46a to insert disc-shaped recording medium 100 is formed between the upper case 47 and the bottom case 48 corresponding to the cutout 47d of the upper case 47 (see FIG. 15).

Figure 15:
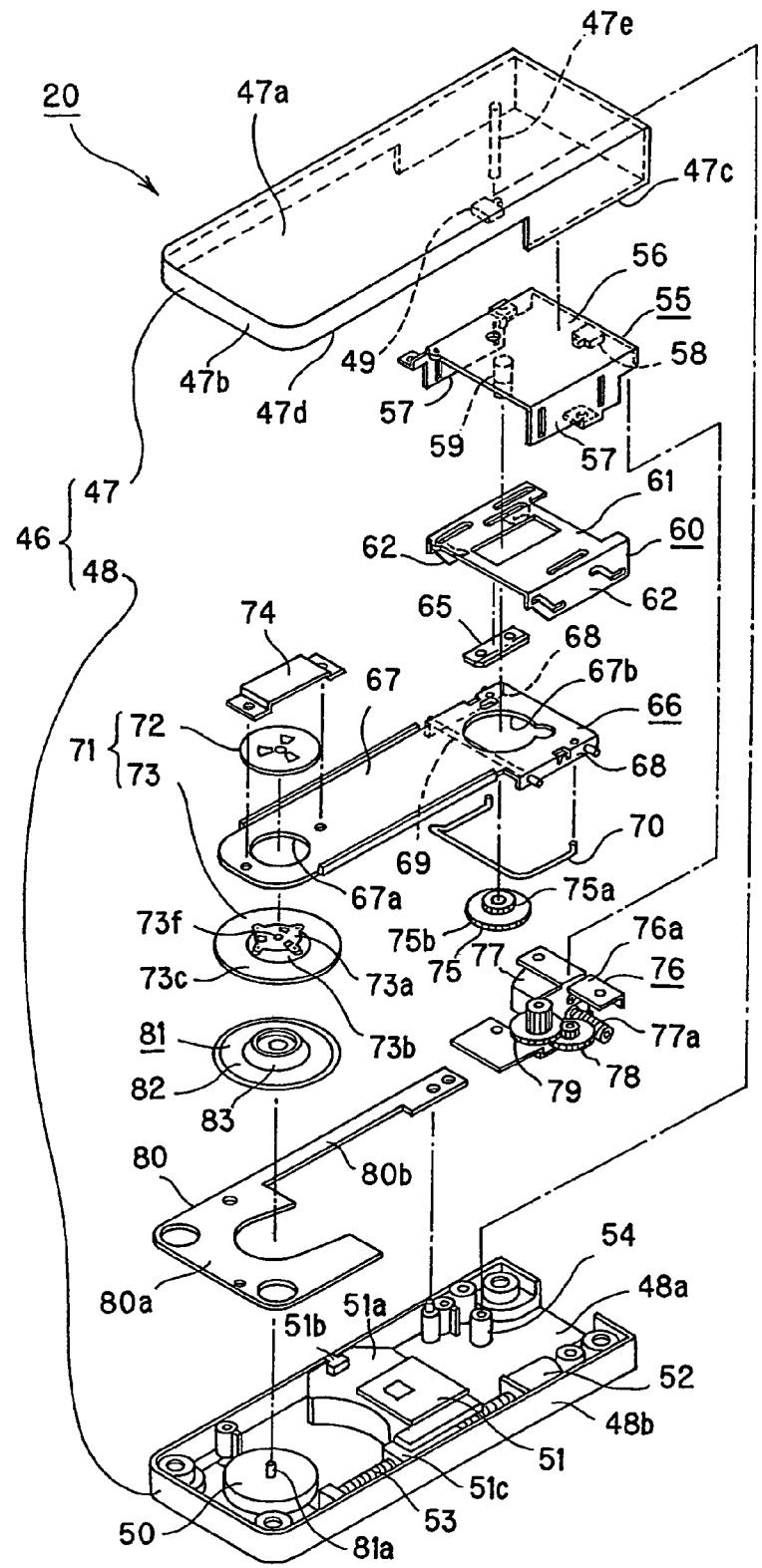
FIG. 15 is an exploded perspective view of a base unit.
Figure 16:
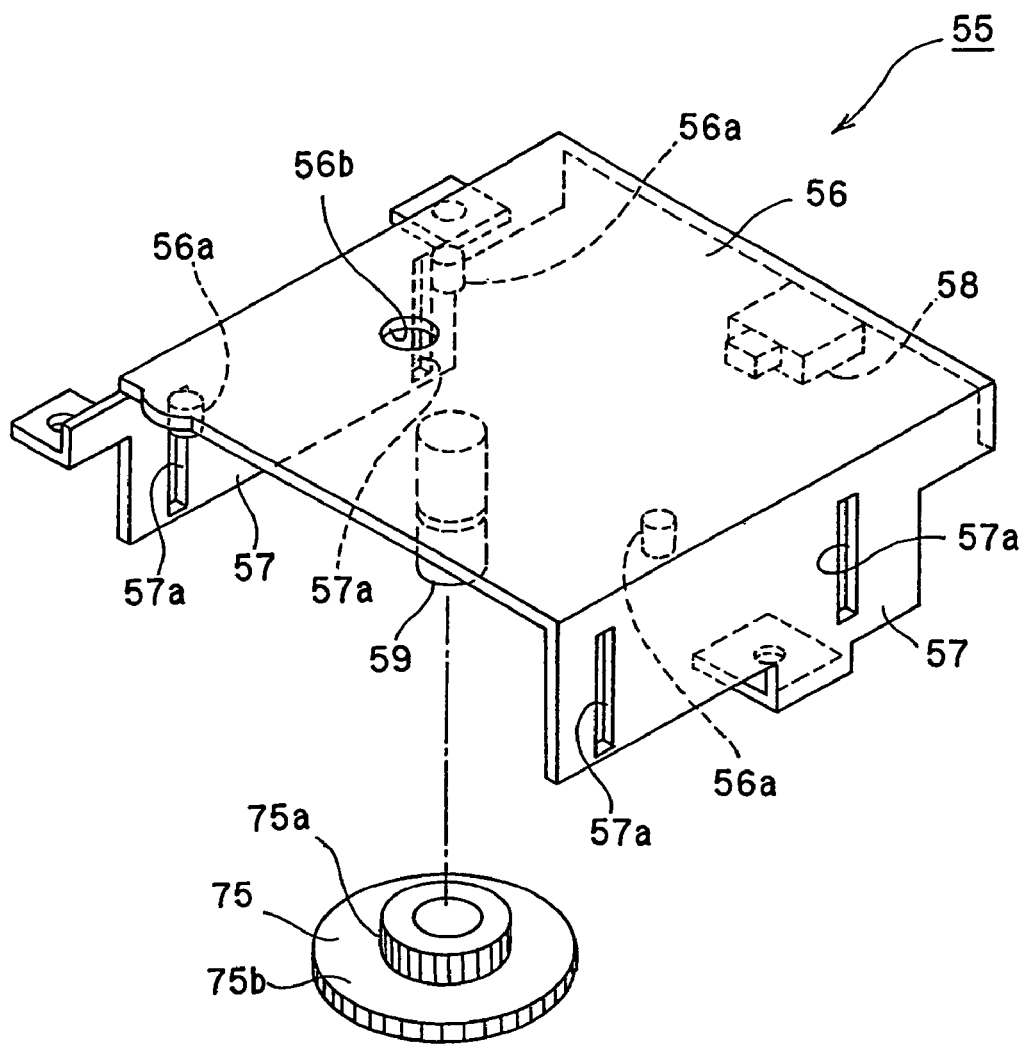
FIG. 16 is an enlarged perspective view showing a guide member and a drive gear.

A guide member 55 is attached to the downward plane of the upper case 47 (see FIG. 15). As shown in FIG. 16, the guide member 55 is integrally formed with a flat plate section 56 and side plate sections 57 protruding downward from the left and right edges of the flat plate section 56.

A second detection switch 58 is attached to the downward plane of the flat plate section 56 at the rear end. Downward protruding guide pins 56a are provided on the downward plane of the flat plate section 56. The flat plate section 56 is provided with a gear support shaft 59. The gear support shaft 59 downward protrudes from the downward plane of the flat plate section 56. The flat plate section 56 is provided with a gear support shaft 59. The gear support shaft 59 downward protrudes from the downward plane of the flat plate section 56. A shaft insertion hole 56b is formed in the flat plate section 56.

Two guide holes 57a are formed in each of the side plate sections 57 at the front and the rear separately. The guide holes 57a are vertically long.

Figure 17:
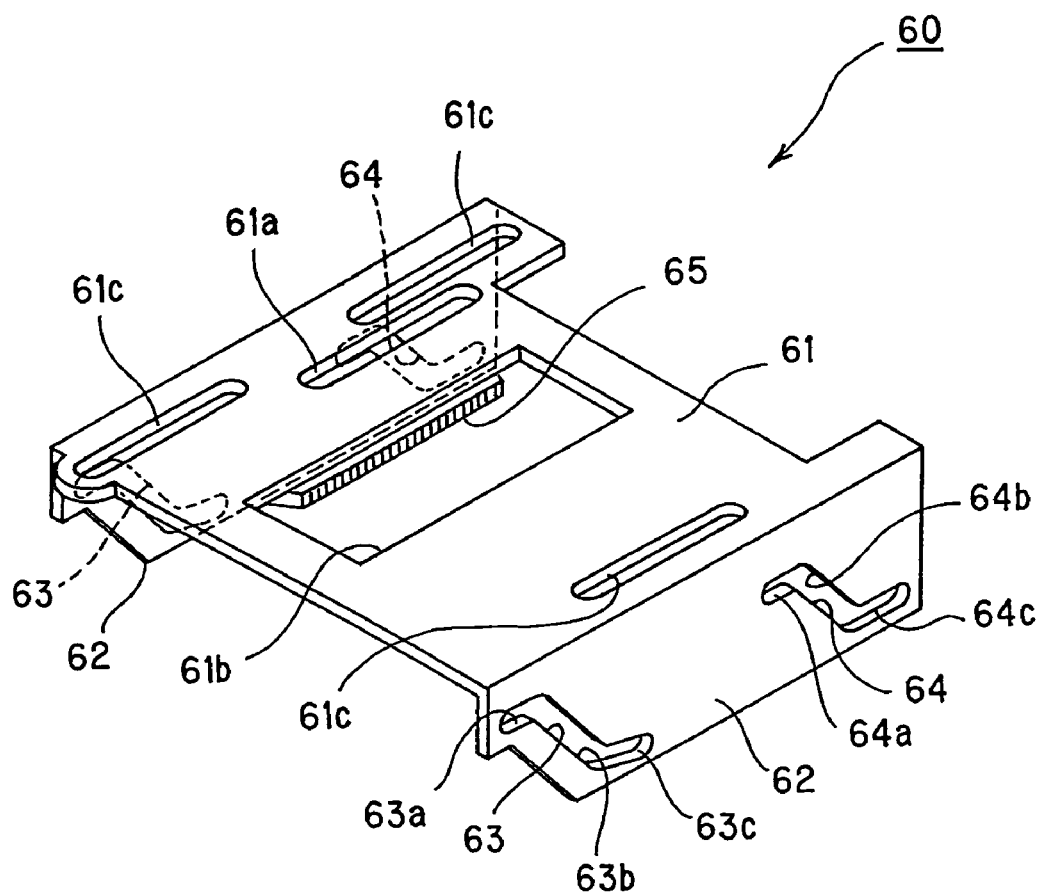
FIG. 17 is an enlarged perspective view showing a cam slider.

A cam slider 60 is supported in the guide member 55 (see FIG. 15) so as to be moveable back and forth. As shown in FIG. 17, the cam slider 60 is integrally formed with a flat plate section 61 and side plate sections 62 protruding downward from the left and right edges of the flat plate section 61.

A first relief hole 61a and a second relief hole 61b are formed apart from each other right and left in the flat plate section 61. The first relief hole 61a and the second relief hole 61b are long back and forth. Guide holes 61c are formed in the flat plate section 61 at the left and right ends.

Figure 18:
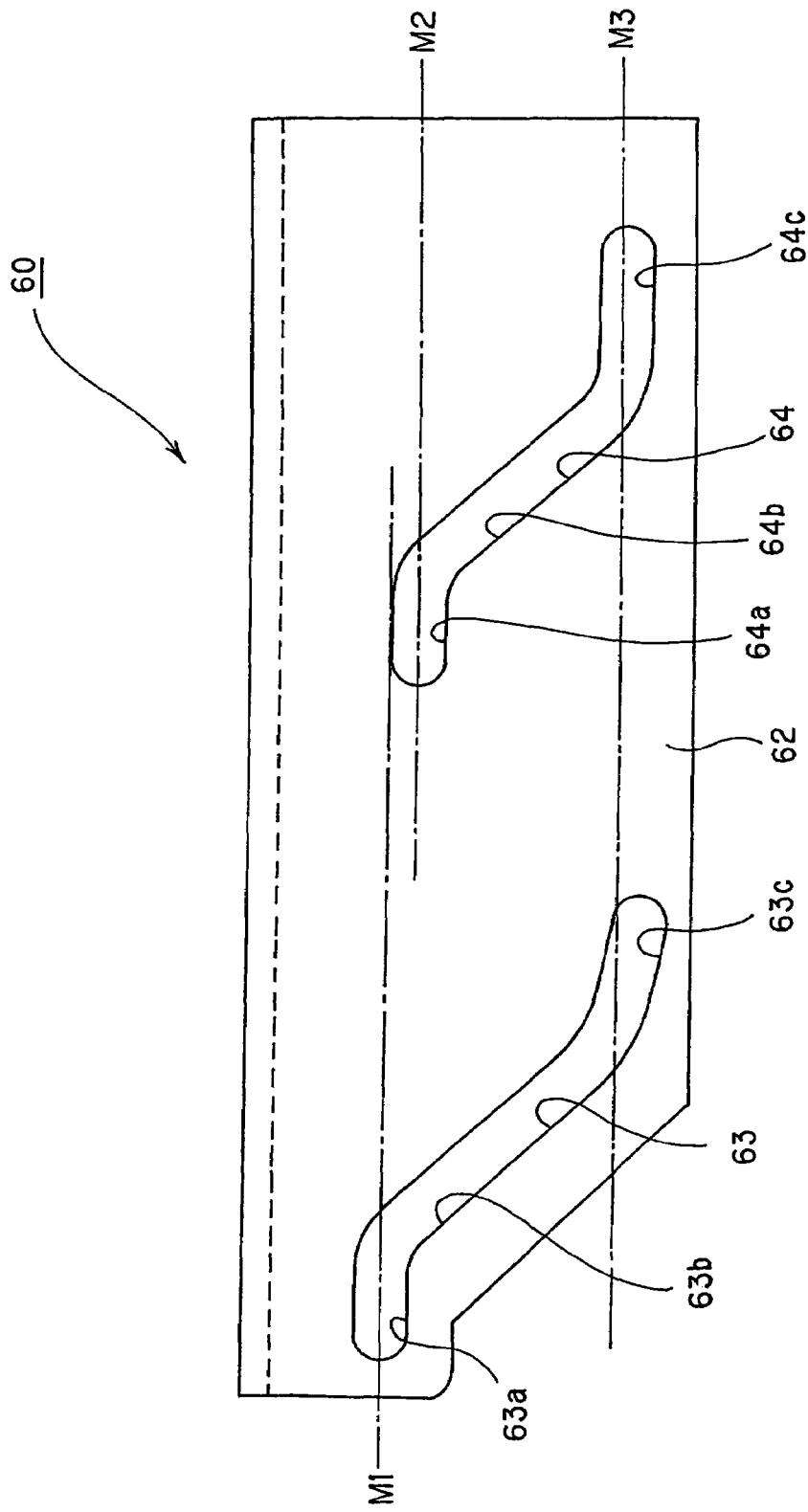
FIG. 18 is an enlarged side view of the cam slider.

Front cam holes 63 and rear cam holes 64 are formed apart from each other back and forth in the side plate sections 62 (see FIGS. 17 and 18). The front cam hole 63 comprises a horizontal section 63a extending back and forth, a slope section 63b, and an acting section 63c. The slope section 63b is continuous with the rear of the horizontal section 63a and slopes downward toward the rear end. The acting section 63c is continuous with the rear of the slope section 63b and gently slopes downward toward the rear end. Therefore, the acting section 63c forms a smaller angle than the slope section 63b against the horizontal section 63a. The rear cam hole 64 comprises a horizontal section 64a extending back and forth, a slope section 64b, and an acting section 64c. The slope section 64b is continuous with the rear of the horizontal section 64a and slopes downward toward the rear end. The acting section 64c is continuous with the rear of the slope section 64b and extends back and forth.

The horizontal sections 63a of the front cam holes 63 are positioned slightly above the horizontal sections 64a of the rear cam holes 64. Accordingly, as shown in FIG. 18, a median line M1 for the horizontal sections 63a in the height direction is higher than a median line M2 for the horizontal sections 64a in the height direction.

As mentioned above, the acting sections 63c of the front cam holes 63 gently slope so as to lower toward the rear end. The front ends of the acting sections 63C are level with the acting sections 64c of the rear cam holes 64. Therefore, as shown in FIG. 18, the rear ends of the acting sections 63c are lower than a median line M3 for the acting sections 64c in the height direction.

With respect to the cam slider 60, a rack member 65 is attached to the downward plane of the flat plate section 61 (see FIGS. 15 and 17).

Figure 19:
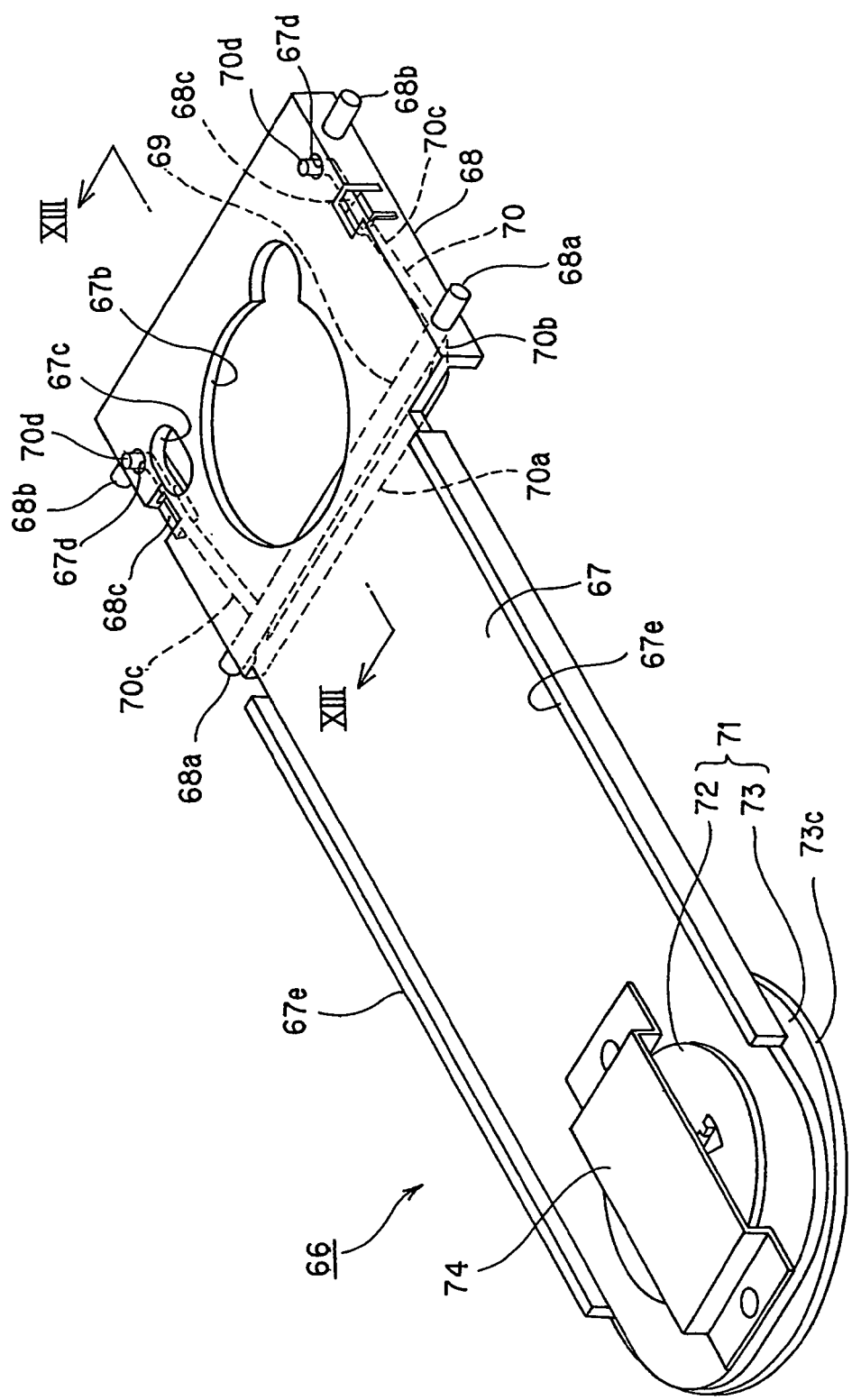
FIG. 19 is an enlarged perspective view showing a support arm and a chucking pulley.

The cam slider 60 and the guide member 55 support a support arm 66 (see FIG. 15). As shown in FIG. 19, the support arm 66 integrally formed with an arm plate 67 lengthwise back and forth and side plates 68 protruding downward from the left and right edges of the arm plate 67 at the rear end.

A support hole 67a is formed at the front end of the arm plate 67 and a gear hole 67b is formed at the rear end thereof. A shaft hole 67c is formed near the gear hole 67b in the arm plate 67. Spring support holes 67d are formed at the left and right edges of the arm plate 67 toward the rear end.

Reinforcement ribs 67e are provided on the arm plate 67 except the front and rear ends. The reinforcement ribs 67e are provided at the left and right edges of the arm plate 67 and is formed by partially bending the arm plate 67 upward at right angles.

The side plates 68 are provided with supported shafts 68a and 68b that protrude outward and are positioned apart from each other back and forth. Between the side plates 68, there is provided a coupling shaft 69 to couple between the supported shafts 68a positioned at the front. Therefore, the coupling shaft 69 is positioned between inside planes of the side plates 68.

Top edges of the side plates 68 are provided with spring support pieces 68c. The spring support pieces 68c are formed by partially bending the side plates 68 inward. A given spacing is formed between the spring support pieces 68c and the arm plate 67 (see FIG. 19).

Figure 21:
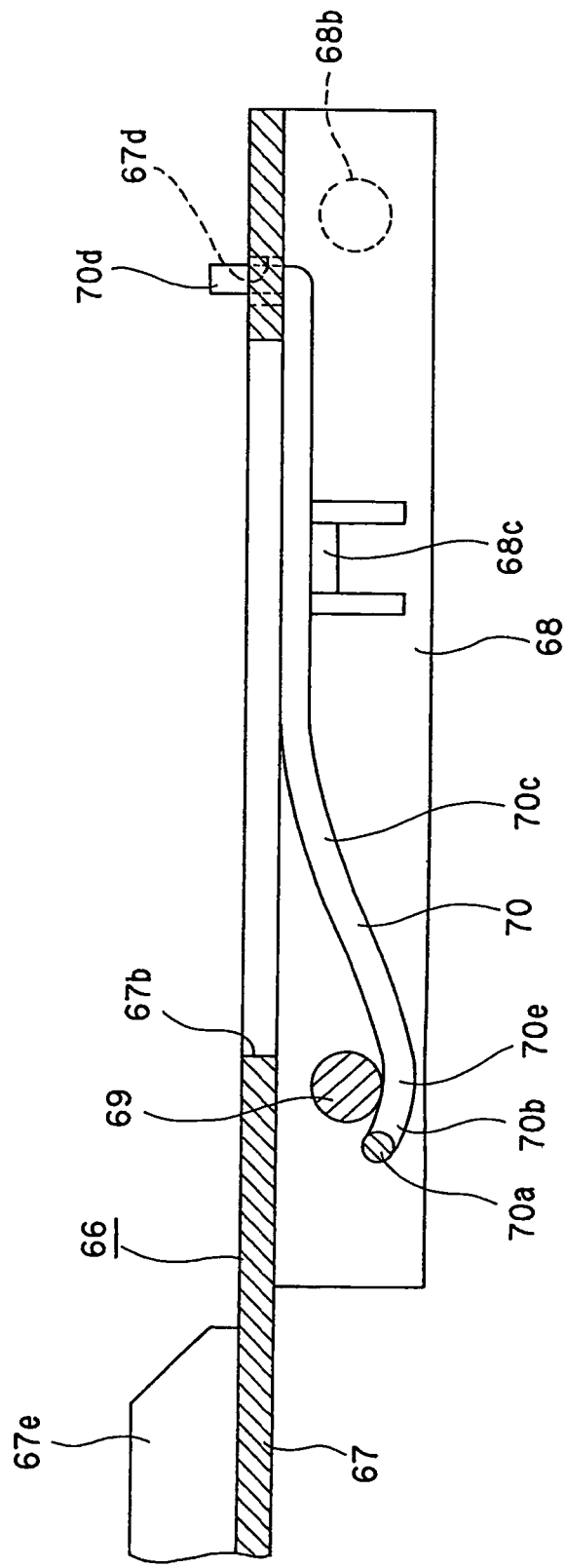
FIG. 21 is an enlarged sectional view taken along the line XIII-XIII of FIG. 20.

The support arm 66 supports the wire spring 70 (see FIGS. 15, 19, and 21). The wire spring 70 is integrally formed with a base section 70a, front bent sections 70b, rear bent sections 70c, and supported sections 70d. The base section 70a is long left and right. The front bent sections 70b protrude approximately backward from the left and right ends of the base section 70a. The rear bent sections 70c protrude approximately backward from the rear ends of the front bent sections 70b. The supported sections 70d protrude upward from the rear ends of the rear bent sections 70c. Elastically contacting sections 70e are formed by slightly bending connecting portions between the front bent sections 70b and the rear bent sections 70c.

The supported sections 70d of the wire spring 70 are inserted into the spring support holes 67d of the arm plate 67. Portions of the rear bent sections 70c toward the rear ends are inserted between the spring support pieces 68c and the arm plate 67. The elastically contacting section 70e elastically contact with the coupling shaft 69 from under to be supported by the support arm 66.

Figure 20:
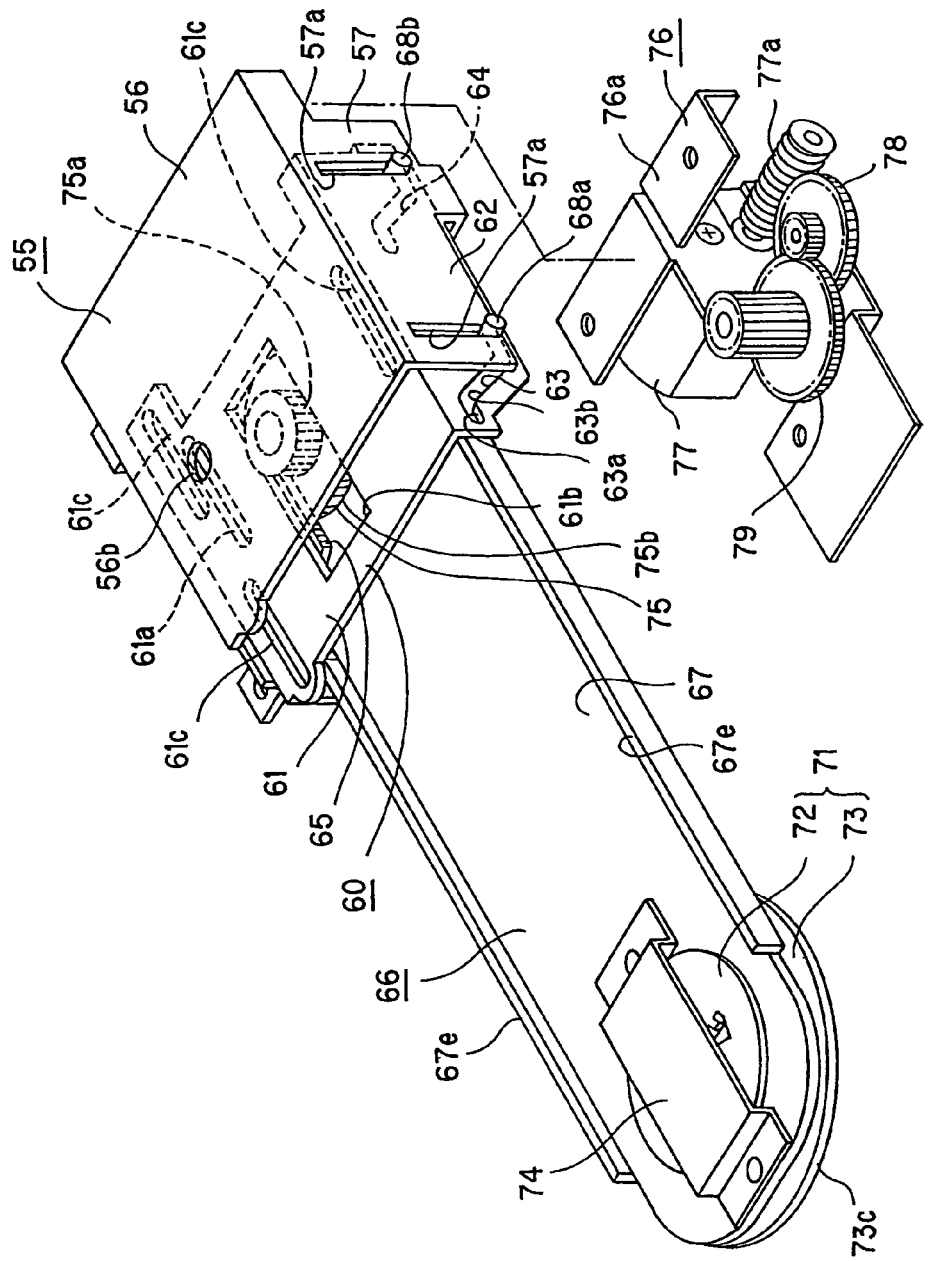
FIG. 20 is an enlarged perspective view showing the support arm supported by the guide member and the cam slider with a drive unit separated.

The support arm 66 is supported as shown in FIG. 20. That is to say, the supported shafts 68a at the front are inserted into the front cam holes 63 of the cam slider 60 and into the guide holes 57a at the front of the guide member 55. The supported shafts 68b at the rear are inserted into the rear cam holes 64 of the cam slider 60 and into the guide holes 57a at the rear of the guide member 55. Consequently, when the cam slider 60 moves back and forth against the guide member 55, the supported shafts 68a and 68b are guided by the guide holes 57a according to positions of the supported shafts 68a and 68b with reference to the front cam holes 63 and the rear cam holes 64. As a result, the support arm 66 moves approximately up and down.

The support arm 66 supports a chucking pulley 71 (see FIGS. 15, 19, 20, and 22). The chucking pulley 71 comprises a support plate 72 and a pressure member 73 coupled to each other vertically.

The support plate 72 is formed to be an approximately circular disc and is larger than a support hole 67a of the support arm 66. A protrusion through-hole 72a is formed at the center of the support plate 72.

Figure 22:
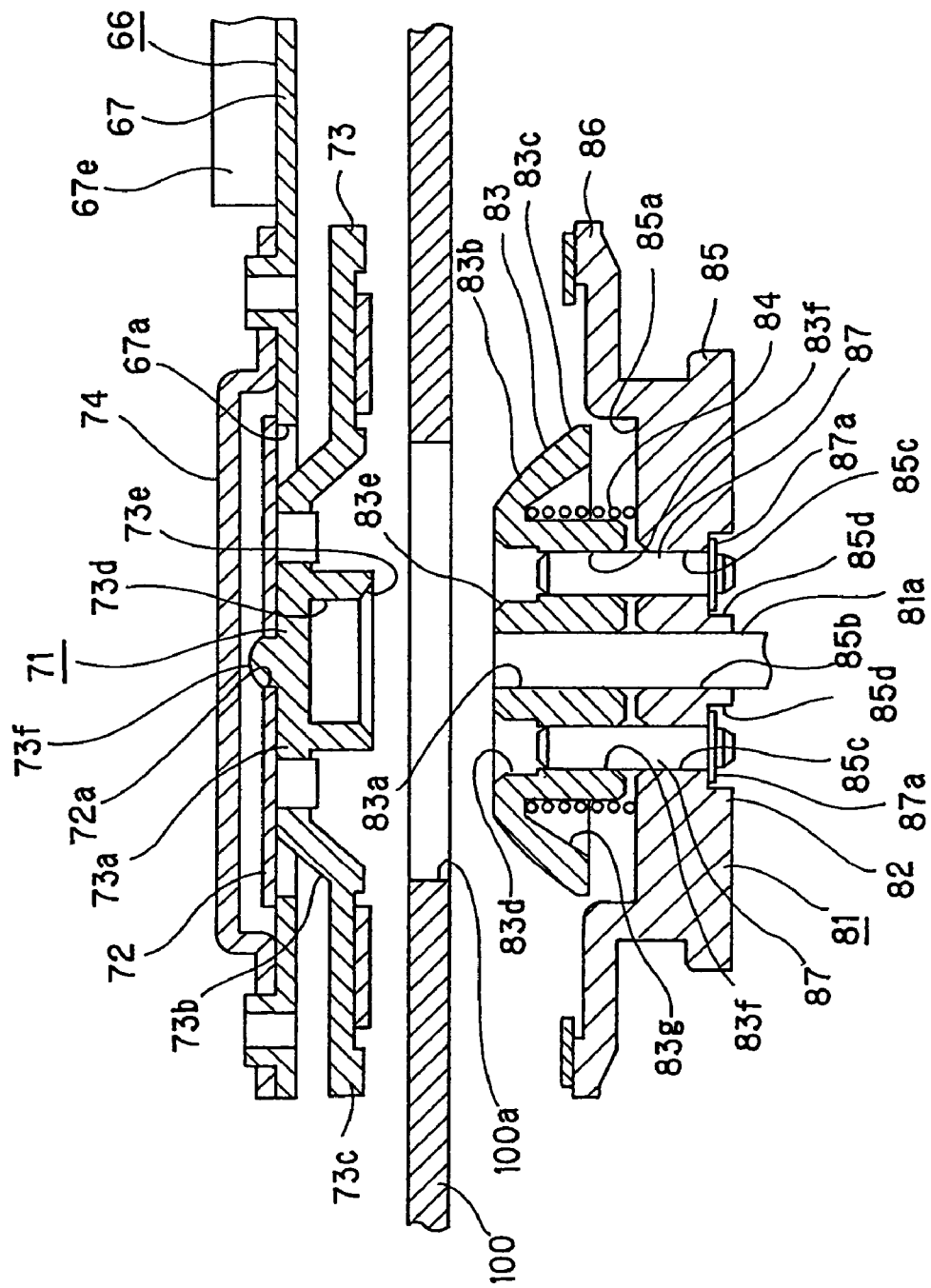
FIG. 22 is an enlarged sectional view showing the chucking pulley and a disc table.

As shown in FIG. 22, the pressure member 73 comprises a circular attached section 73a, a peripheral section 73b, a pressure section 73c, and a positioning protrusion 73d. The peripheral section 73b protrudes slantwise downward from the periphery of the attached section 73a. The pressure section 73c forms a circular ring continuous with a bottom line of the peripheral section 73b. The positioning protrusion 73d forms a cylinder protruding downward from the downward plane of the attached section 73a. A guided edge 73e is formed along a lower inside periphery of the positioning protrusion 73d and slants toward the outside periphery of the positioning protrusion 73d. An upward protruding pivot protrusion 73f is provided at the center of the attached section 73a.

The chucking pulley 71 is supported by the support arm 66 as follows. The attached section 73a and the peripheral section 73b of the pressure member 73 are inserted into the support hole 67a from under. The attached section 73a is attached to the support plate 72. When the pressure member 73 is attached to the support plate 72, the pivot protrusion 73f protrudes upward from the support plate 72. When supported by the support arm 66, the chucking pulley 71 is configured to be rotatable around the shaft and movable along the shaft (up and down).

When the support arm 66 supports the chucking pulley 71, the pressure plate 74 is attached to the top plane of the arm plate 67 so as to cover the support plate 72 from above.

When the guide member 55 and the cam slider 60 support the support arm 66, the gear support shaft 59 of the guide member 55 pierces the second relief hole 61b of the cam slider 60. The gear support shaft 59 supports a drive gear 75 comprising two gears (see FIG. 15). The drive gear 75 is disposed in the gear hole 67b of the support arm 66. A small gear 75a of the drive gear 75 engages with the rack member 65 attached to the cam slider 60.

A drive unit 76 is attached to the downward plane at the rear end of the flat plate section 56 of the guide member 55 (see FIG. 15). As shown in FIG. 20, the drive unit 76 comprises a mounting plate 76a, an elevation motor 77, a first reduction gear 78, and a second reduction gear 79. The elevation motor 77 is attached to the mounting plate 76a. The mounting plate 76a supports the first reduction gear 78 and the second reduction gear 79. A worm 77a is fixed to a shaft of the elevation motor 77. The first reduction gear 78 engages with the worm 77a. The second reduction gear 79 engages with the first reduction gear 78.

When the drive unit 76 is attached to the guide member 55, the second reduction gear 79 engages with a large gear 75b of the drive gear 75. Therefore, when the elevation motor 77 rotates, its driving force is sequentially transmitted to the first reduction gear 78, the second reduction gear 79, the drive gear 75, and then the rack member 65. The cam slider 60 moves in directions (back and forth) corresponding to rotation directions of the elevation motor 77.

An assembly plate 80 is attached to the bottom case 48 of the case 46. The assembly plate 80 is integrally formed with a pressure section 80a and an extending section 80b. The pressure section 80a is positioned at the front end. The extending section 80b protrudes from the left end of the pressure section 80a to the rear. The extending section 80b slidably supports a guided section 51b of the moving base 51a of the optical pickup 51.

When the guide member 55 and the cam slider 60 support the support arm 66, the positioning shaft 47e provided on the upper case 47 is inserted into the shaft insertion hole 56b of the guide member 55, the first relief hole 61a of the cam slider 60, and the gear hole 67b of the support arm 66. When the upper case 47 is coupled to the bottom case 48, the positioning shaft 47e is inserted into the positioning cylinder 54 of the bottom case 48 to position the upper case 47 and the bottom case 48. Therefore, the upper case 47 and the bottom case 48 are easily positioned, making it possible to improve workability in assembling the base unit 20.

The spindle motor 50 disposed in the case 46 supports a disc table 81 (see FIG. 15).

The disc table 81 comprises a center shaft 81a as a motor shaft of the spindle motor 50, a table section 82, a centering protrusion 83, and a pressing spring 84 (see FIG. 22). The pressing spring 84 functions as pressing means for pressing the centering protrusion 83 upward against the table section 82.

The table section 82 comprises a bottom section 85 and a mounting section 86. The bottom section 85 is externally shaped into a circle. The mounting section 86 extends like a flange outward from an outside periphery line of the bottom section 85. The bottom section 85 is provided with a disposing recessed section 85a that opens upward. A fixing hole 85b is formed to pierce the center of the bottom section 85. There are formed vertically boring shaft support holes 85c 180° opposite to each other with reference to the fixing hole 85b in the bottom section 85. On the bottom section 85, regulating recessed sections 85d are formed continuously with and under the shaft support holes 85c. The regulating recessed sections 85d are opened downward and provide larger aperture areas than the shaft support holes 85c. A center shaft 81a is inserted into the fixing hole 85b of the table section 82 and is fixed.

The centering protrusion 83 is partially disposed on the disposing recessed section 85a of the table section 82. A vertically boring supported hole 83a is formed at the center of the centering protrusion 83. The top end of the center shaft 81a is inserted into the supported hole 83a. The centering protrusion 83 is movably supported by the center shaft 81a along its direction. Around the centering protrusion 83, there are formed an inclined plane for guiding 83b and an inclined plane for centering 83c in order from the top. The inclined plane for guiding 83b has a larger tilt angle than the inclined plane for centering 83c against the direction of the center shaft 81a.

A positioning recessed section 83d is formed on the centering protrusion 83. The positioning recessed section 83d is formed around the supported hole 83a and is opened upward. An upper inside periphery of the positioning recessed section 83d is formed to be a guide edge 83e that slopes upward and inward.

There are formed shaft fixing holes 83g 180° opposite to each other with reference to the supported hole 83a in the centering protrusion 83. The shaft fixing holes 83g extend vertically and are opened downward.

A spring supporting recessed section 83h is formed around the supported hole 83a of the centering protrusion 83 and is opened downward.

The spring supporting recessed section 83h is provided with a pressing spring 84 that is a helical compression spring. The pressing spring 84 elastically contacts with the table section 82 and the centering protrusion 83. Accordingly, the pressing spring 84 presses the centering protrusion 83 against the table section 82 upward. A given clearance is formed to move the centering protrusion 83 between the bottom plane of the disposing recessed section 82a of the table section 82 and the downward plane of the centering protrusion 83.

Stopper shafts 87 are inserted into the shaft support holes 85c of the table section 82. The top ends of the stopper shafts 87 are inserted into the shaft fixing holes 83g of the centering protrusion 83 and are fixed. The stopper shafts 87 are slidable in the shaft support holes 85c.

Stopper section 87a are provided at the bottom ends of the stopper shafts 87. The stopper sections 87a are so-called E rings, for example. The stopper sections 87a are positioned to the regulating recessed sections 85d of the table section 82. The stopper sections 87a contact with the top planes of the regulating recessed sections 85d. This makes it possible to prevent the centering protrusion 83 from falling out of the center shaft 81a when the centering protrusion 83 is pressed upward by the pressing spring 84.

When the centering protrusion 83 is inserted into a center hole 100a of the disc-shaped recording medium 100 from under, an inside periphery line of the disc-shaped recording medium 100 is guided by the inclined plane for guiding 83b and contacts with the inclined plane for centering 83c. When the centering protrusion 83 is inserted into the center hole 100a of the disc-shaped recording medium 100, the chucking pulley 71 lowers. The disc table 81 and the chucking pulley 71 fasten the inside periphery of the disc-shaped recording medium 100. In this manner, the disc-shaped recording medium 100 is chucked.

At this time, the guided edge 73e of the positioning protrusion 73d of the chucking pulley 71 is guided by the guide edge 83e of the positioning recessed section 83d of the disc table 81. The positioning protrusion 73d is inserted into the positioning recessed section 83d to position the chucking pulley 71 and the disc table 81. At the same time, the following occurs while the inside periphery of the disc-shaped recording medium 100 contacts with the inclined plane for centering 83c of the centering protrusion 82. As the chucking pulley 71 lowers, the disc-shaped recording medium 100 together with the centering protrusion 83 moves downward against the pressure of the pressing spring 84. In this manner, the disc-shaped recording medium 100 is positioned (centered) with reference to the center shaft 81a.

As mentioned above, the centering protrusion 83 is configured to be movable along the direction of the center shaft 81a with reference to the table section 82. This solves diameter variance for the center hole 100a of the disc-shaped recording medium 100. The disc-shaped recording medium 100 can be centered to the center shaft 81a with excellent accuracy.

When the disc-shaped recording medium 100 is chucked, the chucking pulley 71 is fastened to the disc-shaped recording medium 100 pressed against the mounting section 86 of the table section 82.

As mentioned above, the disc table 81 prevents the centering protrusion 83 from falling out of the center shaft 81a by means of the stopper shafts 87 that are positioned parallel to the center shaft 81a and have stopper sections 87a. Consequently, it is unnecessary to provide the center shaft 81a with a stopper section. A sufficient contact length can be maintained for the table section 82 and the centering protrusion 83 with reference to the center shaft 81a. The chucking pulley 71 and the disc table 81 can ensure stable rotations of the disc-shaped recording medium 100 when it rotates. The recording medium drive apparatus 1 can be made low-profile.

The chucking pulley 71 is provided with the positioning protrusion 73d. The disc table 81 is formed with the positioning recessed section 83d to insert the positioning protrusion 73d. Accordingly, the center shaft 81a needs not to be protruded upward from the disc table 81 for positioning of the chucking pulley 71 and the disc table 81. For this reason also, the recording medium drive apparatus 1 can be made low-profile.

Further, the disc table 81 is provided with the two stopper shafts 87 180° opposite to each other with respect to the center shaft 81a. Therefore, it is possible to ensure excellent balance during rotations.

In addition, the disc table 81 keeps the same distance between the center shaft 81a and each of the two stopper shafts 87. Therefore, it is possible to ensure more excellent balance during rotations.

While there has been described the disc table 81 provided with two stopper shafts 87, any number of stopper shafts 87 can be used. When three or more stopper shafts 87 are provided, it is desirable to provide them at even intervals around the center shaft 81a by keeping the same distance from the center shaft 81a.

Operations of the disc drive apparatus 1 will now be described. The disc drive apparatus 1 becomes ready to start operating when a power button out of operation buttons 9 is pressed to turn the power on. The following first describes initial states of the respective parts before the operation starts.

Figure 23:
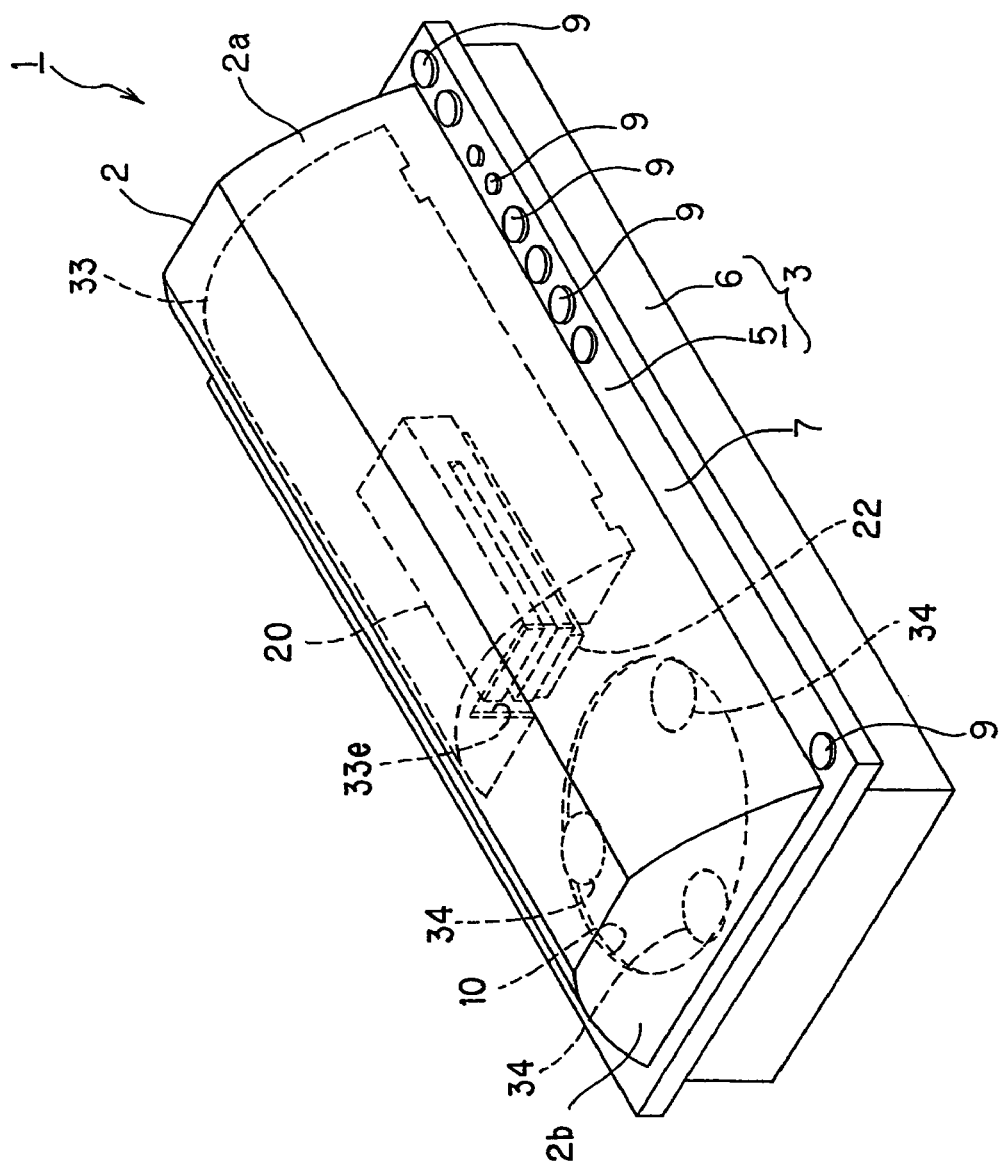
FIG. 23 is a perspective view showing an initial state of the disc drive apparatus.
Figure 24:
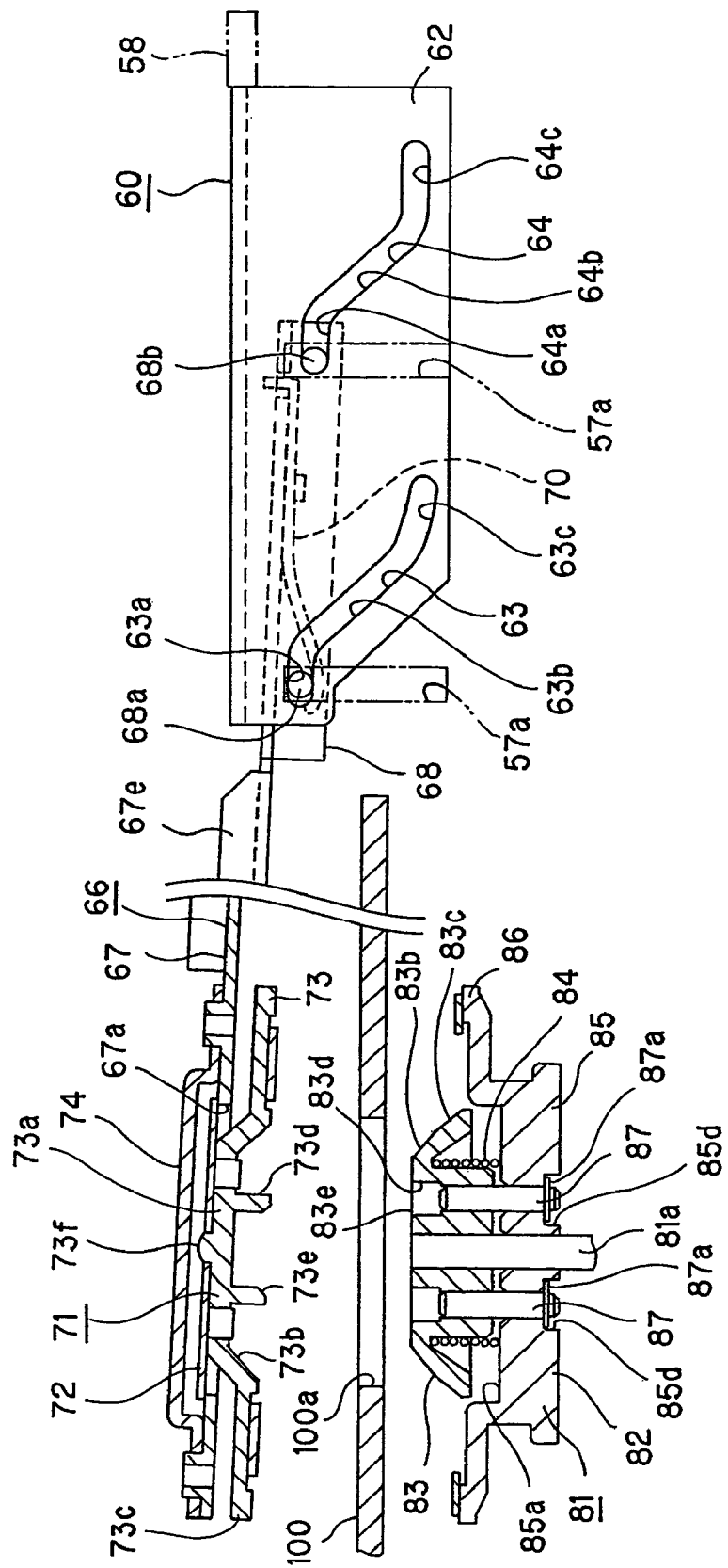
FIG. 24 is a side view showing a disc-shaped recording medium inserted between the chucking pulley and the disc table.

Initially, the base unit 20 is seated on the unit seating section 19a between the guide members 19 in the inner cover 33 as shown in FIG. 23. When the base unit 20 is seated on the unit seating section 19a, as shown in FIG. 24, the supported shafts 68a and 68b of the support arm 66 are placed in the top ends of the guide holes 57a of the guide member 55. At the same time, the supported shafts 68a and 68b are also placed in the horizontal sections 63a of the front cam holes 63 of the cam slider 60 and in the horizontal sections 64a of the rear cam holes 64. Accordingly, the cam slider 60 is positioned to a travel end toward the rear in a travel range. The support arm 66 is positioned to a travel end toward the top in the travel range. At this time, the rear end plane of the flat plate section 61 in the cam slider 60 operates the second detection switch 58 provided for the guide member 55 (see FIG. 24). It is detected that the cam slider 60 is positioned to the travel end toward the rear in the travel range.

As mentioned above, the horizontal sections 63a of the front cam holes 63 are positioned slightly higher than the horizontal sections 64a of the rear cam holes 64. When the support arm 66 is positioned to the upper travel end in the travel range, the front of the support arm 66 is slightly raised (see FIG. 24).

Initially, the cover 2 is positioned to close the recording medium mount section 10 and the inner cover 33 (see FIG. 23).

Figure 25:
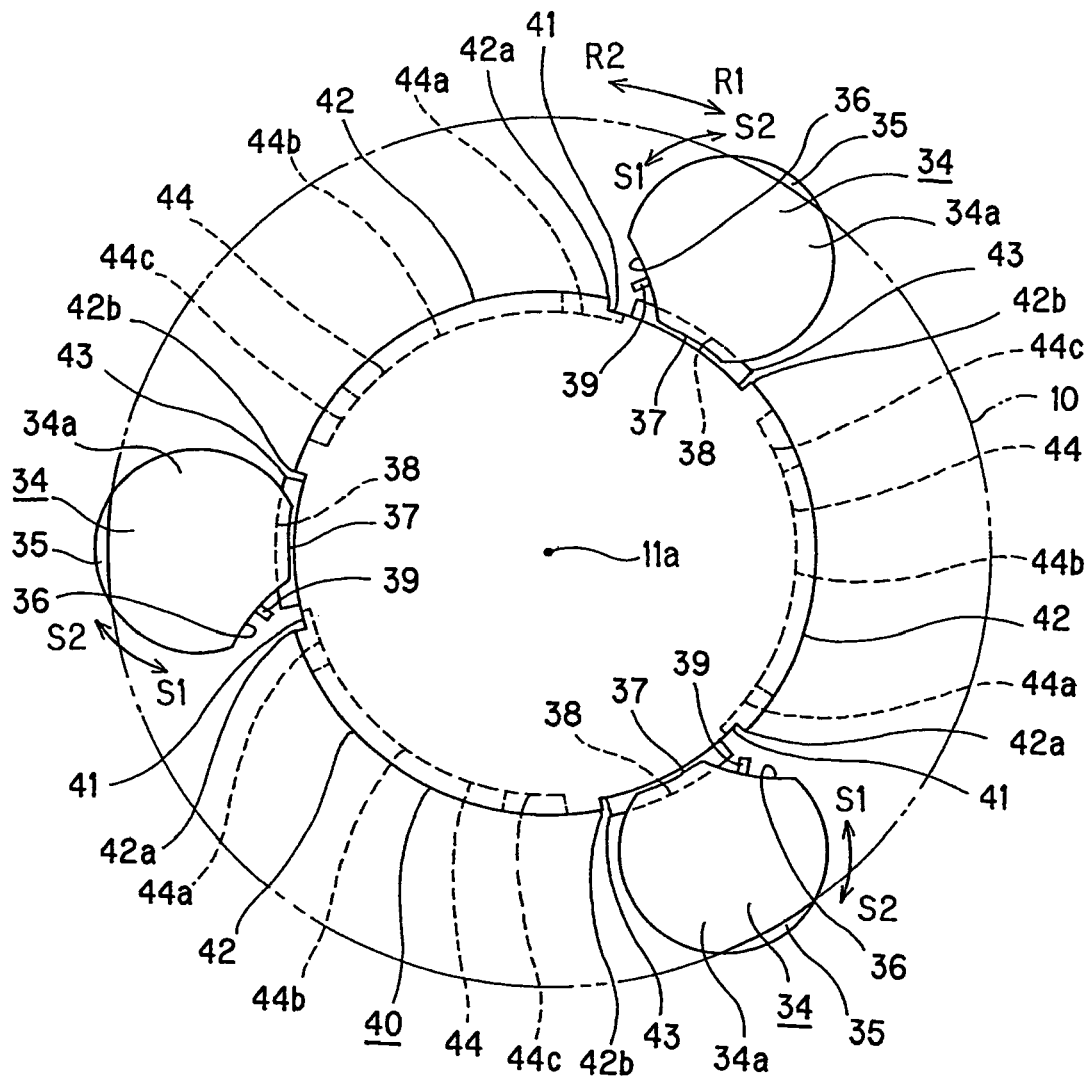
FIG. 25 is a plan view showing an initial state before a centering operation takes place.

Initially, the protruding pieces 43 of the cam member 40 are positioned corresponding to the positioning cutouts 8a of the supporting cylinders 8 on the base panel 5 as shown in FIG. 25. The protruding pieces 43 engage with the second Geneva planes 38 of the rotary units 34. Therefore, the rotary units 34 are prevented from rotating. The rotary units 34 are positioned to the lower travel ends and are prevented from protruding upward from the disc mounting plane 11 of the base panel 5 as shown in FIG. 26.

Figure 26:
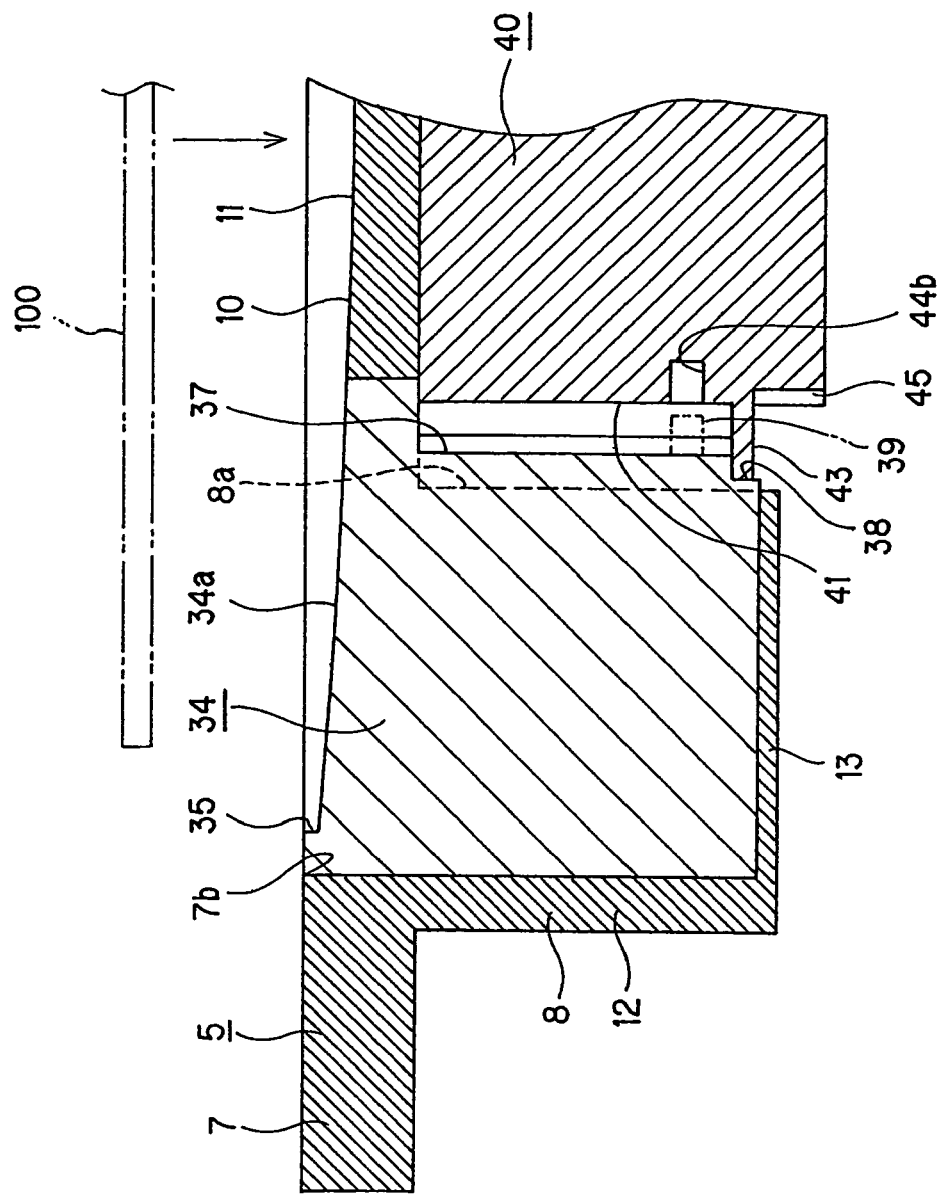
FIG. 26 is an enlarged sectional view showing a state before a centering operation takes place.

The slide pins 39 of the rotary units 34 are not inserted into the cam grooves 44 of the cam member 40 (see FIG. 26).

As mentioned above, the rotary units 34 are prevented from rotating. The disc centering sections 35 are positioned outermost (see FIG. 26). Accordingly, the disc centering sections 35 are positioned immediately outside the disc mounting plane 11.

As mentioned above, the recording medium drive apparatus 1 uses the cover 2 that can be attached to or detached from the base panel 5. Operations depend on whether the cover 2 is detached from or is attached to the base panel 5. The following first describes operations when the cover 2 is attached to the base panel 5.

Figure 27:
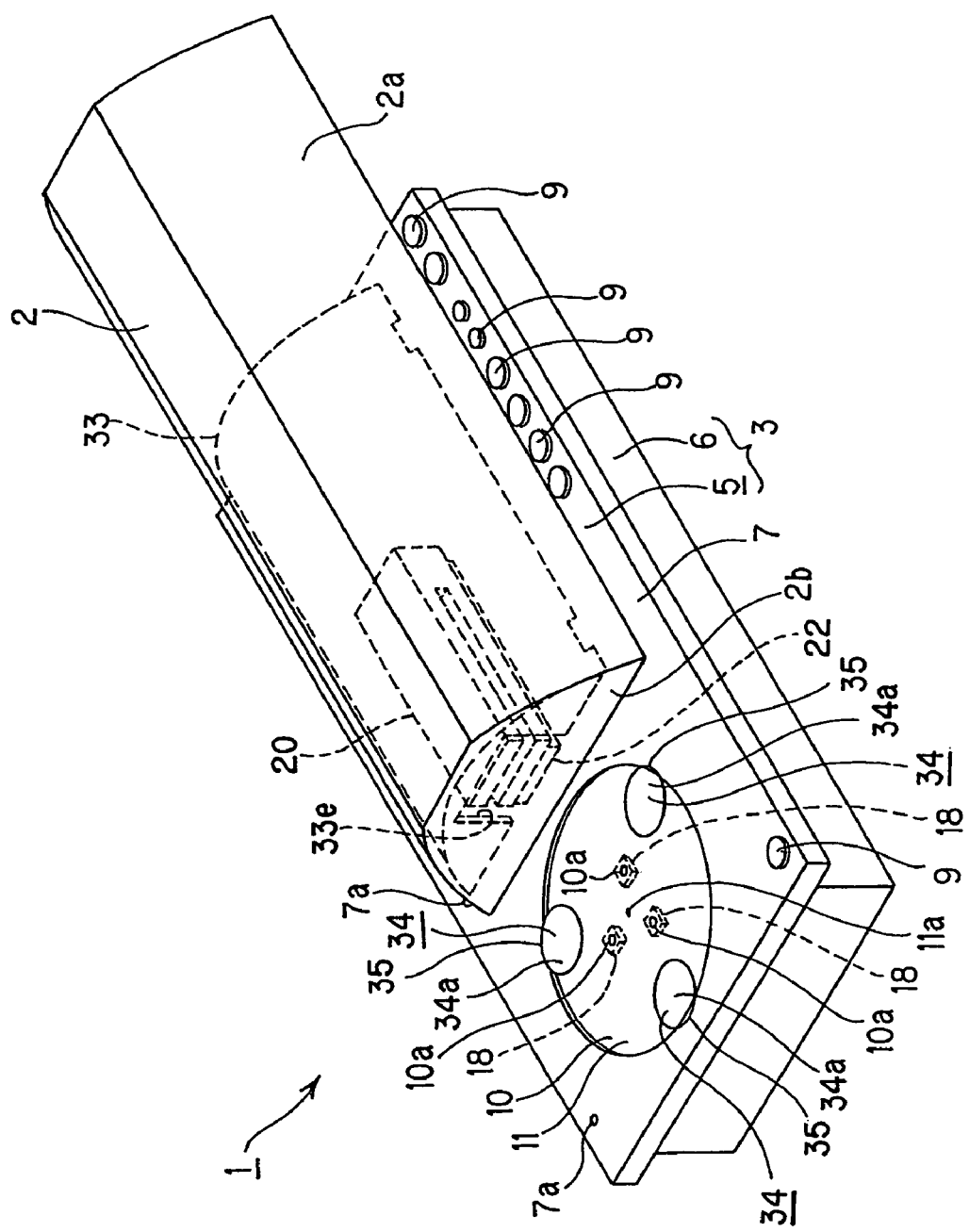
FIG. 27 is a perspective view showing the cover moved to an open position.

When the power button is operated to turn the power on, operating an open button allows the cover drive section 28 to move the cover 2. The cover 2 moves to an open position that exposes the recording medium mount section 10 (see FIG. 27).

Figure 28:
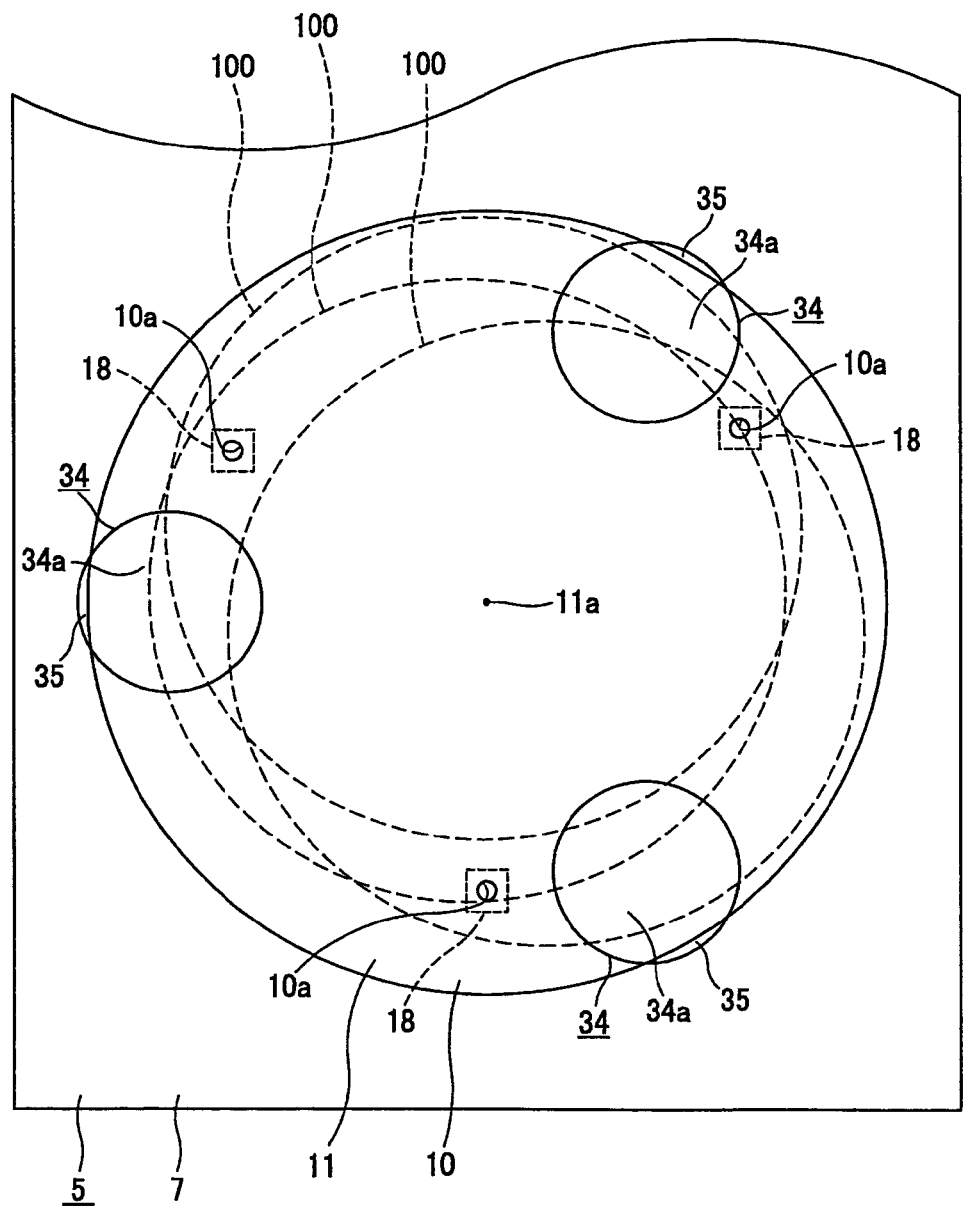
FIG. 28 is a plan view showing mountable positions of the disc-shaped recording medium on the disc mounting plane.

With the cover 2 moved to the open position, a user mounts the disc-shaped recording medium 100 at any position on the disc mounting plane 11 (see FIG. 28) and operates a close button.

As will be discussed below, the disc centering sections 35 of the rotary units 34 are moved toward the centering position on the disc drive apparatus 1 for centering in contact with the outside periphery line of the disc-shaped recording medium 100 mounted on the disc mounting plane 11. For this reason, the disc-shaped recording medium 100 can be mounted at any position on the disc mounting plane 11, allowing the user to easily handle the disc-shaped recording medium 100.

When the disc-shaped recording medium 100 or the like is mounted on the disc mounting plane 11, the disc detection apparatus uses the detection sensors 18 to determine whether or not a response of reflected light returns from the disc-shaped recording medium 100 or the like. A result indicates whether a response returns, no response returns, or the determination is impossible (unpredictable). Based on the determination result, the disc detection apparatus determines whether the disc-shaped recording medium 100 with diameter 12 cm is mounted or the disc-shaped recording medium 300 with diameter 8 cm is mounted. When the disc-shaped recording medium 100 or the like is mounted on the mounting plane 11, this position is referred to as a mounting position or a first position.

Figure 29:
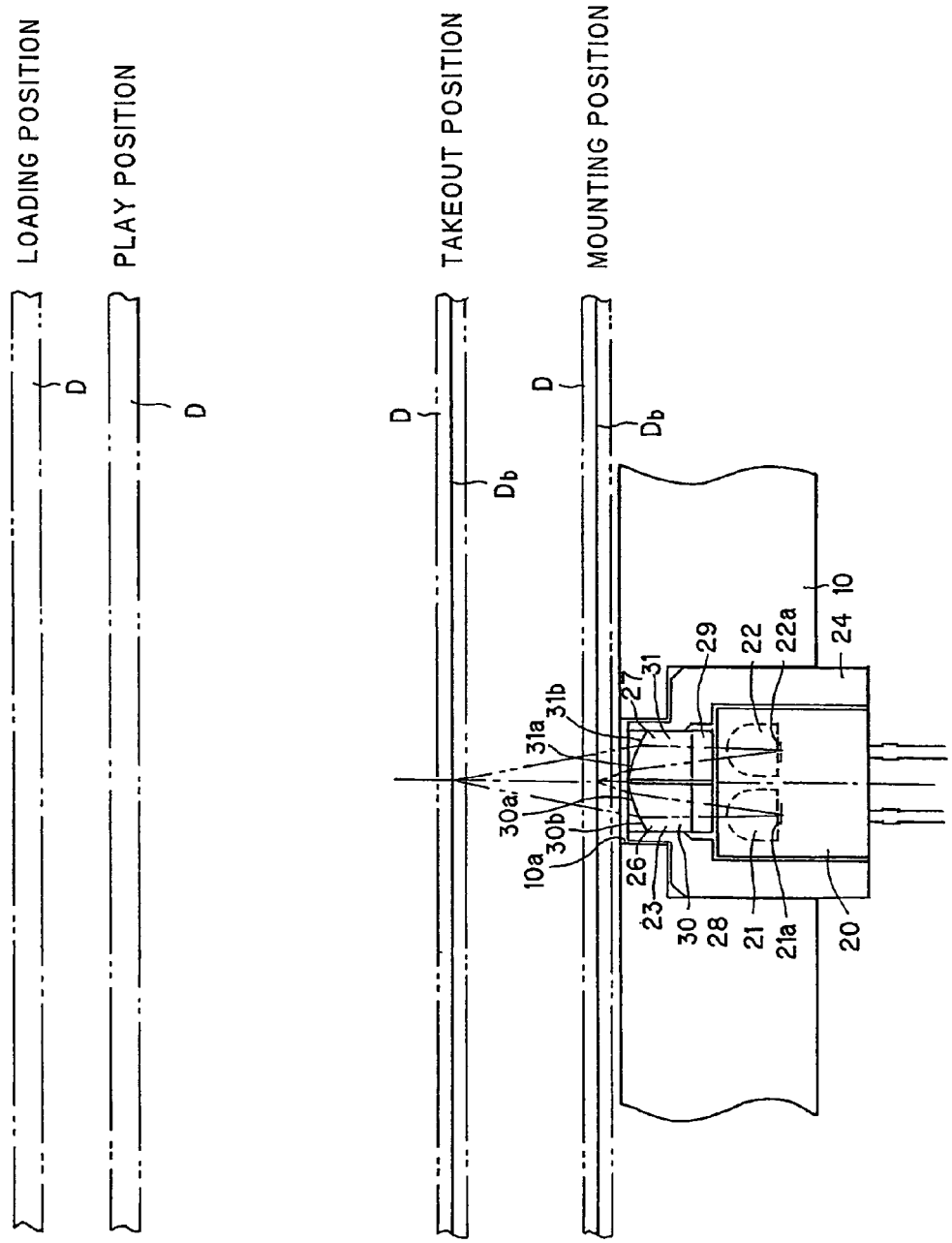
FIG. 29 illustrates optical detection operations for the disc-shaped recording medium.

Specifically, as shown in FIG. 29, the detection sensor 18 allows the light emitting element 21 of the photointerrupter 20 to emit light to the signal recording side Db of the disc-shaped recording medium D. The light is emitted from the light emitting plane 21a of the light emitting element 21 and enters the optical element 23. The optical element 23 diffracts the light on the first inclined plane 30a formed on the diffracting wall 30 of the transmission block 26. The light is converged on the signal recording side Db of the disc-shaped recording medium D mounted on the disc mounting plane 11. Consequently, the light is reflected on the signal recording side Db and the reflected light enters the transmission block 27. After the light is reflected on the signal recording side Db of the disc-shaped recording medium D, the optical element 23 diffracts the reflected light by allowing it to pass through the first inclined plane 31a of the transmission block 27. The light converges on the light receiving plane 22a of the light receiving element 22. Accordingly, the light receiving element 22 receives intense reflected light from the signal recording side Db of the disc-shaped recording medium D mounted on the disc mounting plane 11. It is possible to reliably detect the disc-shaped recording medium D.

The shield sections 32 and 33 are formed on the butting planes 26a and 27a of the transmission blocks 26 and 27. This makes it possible to prevent the light emitted from the light emitting element 21 or the reflected light entering the light receiving element 22 from diffusely reflecting in the optical element 23. Therefore, the light receiving element 22 can detect the reflected light from the signal recording side Db of the disc-shaped recording medium D without decreasing the intensity of the reflected light.

At this time, the light from the light emitting element 21 enters the transmission block 26 and is also diffracted by the second inclined plane 30b of the diffracting wall 30. The diffracted light is focused on the signal recording side Db of the disc-shaped recording medium D transported to the take-out position. For this reason, the diffracted light does not converge on the signal recording side Db of the disc-shaped recording medium D mounted on the disc mounting plane 11. Its reflected light scatters and is not detected by the light receiving element 22. Therefore, the detection sensor 18 does not detect the disc-shaped recording medium D before it is mounted on the disc mounting plane 11.

Figure 30:
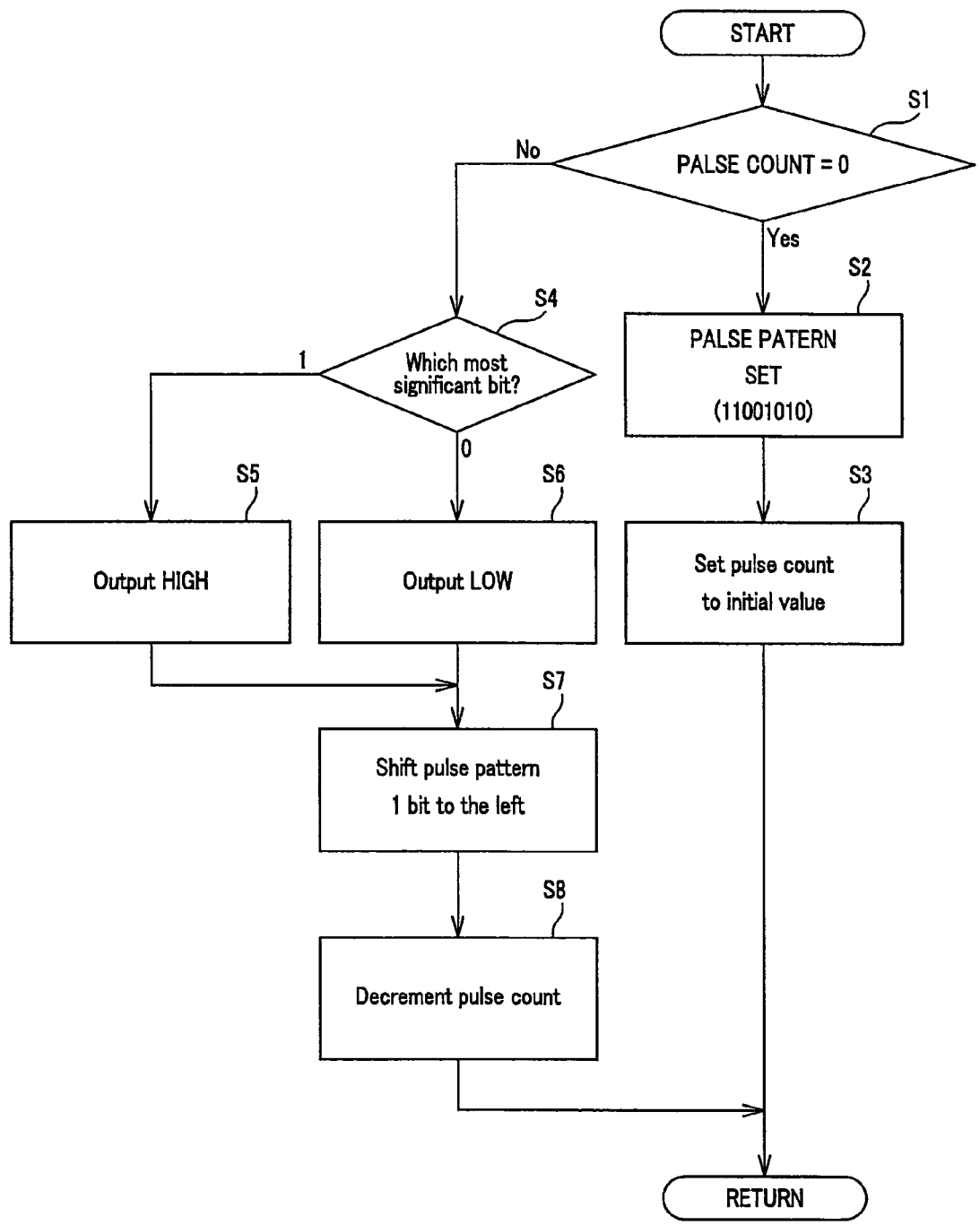
FIG. 30 is a flowchart showing an optical pulse output process of the optical detection apparatus.
Figure 31:
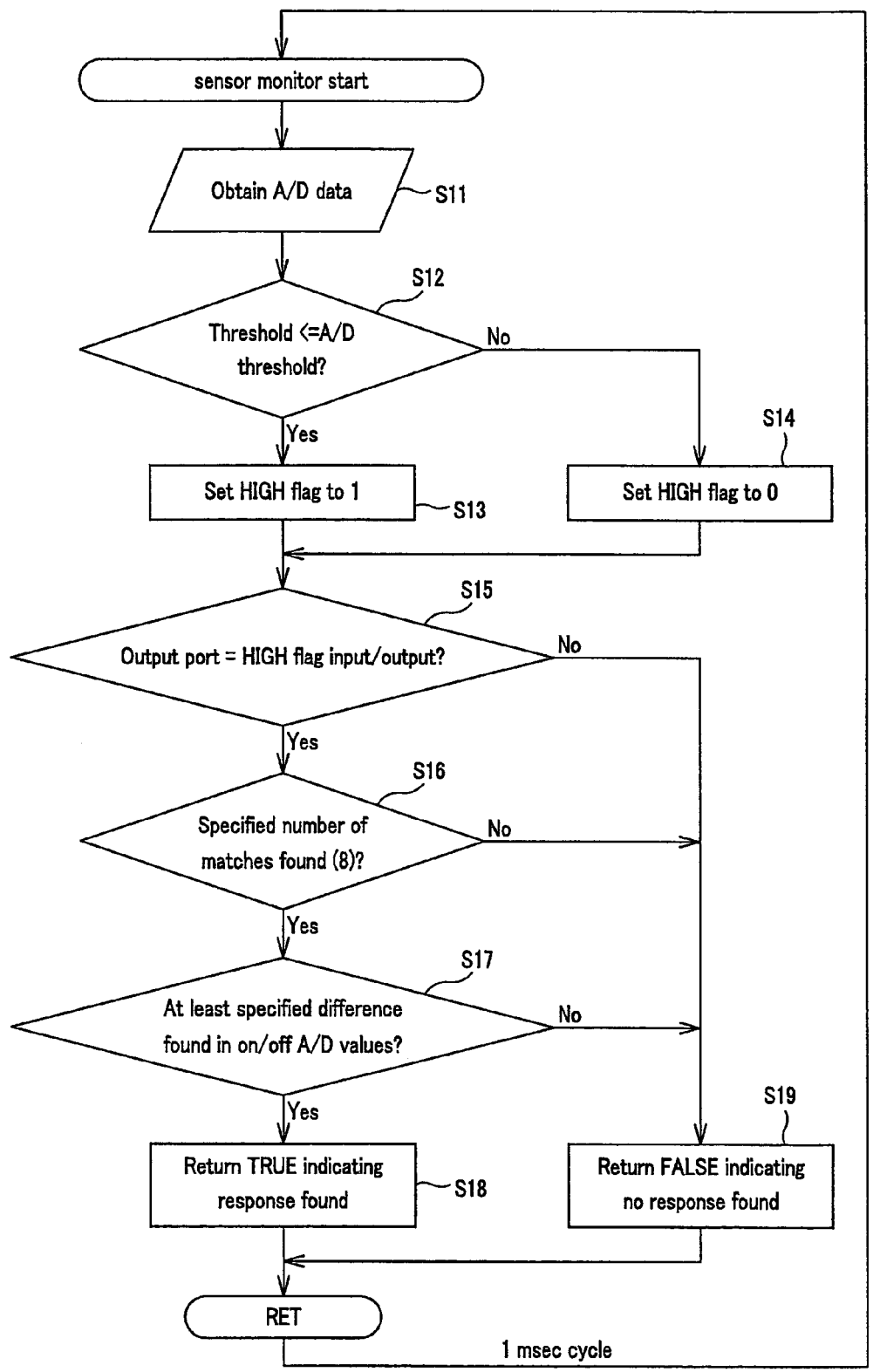
FIG. 31 is a flowchart showing a process of the optical detection apparatus that determines the presence or absence of response from an A/D value.
Figure 32:
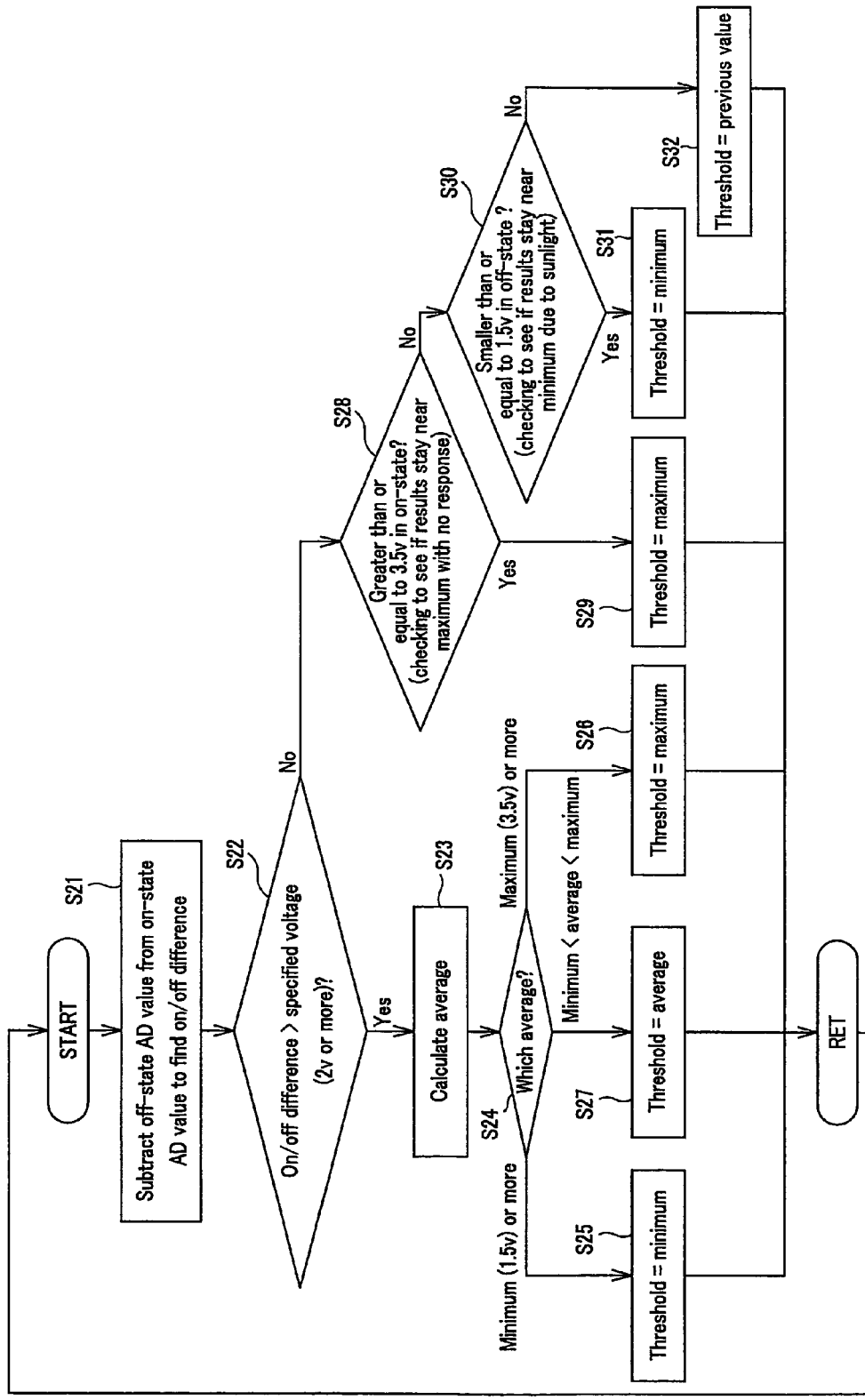
FIG. 32 is a flowchart showing a process for follow-up control of a threshold value in the optical detection apparatus.

With reference to FIGS. 30 through 32, the following describes in detail operations of the light detection apparatus constituting the disc detection apparatus. Referring now to FIG. 30, the following first describes pulse outputs supplied from the control section 240 to the LED 211 via the LED drive section 250. At step S1, the control section 240 checks whether or not a pulse counter is set to value 0. If the pulse counter is set to 0, the control section 240 sets a pulse pattern (step S2). For example, the control section 240 sets the pulse pattern to eight bits "11001010". At step S3, the control section 240 sets the pulse counter to an initial value and returns to step S1. For example, the control section 240 sets the pulse counter to 8 based on the 8-bit pulse pattern.

When the control section 240 determines at step S1 that the pulse counter is not set to value 0, the control section 240 proceeds to step S4 to check whether the most significant bit is set to 1 or 0. When the control section 240 determines at step S4 that the most significant bit is set to 1, the control section 240 proceeds to step S5 and outputs HIGH to the LED drive section 250. When the control section 240 determines at step S4 that the most significant bit is set to 0, the control section 240 proceeds to step S6 and outputs LOW to the LED drive section 250.

At step S7, the control section 240 shifts the pulse pattern one bit to the left. At step S8, the control section 240 decrements the count value of the pulse counter and returns to step S1. The control section 240 then repeats the process from step S1 up to the least significant bit.

In this manner, the control section 240 can control the LED drive section 250 and drive the LED 211 in accordance with the on/off-pattern 11001010.

With reference to FIG. 31, the following describes a process based on light reception in the phototransistor 212. At step S11, the control section 240 reads output data in 255 grades. The output data is generated from the A/D converter 230 that converts an output signal from the collector C of the phototransistor 212 into digital data. At step S12, the control section 240 compares this A/D output data with a predetermined threshold. If the A/D output data is determined to be greater than or equal to the threshold, the control section 240 sets a HIGH flag to 1 at step S13. If the A/D output data is determined to be smaller than the threshold at step S12, the control section 240 sets the HIGH flag to 0 at step S14. The threshold is varied in the range of 1.5V<=Threshold<=3V as shown in FIG. 32 to be described later.

The control section 240 generates a pulse from its output port to the LED. At step S15, the control section 240 compares an on/off-state of the pulse with input/output of the HIGH flag for a match. This aims at decreasing influences of external disturbance by finding a match between the output signal (pulse modulated) in FIG. 30 and the input signal. When it is determined at step S16 that the number of matches for the HIGH flag equals the number of bits 8 in the on/off-pattern 11001010, the control section 240 proceeds to step S17. This aims at avoiding a case where a match may accidentally occur due to a noise of external light.

At step S17, the control section 240 checks whether or not at least a specified difference is found in on/off A/D values. Step S17 is used to check whether or not at least a specified difference is found in on/off A/D values for the purpose of removing noises that finely fluctuate near the threshold. If it is determined at step S17 that at least a specified difference is found in on/off A/D values, the control section 240 proceeds to step S18 and returns availability of response (TRUE). If it is determined at step S17 that at least a specified difference is not found in on/off A/D values, the control section 240 proceeds to step S19 and returns unavailability of response (FLASH).

The following describes the determination of the threshold at step S12 above with reference to FIG. 32. This process determines the threshold based on a difference in AD values corresponding to on/off pulse outputs. This process can be also defined as a process of controlling the threshold dependently on pulse outputs. At step S21, the process finds a difference between on-state AD values and off-state AD values. For example, let us suppose that the difference is determined to be greater than or equal to a specified voltage (e.g., 2V) at step S22. In this case, the process calculates an average of on-state and off-state AD values at step S23. At step S24, the process checks whether the average is smaller than or equal to a minimum (1.5V), greater than or equal to a maximum (3.5V), or greater than the minimum and smaller than the maximum (minimum<average<maximum).

When it is determined at step S24 that the average is smaller than or equal to the minimum, the process proceeds to step S25 and assumes the threshold to be the minimum (threshold=minimum). When it is determined at step S24 that the average is greater than or equal to the maximum, the process proceeds to step S26 and assumes the threshold to be the maximum (threshold=maximum). When it is determined at step S24 that the average is greater than the minimum and smaller than the maximum, the process proceeds to step S27 and assumes the threshold to be the average.

When it is determined at step S22 that a difference between on-state AD values and off-state AD values is not greater than the specified voltage, the process proceeds to step S28 to check whether or not the on-state is greater than or equal to 3.5V. This branch process checks whether or not results stay near the maximum value with no response. When the branch process is determined to be YES, the process proceeds to step S29 and assumes the threshold to be the maximum. When it is determined at step S28 that the on-state is not greater than or equal to 3.5V, the process proceeds to step S30 to check whether or not the off-state is smaller than or equal to 1.5V. This branch process checks whether or not results stay near the minimum value due to sunlight. When the branch process is determined to be YES, the process proceeds to step S31 and assumes the threshold to be the minimum. When the branch process is determined to be NO, the process assumes the threshold to be a previous value.

When certain differences are obtained from the on/off-states, an average is calculated from the differences and is assumed to be the threshold. When the difference in the above-mentioned AD values is too small, the process is used to determine whether the values stay near the maximum or the minimum. The process then shifts the threshold toward the maximum or the minimum to be ready for the next waveform.

The process in FIG. 31 checks the presence or absence of responses detected in the respective light detection apparatuses 200. Based on this result, the optical disc detection apparatus uses the process in FIG. 33 to determine whether the recording media mounted on the mounting plane 11 of the recording medium mount section 10 is a disc-shaped recording medium with diameter 12 cm or 8 cm.

Figure 33:
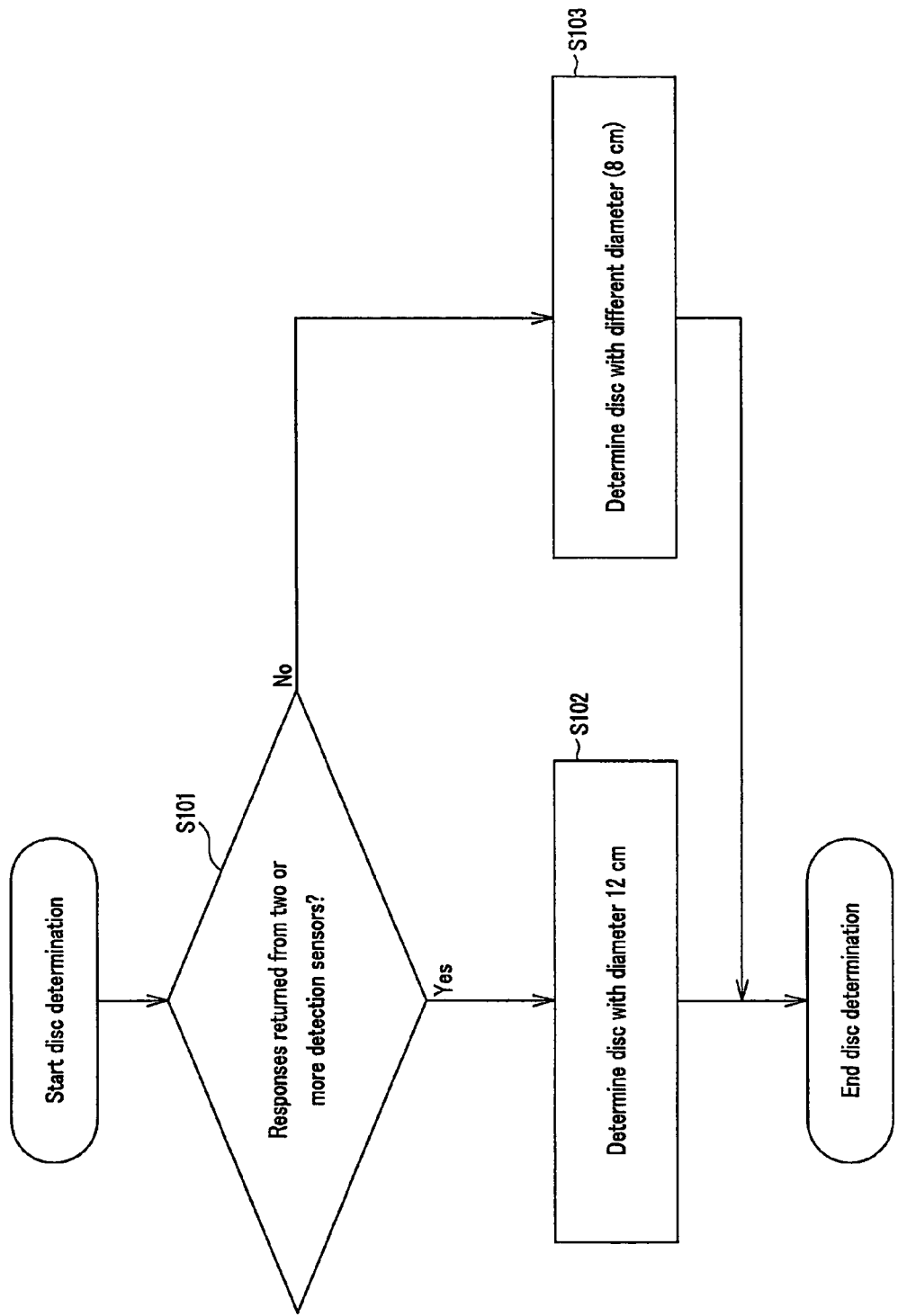
FIG. 33 is a flowchart showing a process of the disc detection apparatus to determine discs.

At step S101 in FIG. 33, the process checks whether two or more detection sensors 18 of the light detection apparatus 200 return responses to the control section 240. As shown in FIG. 11, the three sensor holes 10a are positioned on the mounting plane 11 of the recording medium mount section 10 so as to cover at least two sensor holes 10a when the disc-shaped recording medium 100 with diameter 12 cm is mounted at the first position. Alternatively, the sensor holes 10a are positioned so as to cover only at most one sensor hole 10a when the disc-shaped recording medium 300 with diameter 8 cm is mounted at the first position.

Accordingly, when the control section 240 determines that responses return from two or more detection sensors, the process proceeds to step S102 to determine that the disc with diameter 12 cm is mounted on the mounting plane 11. When the control section 240 determines that responses do not return from two or more detection sensors, the process proceeds to step S103 to determine that a different diameter disc with diameter 8 cm, for example, is mounted.

For example, let us suppose that an optical disc with diameter 12 cm is used as the disc-shaped recording medium 100 to be reproduced on the disc drive apparatus 1. Then, let us suppose that the disc-shaped recording medium 100 is mounted on the disc mounting plane 11 at the position 100C (first position) in FIG. 11. In this case, the disc covers all the detection sensors 18 of the light detection apparatuses 200. The disc-shaped recording medium 100 as a detection target reflects the light from the LED 211 in each detection sensor 18. The reflected light returns to the phototransistor 212. The phototransistor 212 supplies the control section 240 with a detection result (response found as the disc sensor) that the reflected light is detected. According to the detection results (response found) returned from the three detection sensors 18, the control section 240 can determine that the disc-shaped recording medium 100 is mounted on the disc mounting plane 11. Then, let us suppose that the disc-shaped recording medium 100 is mounted at the position 100A or 100B in FIG. 11. According to the detection results (response found) returned from the two detection sensors 18, the control section 240 can determine that the disc-shaped recording medium 100 is mounted on the disc mounting plane 11.

Let us suppose that the disc-shaped recording medium 300 is mounted at the position 300A or 300B in FIG. 11. Since the detection sensor 18 returns no response, the control section 240 can determine that the disc-shaped recording medium 300 with diameter 8 cm is mounted on the disc mounting plane 11. When the disc is mounted at the position 300B in FIG. 11, only one detection sensor 18 returns a response found. The control section 240 can likewise determine that the disc-shaped recording medium 300 with diameter 8 cm is mounted on the disc mounting plane 11.

Figure 34:
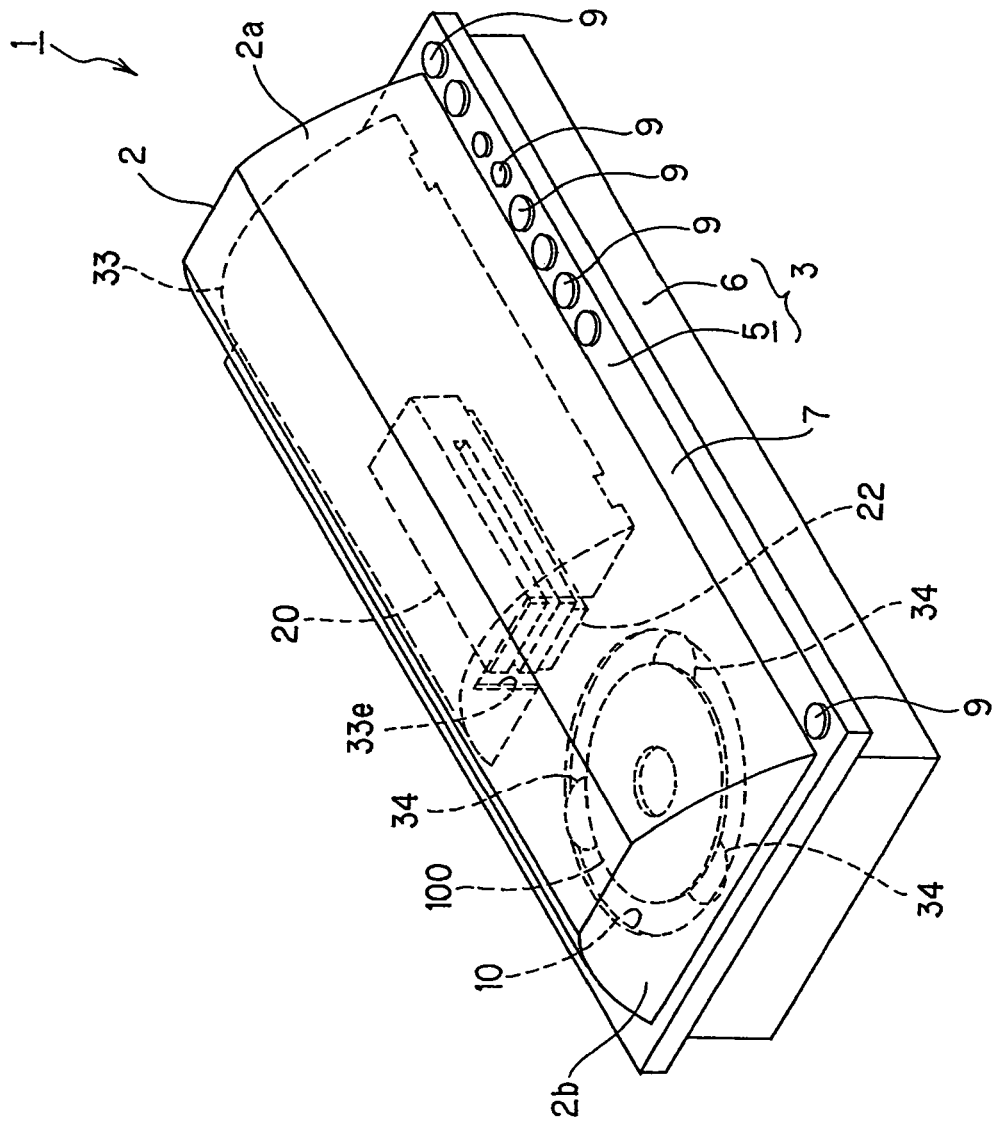
FIG. 34 is a perspective view showing the cover moved to the close position with the disc-shaped recording medium mounted on the disc mounting plane.

After the disc detection apparatus determines that the disc-shaped recording medium 100 with diameter 12 cm is mounted on the mounting plane 11, pressing the close button allows the cover drive section 28 to move the cover 2 to a close position. The recording medium mount section 10 is closed (see FIG. 34). At this time, the movement of the cover 2 is controlled by the first sensor 14, the second sensor 15, the third sensor 16, and the fourth sensor 17. The movement control of the cover 2 will be described later.

As mentioned above, the recording medium mount section 10 is formed into a shallow recess. The disc-shaped recording medium 100 does not protrude upward from the top plane of the base panel 5. When moved toward the close position, the cover 2 does not touch the disc-shaped recording medium 100 mounted on the disc mounting plane 11.

Operating the play button starts the operating motor. The cam member 40 rotates to start centering the disc-shaped recording medium 100 using the rotary units 34. Of course, the centering operation starts on condition that, when the play button is operated, the detection sensors 18 already detect a response indicating the disc-shaped recording medium 100 mounted on the mounting plane 11.

When the disc detection apparatus determines that the disc-shaped recording medium 300 with diameter 8 cm is mounted on the disc mounting plane 11, the rotary units 34 do not perform the centering operation even when the close button is pressed to close the cover 2, and then the play button is operated.

As mentioned above, the close button is operated, and then the play button is operated to start the centering operation. It may be preferable to operate the play button when the cover 2 is positioned to be opened so as to move the cover 2 from the open position to the close position and perform the centering operation by the rotary units 34 in succession. Of course, when the disc-shaped recording medium 300 with diameter 8 cm is mounted on the mounting plane 11, the cover 2 does not move and the centering operation does not take place either.

Figure 35:
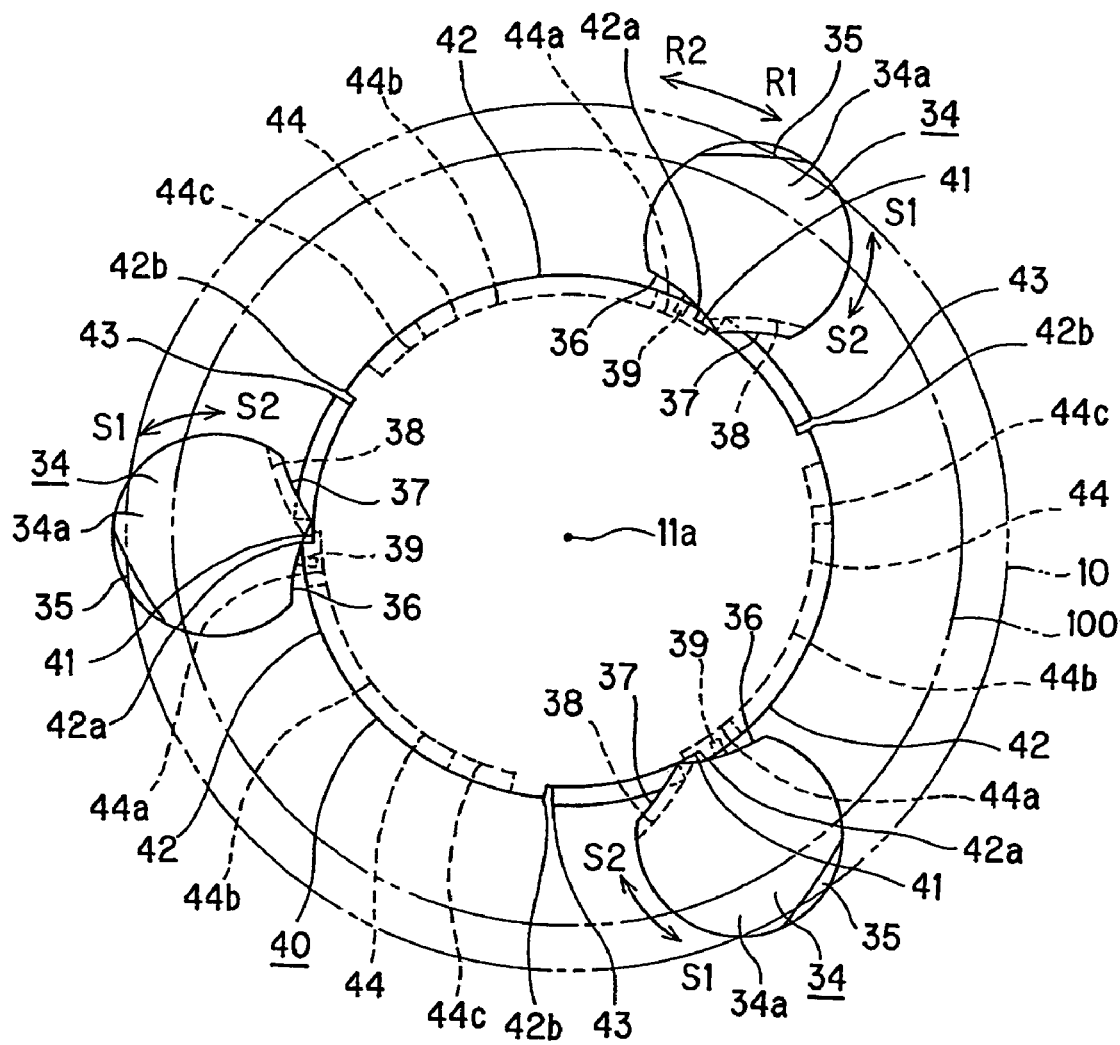
FIG. 35 is a plan view showing a state immediately after the centering operation starts.

When the disc-shaped recording medium 100 with diameter 12 cm is mounted on the disc mounting plane 11, the centering operation starts and the cam member 40 rotates in direction R1 as shown in FIG. 35. When the cam member 40 rotates in the direction R1 in FIG. 35, the protruding pieces 43 slidingly contact the second Geneva planes 38 of the rotary units 34. The rotary units 34 do not rotate. The first pressing sections 42a of the cam member 40 are approaching the rotary units 34.

Figure 36:
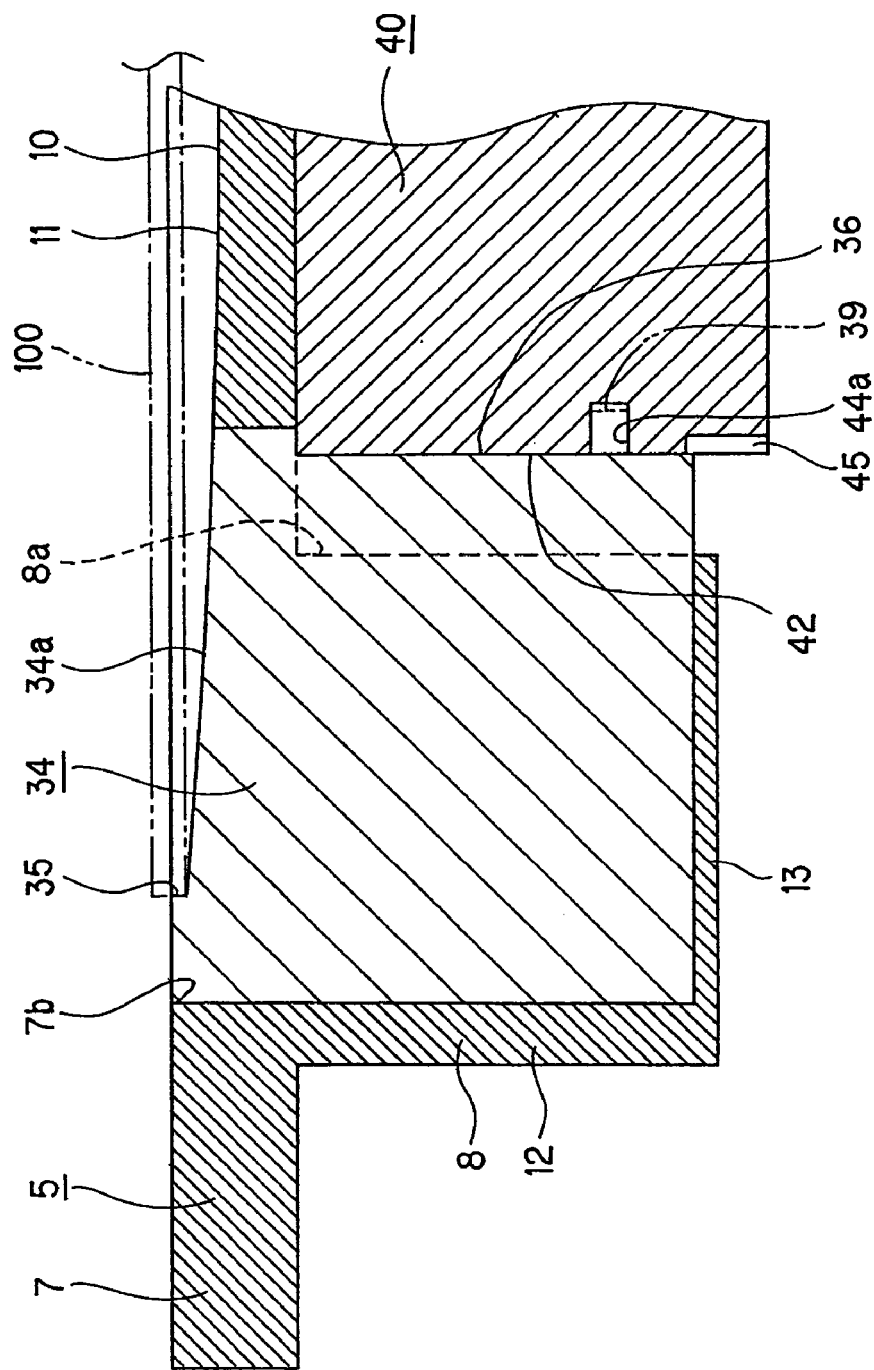
FIG. 36 is an enlarged sectional view showing a state in which the centering operation starts and a slide pin of a disc centering member is inserted into a lower horizontal section of a cam groove in the cam member.

When the cam member 40 rotates, the first pressing sections 42a press the first Geneva planes 36 of the rotary units 34 (see FIG. 35). The rotary units 34 rotate in direction S1 in FIG. 35. When the rotary units 34 rotate in the direction S1, the slide pins 39 of the rotary units 34 are respectively inserted into the lower horizontal sections 44a of the cam grooves 44 in the cam member 40 (see FIG. 36).

When the rotary units 34 rotate in the direction S1, the disc centering sections 35 rotate toward the centering position to center the disc-shaped recording medium 100. The disc-shaped recording medium 100 is pressed by the disc centering sections 35 to move so that the center of the disc-shaped recording medium 100 corresponds to the reference point 11a (see FIG. 35).

Figure 37:
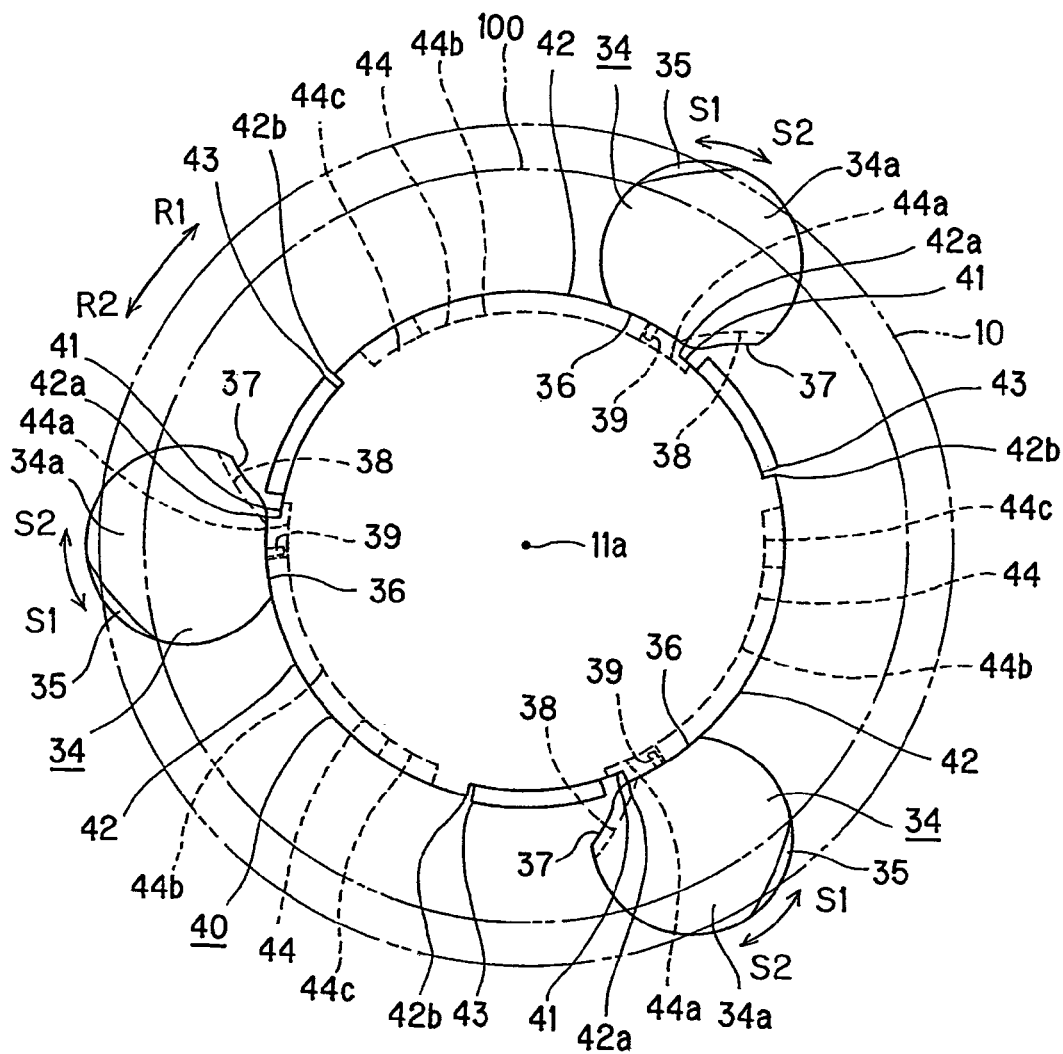
FIG. 37 is a plan view showing a state in which the disc-shaped recording medium has been centered.

When the center shaft of the disc-shaped recording medium 100 corresponds to the reference point 11a, the centering of the disc-shaped recording medium 100 is complete (see FIG. 37).

Figure 38:
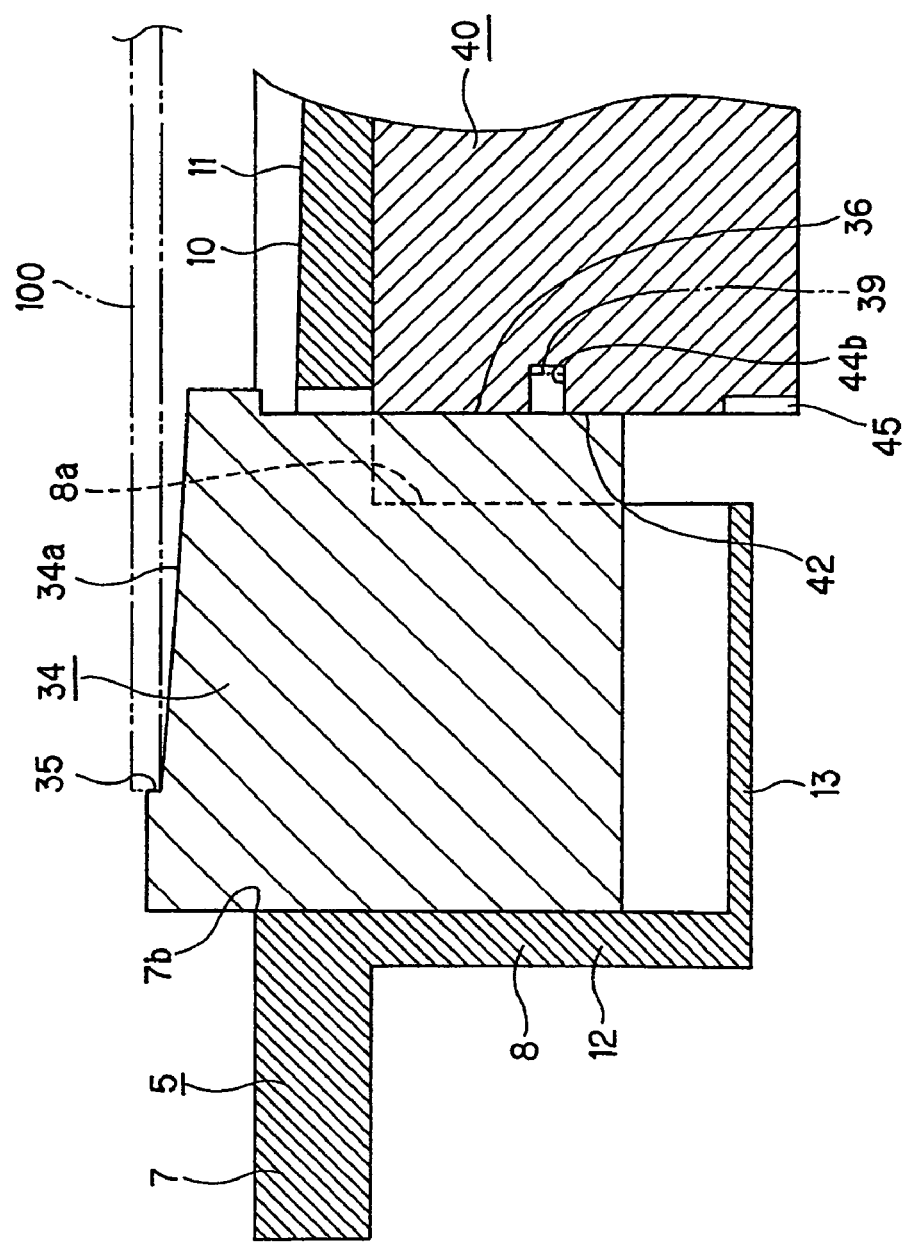
FIG. 38 is an enlarged sectional view showing a state in which the slide pin is inserted into a tilt portion of the cam groove and the disc centering member raises the disc-shaped recording medium.
Figure 39:
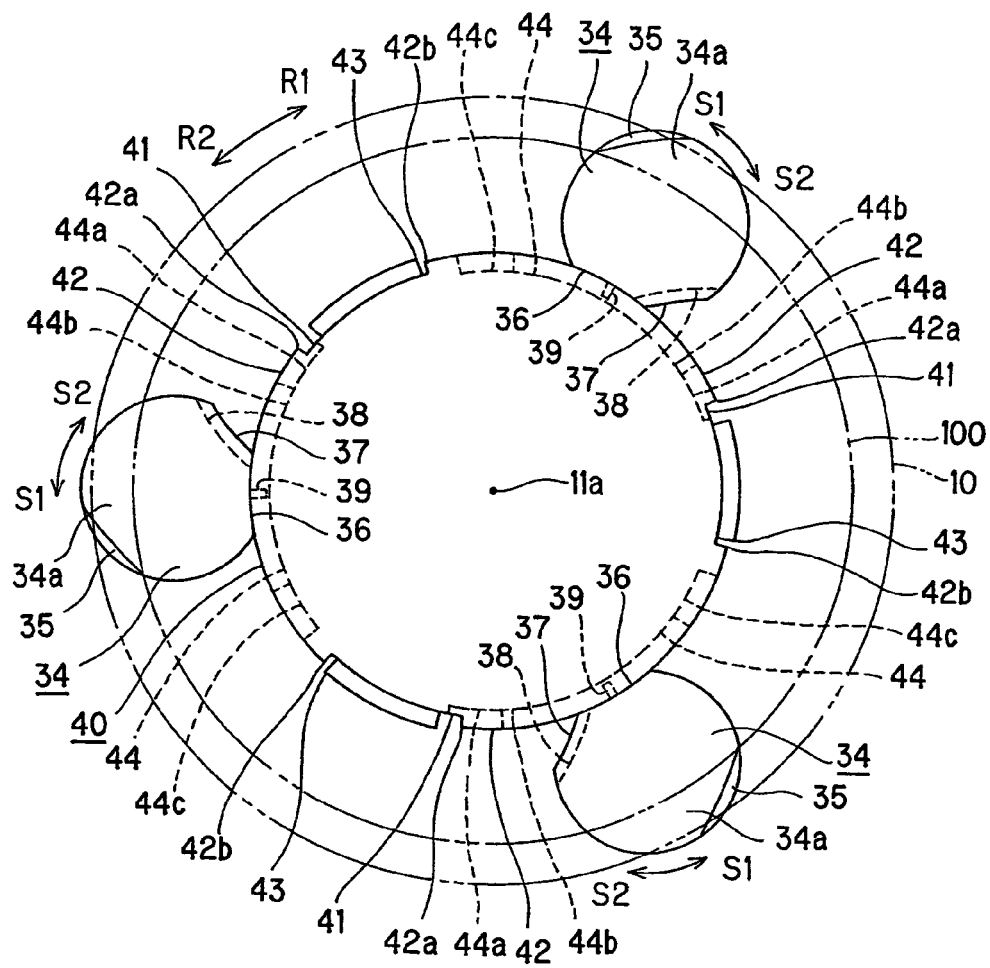
FIG. 39 is a plan view showing a state in which the disc centering member is prevented from rotating.

When the cam member 40 further rotates, the slide pins 39 of the rotary units 34 relatively move from the lower horizontal sections 44a of the cam grooves 44 to the slope sections 44b (see FIG. 38). Consequently, the rotary units 34 move upward and protrude upward from the disc mounting plane 11 to raise the disc-shaped recording medium 100. At this time, as shown in FIG. 39, the first Geneva planes 36 slidingly contact the outside peripheral surface sections 42 of the cam member 40. The rotary units 34 do not rotate.

Figure 40:
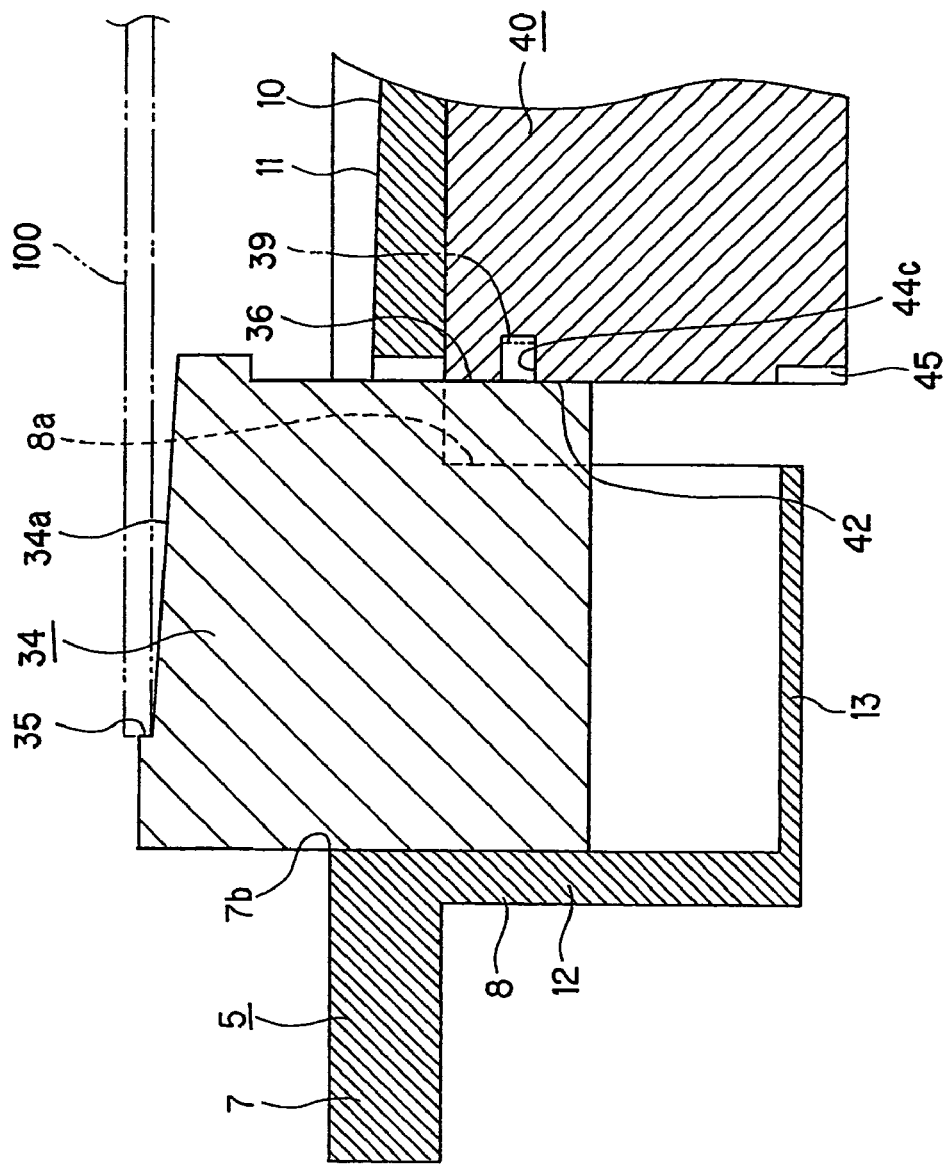
FIG. 40 is an enlarged sectional view showing a state in which the slide pin is inserted into the upper horizontal section of the cam groove to raise the disc-shaped recording medium to the chucking position.

When the cam member 40 further rotates, the slide pins 39 of the rotary units 34 relatively move from the slope sections 44b of the cam grooves 44 to the upper horizontal sections 44c. The rotary units 34 then move to the upper travel ends. The disc-shaped recording medium 100 reaches the centering position (see FIGS. 40 and 41). When the slide pins 39 of the rotary units 34 relatively move to the upper horizontal sections 44c, the operating motor stops rotating and then the cam member 40 stops rotating.

In this manner, the disc-shaped recording medium 100 is centered when the reproduction starts. While centered, the disc-shaped recording medium 100 is raised by the rotary units 34 to complete the transport. To perform the above-mentioned transport operation, the disc drive apparatus 1 has the disc transport apparatus comprising the cam member 40, the rotary units 34, the slide pins 39, the cam grooves 44, the lower horizontal sections 44a, the slope sections 44b, and the like.

Figure 42:
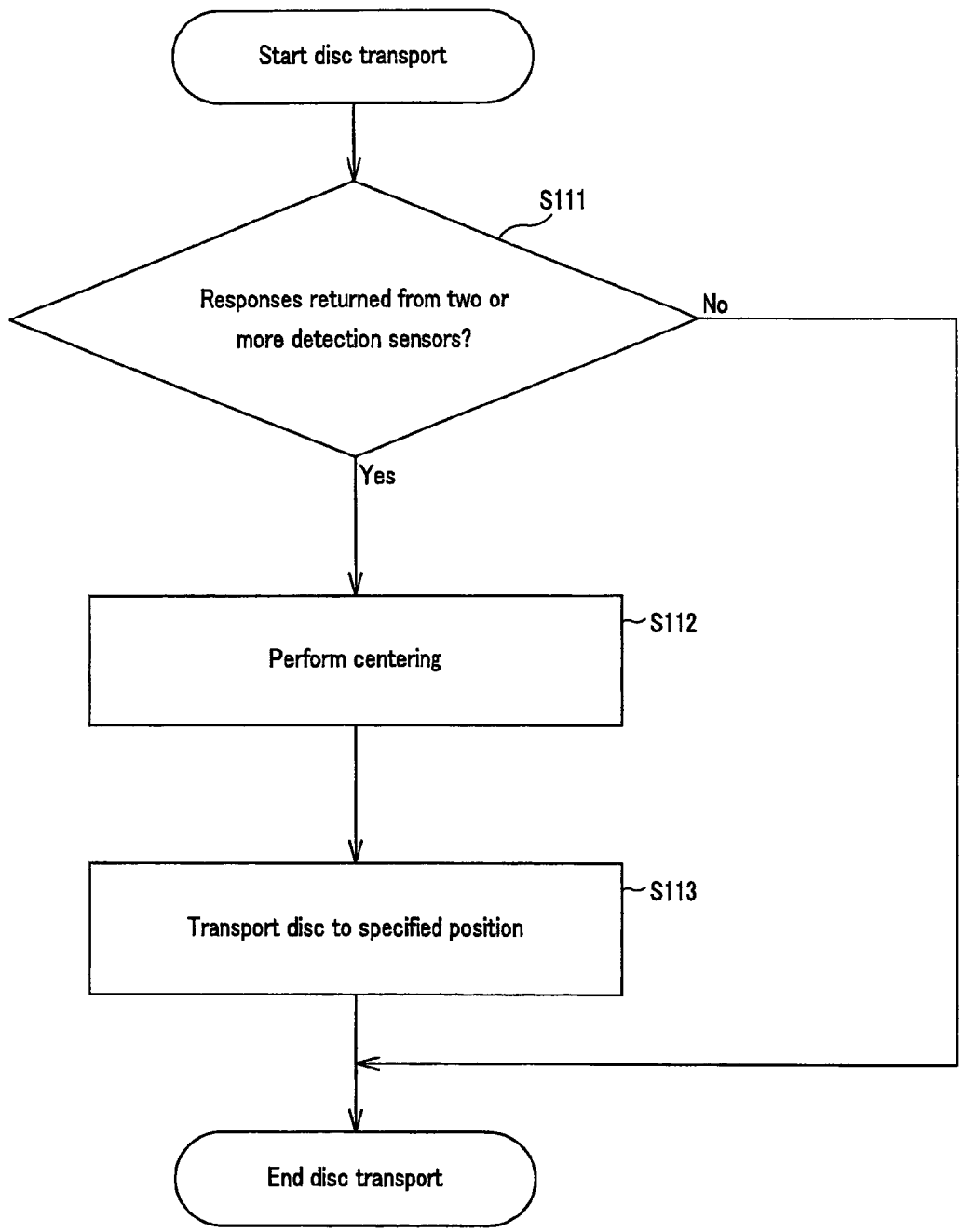
FIG. 42 is a flowchart showing a process to transport the disc.

FIG. 42 shows a process in which the disc transport apparatus of the disc drive apparatus 1 uses the disc detection apparatus to determine a medium mounted on the mounting plane 11 to be the disc-shaped recording medium 100 with diameter 12 cm, centers the disc-shaped recording medium 100, and transports it to a specified position using the rotary units 34. When two or more detection sensors return responses, the control section 240 determines at step S111 that the mounted medium is the disc-shaped recording medium 100 with diameter 12 cm. At step S112, the control section 240 uses the rotary units 34 to center the disc-shaped recording medium 100 as mentioned above. At step S113, the rotary units 34 raise the disc-shaped recording medium 100 to a specified position (the transport-completed position or the second position) to terminate the transport.

The disc drive apparatus 1 can detect the disc-shaped recording medium 300 with diameter 8 cm by using the disc detection apparatus. The disc transport apparatus does not transport this disc-shaped recording medium with different diameter to the second position. Accordingly, different diameter disc-shaped recording media such as those with diameter 8 cm are not raised to the chucking position and therefore are free from tilting, falling, or damaging themselves or the drive section.

Before proceeding to the chucking operation, the disc detection apparatus detects whether or not a differently shaped recording medium is used for the process up to step S113 in FIG. 42. The differently shaped recording medium is defined to be a non-circular disc such as a triangular, rectangular, or otherwise shaped recording medium. The differently shaped recording medium may cover the two sensor holes 10a in FIG. 11 depending on its shape. When the recording medium covers the two sensor holes 10a, the disc transport apparatus transports the recording medium to the second position. However, the differently shaped recording medium is not necessarily accurately centered by the disc centering sections 35 of the rotary units 34. If the differently shaped recording medium is chucked in this state, it may fall or may be chucked incompletely.

The disc drive apparatus 1 determines that the differently shaped recording medium is mounted if the disc detection apparatus receives no response from the three detection sensors 18 at the second position, i.e., the position where the transport is terminated. The disc transport apparatus then lowers the differently shaped recording medium to the position indicated by the cross sectional view in FIG. 13, i.e., the first position as high as the base 7. The recording medium is then returned to the mounting plane 11.

Figure 43:
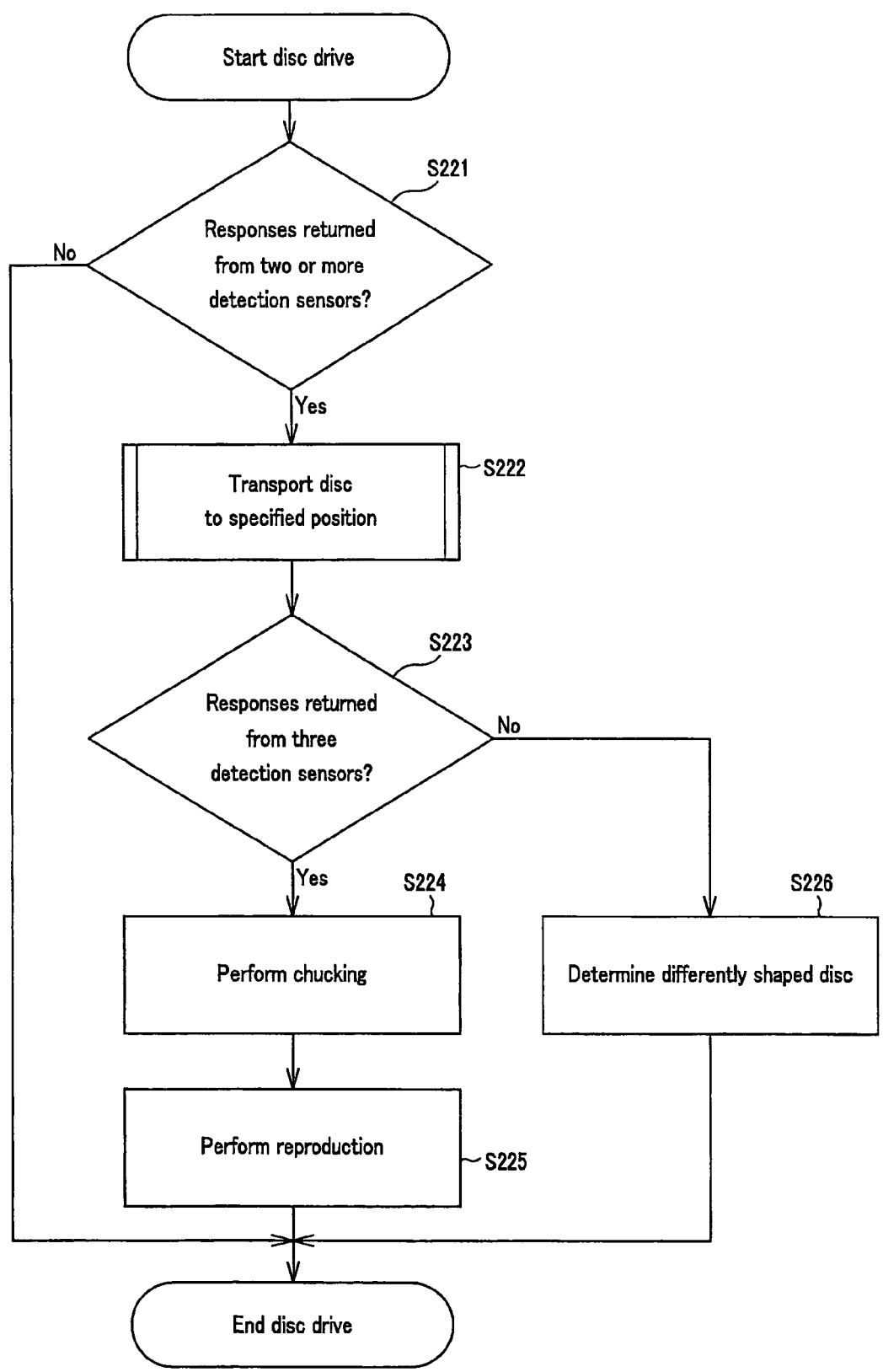
FIG. 43 is a flowchart showing a process to transport, chuck, and reproduce the disc in the disc drive apparatus.

FIG. 43 comprehensively shows a process of the disc drive apparatus 1 using the disc detection apparatus and the disc transport apparatus. At step S221, it is assumed that the disc detection apparatus acknowledges responses from two or more detection sensors concerning the recording medium mounted at the first position. In this case, the process proceeds to step S222 to perform the centering operation as shown in FIG. 42 and transport the disc to the second position by means of the disc transport apparatus.

If the three detection sensors return responses at step S223, the process proceeds to step S224 to perform the chucking operation. When the chucking operation terminates, the drive section performs a reproduction operation and the like. If no response returns from the three detection sensors at step S223, the process proceeds to step S226 and determines that a differently shaped disc is mounted. The disc transport apparatus lowers the recording medium to the first position.

In this manner, differently shaped recording media are not chucked, preventing a chance to fall or incompletely chuck the recording media.

The chucking operation is performed as follows. The unit drive section 23 is driven under control of the control section 240. Driving the unit drive section 23 moves the base unit 20, the control board 21, and the alignment base 22 all together in the direction (direction L1 in FIG. 41) that approaches the disc-shaped recording medium 100 raised by the rotary units 34.

When the base unit 20 moves, the disc table 81 and the chucking pulley 71 are positioned to the center of the disc-shaped recording medium 100. The base unit 20 then stops moving in the direction L1 (see FIG. 44). At this point, the disc-shaped recording medium 100 is raised by the rotary units 34 from the disc mounting plane 11. The disc-shaped recording medium 100 is relatively inserted between the chucking pulley 71 and the disc table 81.

When the base unit 20 is moved in the direction L1, the front of the support arm 66 is slightly raised as mentioned above. There is a wide clearance between the chucking pulley 71 and the disc table 81. If the support arm 66 is slightly bent due to its weight or the like, the chucking pulley 71 does not touch the disc-shaped recording medium 100. The disc-shaped recording medium 100 can be smoothly inserted between the chucking pulley 71 and the disc table 81. This can improve the operation reliability.

Figure 41:
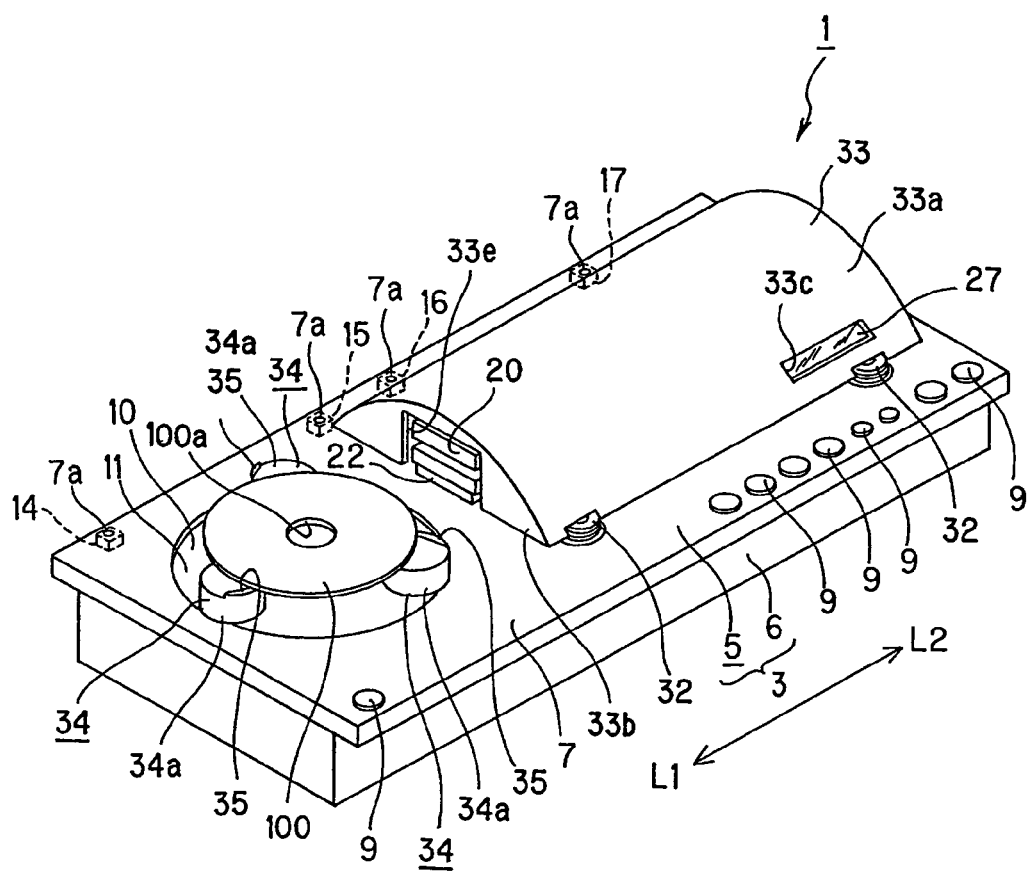
FIG. 41 is a perspective view showing a state in which the disc-shaped recording medium has been centered with the cover removed.

When the base unit 20 stops moving in the direction L1, the operating motor then rotates reversely. The cam member 40 rotates in direction R2 as shown in FIG. 41. The slide pins 39 of the rotary units 34 relatively move from the upper horizontal sections 44c of the cam grooves 44 to the slope sections 44b. The rotary units 34 lower by rotating to return to the initial state. The cam member 40 also returns to the initial state when the operating motor stops.

When the rotary units 34 lower, the disc-shaped recording medium 100 also lowers in accordance with the rotary units 34. The centering protrusion 83 of the disc table 81 is inserted into the center hole 100a. The inside periphery of the disc-shaped recording medium 100 touches the inclined plane for centering 83c. Accordingly, the rotary units 34 are downward separated from the disc-shaped recording medium 100.

When the rotary units 34 are downward separated from the disc-shaped recording medium 100 to return to the initial state, the elevation motor 77 of the drive unit 76 attached to the guide member 55 rotates. When the elevation motor 77 rotates, the rack member 65 engaging with the drive gear 75 is forwarded to slide the cam slider 60 forward.

Figure 45:
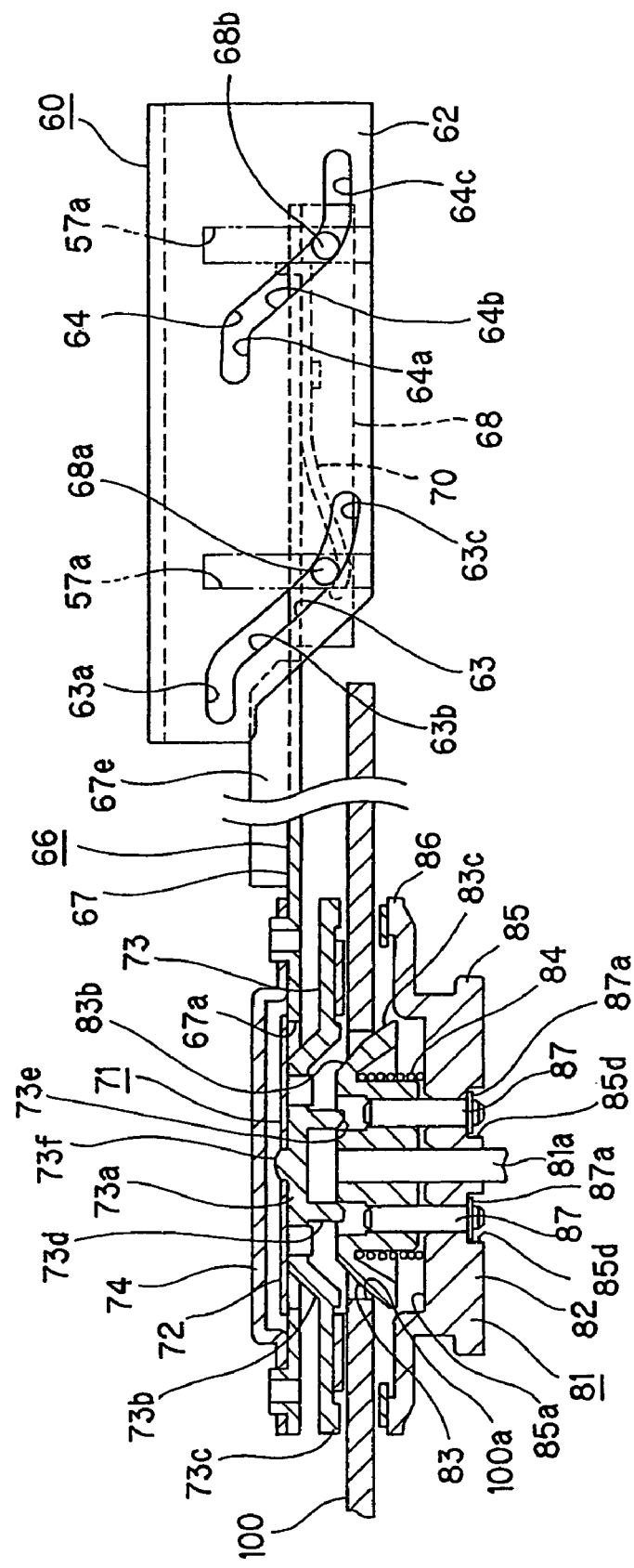
FIG. 45 is a partially sectional side view showing a state in which the chucking operation is in progress.

As the cam slider 60 slides forward, the supported shafts 68a and 68b of the support arm 66 relatively move in the front cam holes 63 and the rear cam holes 64 of the cam slider 60 and in the guide holes 57a of the guide member 55. As shown in FIG. 45, the supported shafts 68a and 68b move from the horizontal sections 63a of the front cam holes 63 to the slope sections 63b and from the horizontal sections 64a of the rear cam holes 64 to the slope section 64b. At the same time, the supported shafts 68a and 68b move downward in the guide holes 57a. Accordingly, the cam slider 60 moves downward, guided by the guide holes 57a. The chucking pulley 71 supported by the cam slider 60 moves in the direction that approaches the disc-shaped recording medium 100.

When the cam slider 60 moves further forward, the supported shafts 68a and 68b move from the slope sections 63b to the acting sections 63c in the front cam holes 63 and from the slope sections 64b to the acting sections 64c in the rear cam holes 64. At the same time, the supported shafts 68a and 68b move further downward in the guide holes 57a. Accordingly, the support arm 66 moves further downward. The chucking pulley 71 lowers. The pressure section 73c presses the disc-shaped recording medium 100 downward. The disc-shaped recording medium 100 and the centering protrusion 83 together move downward against the pressure of the pressing spring 84.

Figure 46:
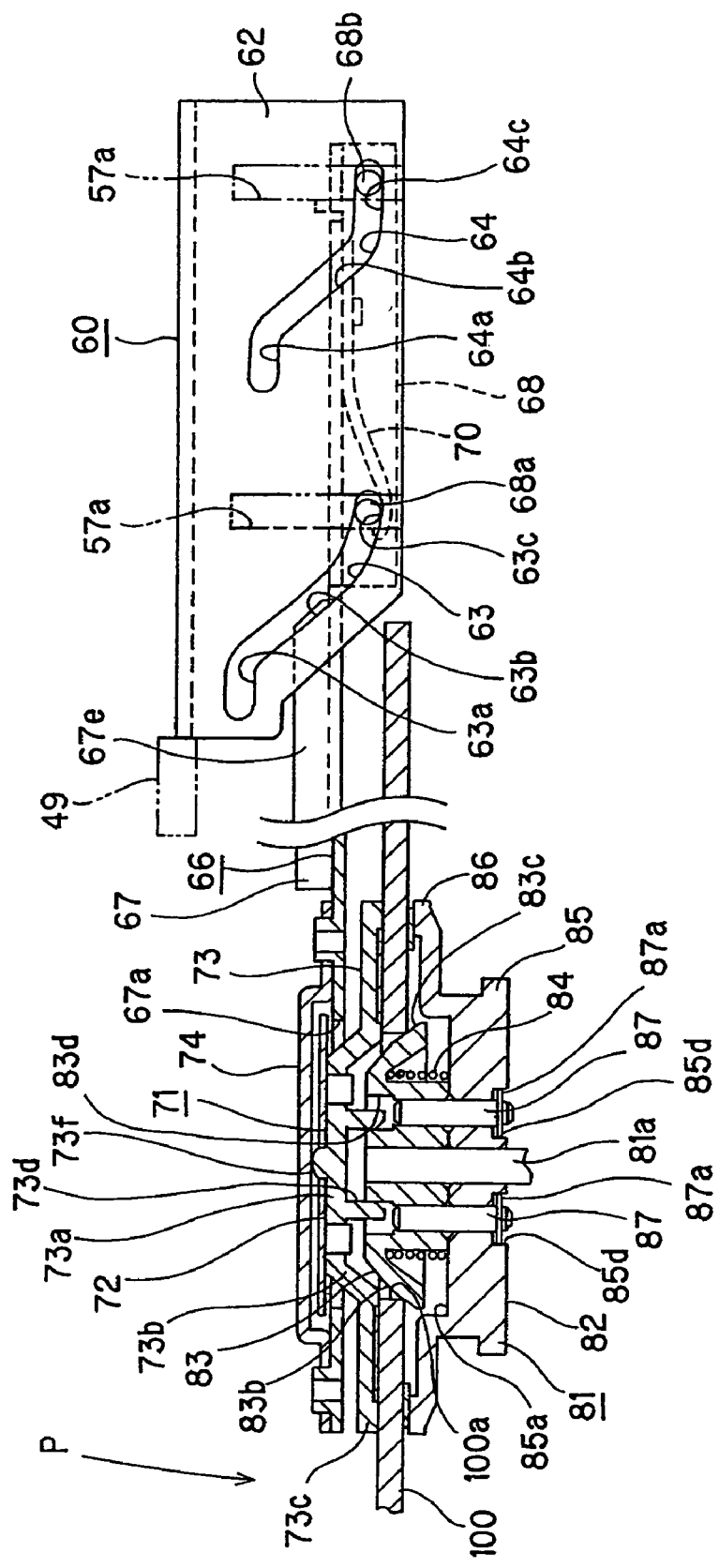
FIG. 46 is a partially sectional side view showing a state in which the chucking operation is complete.

When the support arm 66 moves further downward, the supported shafts 68a move in the acting sections 63c that gently tilt downward toward the rear. The supported shafts 68b move in the horizontal acting sections 64c. Therefore, the support arm 66 rotatively moves at a low speed around the supported shafts 68b in direction P of FIG. 46, i.e., in the direction along which the chucking pulley 71 approaches the disc-shaped recording medium 100. As the support arm 66 rotatively moves around the supported shafts 68b, the chucking pulley 71 is fastened to the disc-shaped recording medium 100 pressed against the mounting section 86 of the disc table 81. The disc table 81 and the chucking pulley 71 hold the inside periphery of the disc-shaped recording medium 100. In this manner, the disc-shaped recording medium 100 is chucked. With the disc-shaped recording medium 100 chucked, the pivot protrusion 73f of the chucking pulley 71 is in contact with the downward plane of the pressure plate 74. The pressure plate 74 presses the chucking pulley 71.

At this time, the disc-shaped recording medium D is transported to a playback position as shown in FIG. 29.

As mentioned above, the support arm 96 rotatively moves at a low speed when the disc-shaped recording medium D is chucked. This makes it possible to further improve silence when the chucking pulley 101 is fastened to the disc-shaped recording medium D. It is possible to prevent the disc-shaped recording medium D from being scratched, damaged, or deformed by contact with the chucking pulley 101.

As mentioned above, the support arm 66 rotatively moves at a low speed when the disc-shaped recording medium 100 is chucked. This makes it possible to further improve silence when the chucking pulley 71 is fastened to the disc-shaped recording medium 100. It is possible to prevent the disc-shaped recording medium 100 from being scratched, damaged, or deformed by contact with the chucking pulley 71.

The acting sections 63c of the front cam holes 63 are tilted. The elevation motor 77 just requires a small drive force to move the supported shafts 68a of the support arm 66 in the acting sections 63c. It is possible to ensure smooth operations of the recording medium drive apparatus 1.

When the disc-shaped recording medium 100 is chucked, the cam slider 60 is positioned to the travel end toward the front in the travel range. The front end of the flat plate section 61 of the cam slider 60 operates the first detection switch 49 attached to the upper case 47 (see FIG. 46). Accordingly, the first detection switch 49 detects that the cam slider 60 is positioned to the travel end toward the front in the travel range. As a result, the elevation motor 77 stops rotating.

When the disc-shaped recording medium 100 is completely chucked, the spindle motor 50 rotates to rotate the disc table 81, the disc-shaped recording medium 100, and the chucking pulley 71 all together. The optical pickup 51 also operates to reproduce information signals from the disc-shaped recording medium 100. The chucking pulley 71 rotates while the pivot protrusion 73f is in contact with the downward plane of the pressure plate 74.

Upon completion of reproducing the information signal from the disc-shaped recording medium 100, the elevation motor 77 rotates reversely. The cam slider 60 moves backward. The support arm 66 moves upward. Accordingly, the chucking pulley 71 and the disc table 81 unchuck the disc-shaped recording medium 100. When the disc-shaped recording medium 100 is unchucked, it remains mounted on the disc table 81.

When the cam slider 60 moves backward, the rear end of the flat plate section 61 operates the second detection switch 58 to detect that the cam slider 60 is positioned to the travel end toward the rear in the travel range. The elevation motor 77 stops. The cam slider 60 and the support arm 66 return to the initial state.

Succeedingly, the operating motor rotates to rotate the cam member 40 in the direction R1. The slide pins 39 of the rotary units 34 relatively move from the slope sections 44b to the upper horizontal sections 44c of the cam grooves 44. The top planes 34a of the rotary units 34 raise the disc-shaped recording medium 100 in contact with its downward plane. At the same time, the disc centering sections 35 get in contact with the outside periphery of the disc-shaped recording medium 100. Consequently, the disc-shaped recording medium 100 is raised upward from the disc table 81. The top planes 34a of the rotary units 34 raise the disc-shaped recording medium 100 in contact with its downward plane. When the disc centering sections 35 get in contact with the outside periphery of the disc-shaped recording medium 100, the operating motor stops rotating and then the cam member 40 stops rotating.

Figure 44:
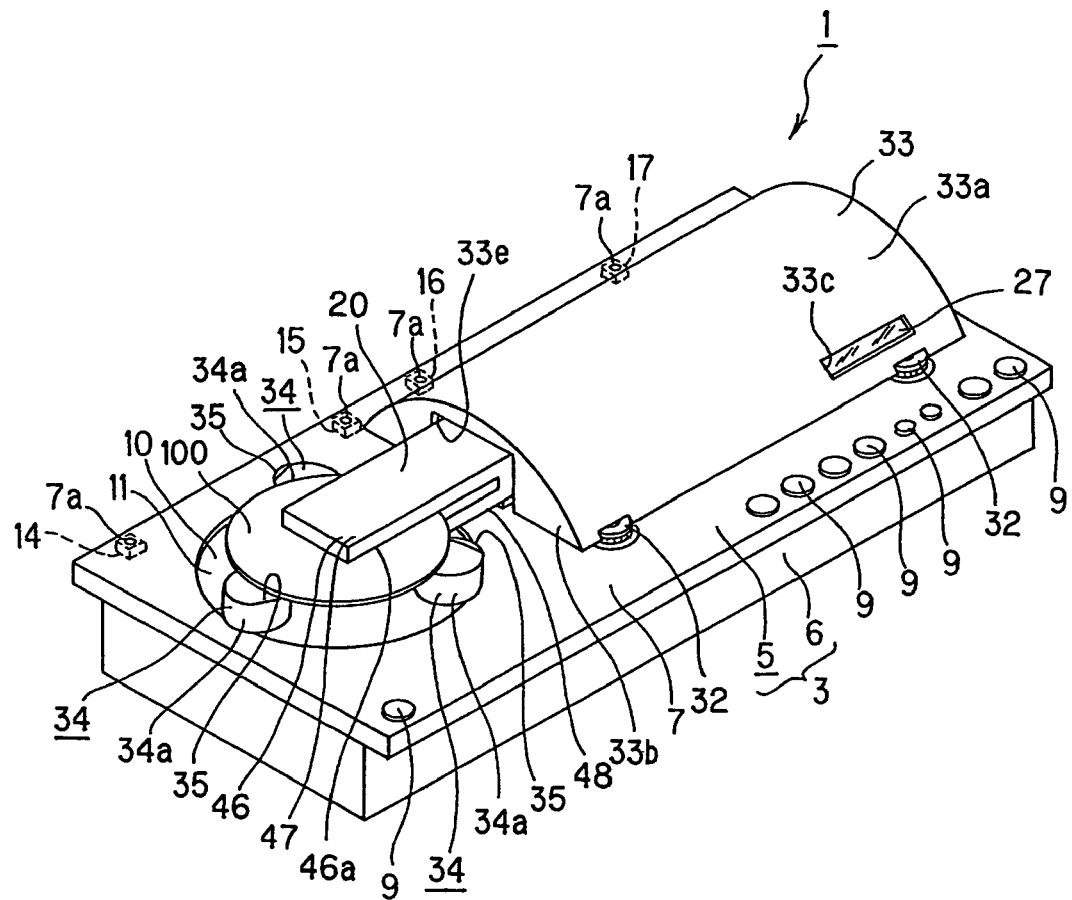
FIG. 44 is a perspective view showing a state in which the disc-shaped recording medium has been centered with the cover removed.

When the rotary units 34 raise the disc-shaped recording medium 100, the unit drive section 23 moves the base unit 20, the control board 21, and the alignment base 22 together in direction L2 of FIG. 44. The base unit 20 is seated on the unit seating section 19a.

When the base unit 20 is moved backward and is seated on the unit seating section 19a, the disc-shaped recording medium 100 is raised by the rotary units 34. Pressing the open button moves the cover 2 to the open position. In this manner, the user can hold the disc-shaped recording medium 100 and take it out of the recording medium drive apparatus 1. A pop-up operation is defined to indicate that the cover 2 is opened, and then the disc-shaped recording medium 100 pops up and becomes ready for the user to take it out.

Whether or not the process proceeds to the pop-up operation is also determined based on detection outputs (the presence or absence of responses) from the detection sensors 18 of the three light detection apparatuses 200 constituting the disc detection apparatus.

Specifically, as shown in FIG. 29, the detection sensor 18 detects that the disc-shaped recording medium D is transported to the takeout position. The light emitting element 21 of the photointerrupter 20 emits light to the signal recording side Db of the disc-shaped recording medium D. The light is emitted from the light emitting plane 21a of the light emitting element 21 and enters the optical element 23. The optical element 23 diffracts the light on the second inclined plane 30b formed on the diffracting wall 30 of the transmission block 26. The light is converged on the signal recording side Db of the disc-shaped recording medium D transported to the takeout position. Accordingly, the light is reflected on the signal recording side Db and the reflect light enters the transmission block 27. Further, the optical element 23 diffracts the light reflected on the signal recording side Db of the disc-shaped recording medium D by allowing the transmission block 27 to transmit that light from the second inclined plane 31b. The light is converged on the light receiving plane 22a of the light receiving element 22. The light receiving element 22 receives intense reflected light from the signal recording side Db of the disc-shaped recording medium D transported to the takeout position. Accordingly, it is possible to reliably detect the disc-shaped recording medium D.

The shield sections 32 and 33 are formed on the butting planes 26a and 27a of the transmission blocks 26 and 27. Accordingly, the shield sections 32 and 33 prevent the light emitted from the light emitting element 21 or the reflected light entering the light receiving element 22 from diffusely reflecting in the optical element 23. As a result, the light receiving element 22 can detect the reflected light from the signal recording side Db of the disc-shaped recording medium D without decreasing the reflected light intensity.

At this time, the first inclined plane 30a of the diffracting wall 30 also diffracts the light entering the transmission block 26 from the light emitting element 21. This diffracted light focuses on the signal recording side Db of the disc-shaped recording medium D mounted on the disc mounting plane 11. Accordingly, the diffracted light does not converge on the signal recording side Db of the disc-shaped recording medium D transported at the takeout position. The reflected light scatters and is not detected by the light receiving element 22. Therefore, the detection sensor 18 detects the disc-shaped recording medium D held at the takeout position without being subject to influence of the diffracted light caused by the first inclined plane 30a formed on the transmission block 26.

When the user takes out the disc-shaped recording medium D, the detection sensor 18 stops detecting the reflected light from the signal recording side Db on the disc-shaped recording medium D. As a result, the detection sensor 18 detects that the disc-shaped recording medium D is ejected.

The detection sensor 18 is provided with the detection level for detecting the reflected light using the light receiving element 22 in accordance with the intense reflected light converged on the signal recording side Db of the disc-shaped recording medium D. There may be a case where external light having various wavelengths enters from a given space between the disc mounting plane 11 and the disc-shaped recording medium D held at the takeout position. In such case, the detection sensor 18 is prevented against the influence of the external light when detecting whether the disc-shaped recording medium D is held at the takeout position or is ejected. Accordingly, the detection sensor 18 can prevent the rotary units 64 from lowering when the disc-shaped recording medium D is held at the takeout position. Further, the detection sensor 18 can prevent the rotary units 64 from not being lowered when the disc-shaped recording medium D is ejected.

When the detection sensors 18 detect that the disc-shaped recording medium D is not mounted, the operating motor rotates. The cam member 70 rotates in the direction R2. The rotary units 64 move downward and return to the initial state.

There has been described the example where the disc-shaped recording medium 100 is removed from the recording medium drive apparatus 1 immediately after the base unit 20 moves backward. Instead, for example, it may be preferable to move the base unit 20 backward, and then move the rotary units 34 downward to temporarily mount the disc-shaped recording medium 100 on the disc mounting plane 11.

In this case, the rotary units 34 again lift the disc-shaped recording medium 100 and stop it at a specified position to initiate the pop-up operation and proceed to the wait state. A given space is formed between the disc-shaped recording medium 100 and the disc mounting plane 11 of the base panel 5 so that the user can easily take out the disc-shaped recording medium 100.

The following describes operations of the cover 2. As mentioned above, the cover 2 can be attached to or detached from the base panel 5. For example, removing the cover 2 can facilitate maintenance works or allow the cover 2 to be cleaned.

As mentioned above, a drive force of the transport motor 29 is transmitted to the gear units 32 on the left via the deceleration gear groups 30. In accordance with rotations of the gear units 32, the cover 2 moves in the direction (back and forth) corresponding to the rotation direction of the transport motor 29.

The transport motor 29 starts or stops based on a result of detecting the position of the cover 2. Positions of the cover 2 are detected by the first sensor 14, the second sensor 15, the third sensor 16, and the fourth sensor 17 disposed on the downward plane of the base panel 5.

Figure 48:
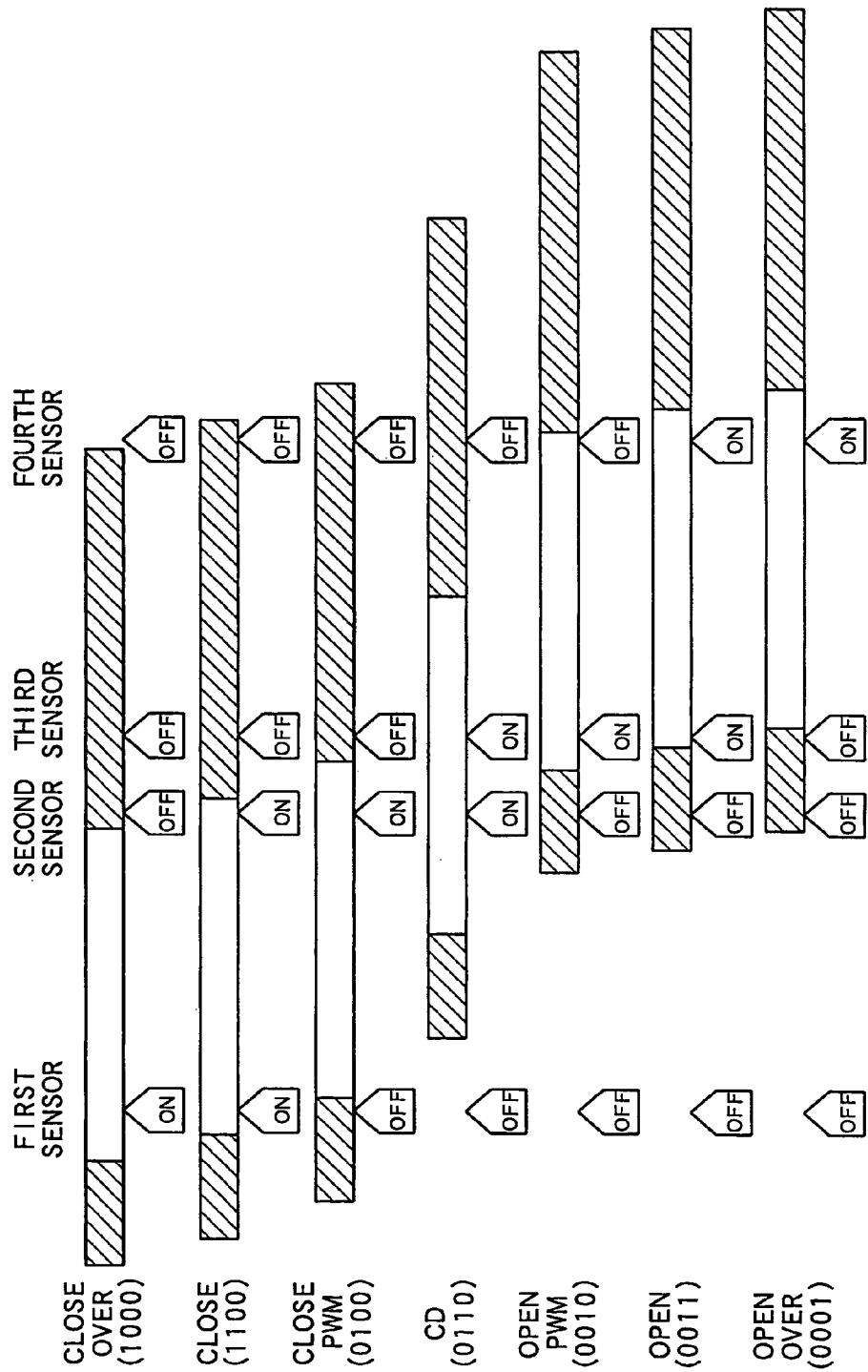
FIG. 48 shows detection states of sensors corresponding to the addresses.

As shown in FIG. 47, for example, there are defined 11 addresses to detect positions of the cover 2. FIG. 48 shows detection states of the sensors 14, 15, 16, and 17 corresponding to the addresses. For example, address "CLOSE OVER" indicates that the first sensor 14 is ON; the second sensor 15, the third sensor 16, and the fourth sensor 17 are OFF; and an address signal is set to "1000". Accordingly, the cover 2 is positioned so that the reflective section 4b is positioned over the first sensor 14 and the second non-reflective section 4c is positioned over the second sensor 15, the third sensor 16, and the fourth sensor 17.

In FIG. 47, addresses "OPEN NG", "OPEN PWM NG", and "DCNG" indicate that the first sensor 14 is set to the ON state at each specified position. For example, the first sensor 14 becomes ON when the detection light is reflected on a finger or a hand.

Figure 49:
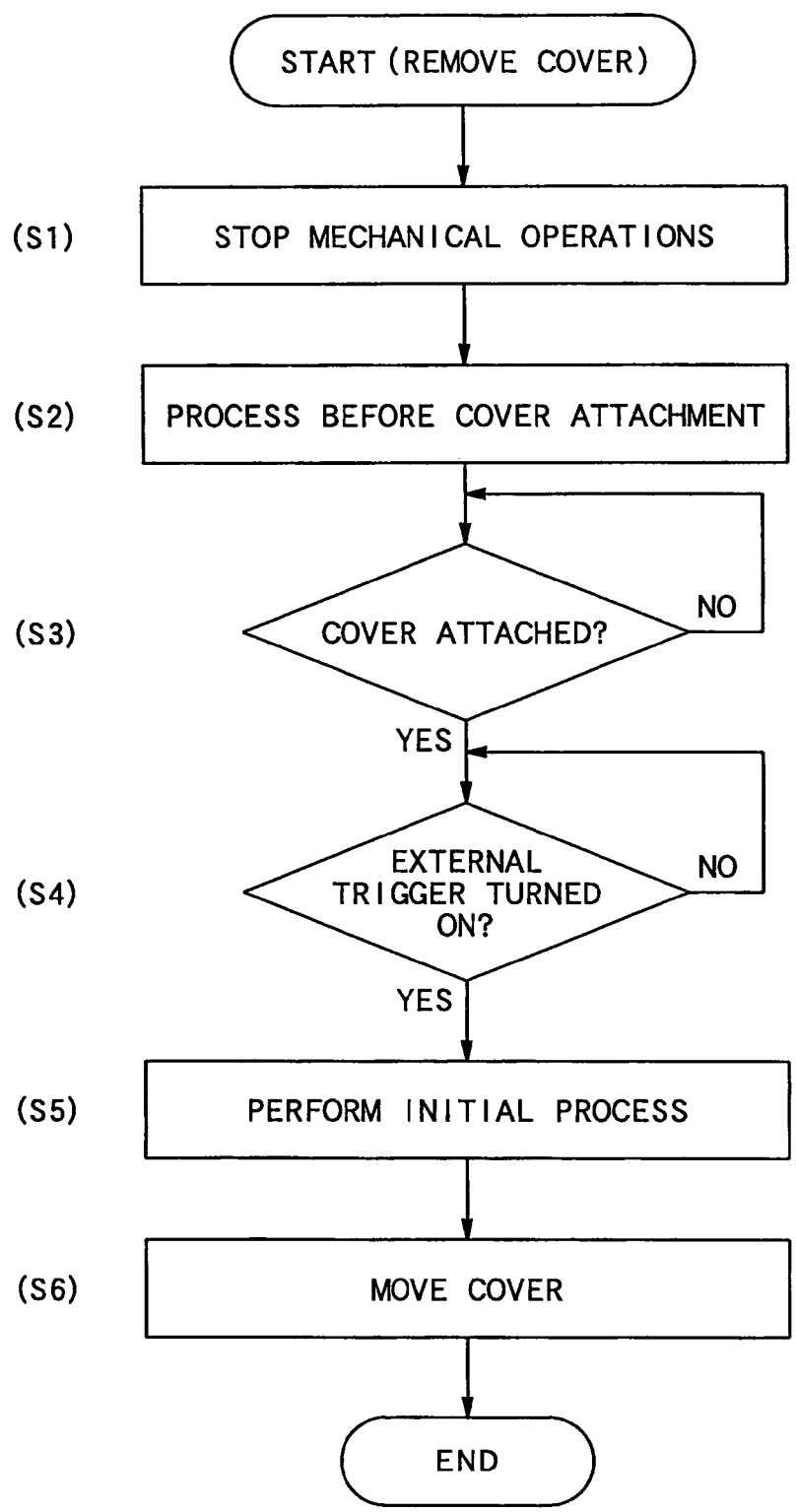
FIG. 49 is a flowchart showing a process to control cover movement.

The following describes an operation flow according to a functional circuit block in FIG. 49. (S1) Removing the cover 2 from the base panel 5 starts the operation. When the cover 2 is removed, address "EMPTY (0000)" is detected to stop the mechanical operations. Stopping the mechanical operations means stopping, for example, the drive motor 24, the transport motor 29, the operating motor, the spindle motor 50, and the elevation motor 77 when they are rotating. When the mechanical operations stop, the process proceeds to (S2).

(S2) A process (preprocess) takes place before the cover 2 is attached to the base panel 5. The process before the attachment returns the respective parts to the initial states. For example, when the disc-shaped recording medium 100 is raised by the rotary units 34, the operating motor is started to lower the rotary units 34 and mount the disc-shaped recording medium 100 on the disc mounting plane 11. When the disc-shaped recording medium 100 is chucked, the elevation motor 77 is started to unchuck the disc-shaped recording medium 100. When the base unit 20 is moved to the front, the drive motor 24 is started to seat the base unit 20 on the unit seating section 19a. When the preprocess terminates, the process proceeds to (S3).

(S3) It is detected whether or not the cover 2 is attached to the base panel 5. The first sensor 14, the second sensor 15, the third sensor 16, or the fourth sensor 17 detects whether or not the cover 2 is attached to the base panel 5. When at least one sensor is set to the ON state, it is detected that the cover 2 is attached to the base panel 5. When it is detected that the cover 2 is attached to the base panel 5, the process proceeds to (S4). When it is not detected that the cover 2 is attached to the base panel 5, the process returns to (S3).

(S4) It is detected whether or not an external trigger turns ON. The external trigger represents, for example, a timer, the open button, the close button, the play button, and the like. When the timer is used as the external trigger, the timer counts a lapse of time after the cover 2 is attached. The ON state is detected when a specified time period is reached. When the open button, the close button, and the play button are used as the external trigger, the ON state is detected when these buttons are operated. A human body sensor may be used as the external trigger. The recording medium drive apparatus 1 is provided with the human body sensor. The ON state is detected only when the user attaches the cover 2 and leaves the recording medium drive apparatus 1 for a specified distance. When it is detected that the external trigger is set to the ON state, the process proceeds to (S5). When it is not detected that the external trigger is set to the ON state, the process returns to (S4).

(S5) An initial process is performed. The initial process is equivalent to the preprocess at (S2). Each process at (S2) can be performed as the initial process at (S5). For example, it may be preferable to omit the preprocess at (S2) and perform a process equivalent to the preprocess as the initial process at (S5). The preprocess assumes that the cover 2 is detached. During the preprocess, the user may touch the parts or mechanisms to cause a process error. The initial process assumes that the cover 2 is attached. The user has little possibility of touching the mechanisms and causing a process error. Accordingly, it is possible to selectively configure the contents of the preprocess at (S2) and those of the initial process at (S5). When the initial process terminates, the process proceeds to (S6).

(S6) The cover 2 is moved. The cover 2 is moved to the close position, for example, whichever address is detected. When the detected address is neither "CLOSE OVER" nor "CLOSE", the transport motor 29 is rotated in one direction to move the cover 2. The rotation is decelerated when the "CLOSE PWM" is detected in the middle. When address "CLOSE OVER" is detected, the transport motor 29 is rotated in the other direction to move the cover 2. When the cover 2 passes by the close position, the transport motor 29 is reversely rotated to move the cover 2 by correcting a deceleration value until the cover 2 stops at "CLOSE".

There has been described the example where the cover 2 is attached to the base panel 5 and is always moved to the close position wherever the cover 2 is attached. The position to which the cover 2 is moved is not limited to the close position. For example, the cover 2 may be moved to the open position, the close position, or the other positions.

In the recording medium drive apparatus 1, as mentioned above, the cover 2, when attached to the base panel 5, is moved to a specified position wherever the cover 2 is attached. Therefore, the user need not be aware of the attachment position of the cover 2, making it possible to improve the usability of the recording medium drive apparatus 1.

Irrespectively of positions where the cover 2 is attached to the base panel 5, the cover 2 may be moved to the close position or the open position. When the cover 2 is moved to the close position, the cover 2 covers the parts to protect them against shocks and foreign particles. When the cover 2 is moved to the open position, the disc-shaped recording medium 100 can be immediately mounted on the disc mounting plane 11. It is possible to further improve the usability of the recording medium drive apparatus 1.

Further, in the recording medium drive apparatus 1, the detection target 4 of the cover 2 is provided with the first non-reflective section 4a, the reflective section 4b, and the second non-reflective section 4c. The first sensor 14, the second sensor 15, the third sensor 16, and the fourth sensor 17, i.e., the reflective optical sensors detect the position of the cover 2 attached to the base panel 5. Accordingly, the simple configuration can be used to reliably detect the attachment position of the cover 2.

The above-mentioned embodiment has shown the shapes and structures of the parts only as examples of embodying the present invention. The examples should not be a cause to restrictively interpret the technical scope of the present invention.

What is claimed is:

1. An apparatus for mounting disks having different diameters, the apparatus comprising:

a recording medium mount section for mounting a disc, the disc being one of a first diameter and a second diameter, the second diameter being smaller than the first diameter;

at least three optical detection means each for detecting presence or absence of reflected light and each including:

an associated light emitting section which emits light through a corresponding one of at least three openings in the recording medium mount section such that the light is directed onto a surface of the mounted disc if the disc covers the corresponding opening in the recording medium mount section and is not directed onto the surface of the mounted disc if the disc does not cover the corresponding opening in the recording medium mount section, and an associated light receiving section which receives light reflected from the surface of the mounted disc if the disc covers the corresponding opening in the recording medium mount section and does not receive light reflected from the surface of the mounted disc if the disc does not cover the corresponding opening in the recording medium mount section, wherein the at least three openings in the recording medium mount section are positioned at substantially equal distances from a reference point so that at least two of the optical detection means detect light reflected from the surface of the mounted disc if the disc is of the first diameter and at most one of the optical detection means detects light reflected from the surface of the mounted disc if the disc is of the second diameter; and control means for determining whether the mounted disc is of the first diameter or the second diameter based on detection results of the at least three optical detection means.

2. The apparatus according to claim 1, further comprising: transport means for transporting the disc to a recording/reproducing position, and wherein the control means controls the transport means to move the disc to the recording/reproducing position if the at least two optical detection means detects the reflected light, and prevents the transport means from moving the disc to the recording/reproducing position when fewer than two detection means detect the reflected light.

3. The apparatus according to claim 2, wherein the control means determines that the disc is of the first diameter, and controls the transport means to center the disc and move the disc to the recording/reproducing position.

4. The apparatus according to claim 1, wherein at least m optical detection means detect the light reflected from the surface of the disc if the disc is of the first diameter (where m≧2) and at most n (where m >n and n≧1) optical detection means detect the light reflected from the surface of the disc if the disc is of the second diameter.

5. The disc apparatus according to claim 1, wherein the recording medium mount section is formed to have a recessed section and a circular periphery.

6. A method of mounting disks having different diameters, the method comprising:

mounting a disc onto a recording medium mount section, the disc being one of a first diameter and a second diameter that is smaller than the first diameter;

detecting presence or absence of reflected light using at least three optical detection devices each having an associated light emitting section which emits light through a corresponding one of at least three openings in the recording medium mount section such that the light is directed onto a surface of the mounted disc if the disc covers the corresponding opening in the recording medium mount section and is not directed onto the surface of the mounted disc if the disc does not cover the corresponding opening in the recording medium mount section, and an associated light receiving section which receives light reflected from the surface of the mounted disc if the disc covers the corresponding opening in the recording medium mount section and does not receive light reflected from the surface of the mounted disc if the disc does not cover the corresponding opening in the recording medium mount section, wherein the at least three openings in the recording medium mount section are positioned at substantially equal distances from a reference point so that at least two of the optical detection devices detect light reflected from the surface of the mounted disc if the disc is of the first diameter and at most one of the optical detection devices detects light reflected from the surface of the mounted disc if the disc is of the second diameter; and determining whether the disc is of the first diameter or the second diameter based on detection results of the at least three optical detection devices.

7. The method according to claim 6, further comprising: transporting the disc to a recording/reproducing position, wherein the determining step includes moving the disc to the recording/reproducing position when the at least two optical detection devices detects the reflected light, and preventing the disc from moving to the recording/reproducing position when fewer than two optical detection devices detect the reflected light.

8. The method according to claim 7, wherein the determining step determines that the disc is of the first diameter, and the transporting step centers the disc and moves it to the recording/reproducing position.

9. The method according to claim 6, wherein at least m optical detection devices detect the light reflected from the surface of the disc if the disc is of the first diameter (where m≧2) and at most n (where m>n and n≧1) optical detection devices detect the light reflected from the surface of the mounted disc if the disc is of the second diameter.

10. The method according to claim 6, wherein the recording medium mount section is formed to have a recessed section and a circular periphery.

* * * * *